United States Patent
Nakayama

[11] Patent Number: 5,847,882
[45] Date of Patent: Dec. 8, 1998

[54] REAR FOCUSING ZOOM LENS

[75] Inventor: Hiroki Nakayama, Sagamihara, Japan

[73] Assignee: Canon Kabushiki Kaisha, Tokyo, Japan

[21] Appl. No.: 485,136

[22] Filed: Jun. 7, 1995

[30] Foreign Application Priority Data

| Jun. 23, 1994 | [JP] | Japan | 6-141499 |
| Nov. 15, 1994 | [JP] | Japan | 6-307014 |
| Jan. 16, 1995 | [JP] | Japan | 7-016452 |

[51] Int. Cl.⁶ ................................... G02B 15/14
[52] U.S. Cl. .......................... 359/684; 359/676; 359/683
[58] Field of Search ..................... 359/684, 682, 359/681, 676, 766, 683

[56] References Cited

U.S. PATENT DOCUMENTS

| 3,912,373 | 10/1975 | Macher | 359/684 |
| 4,033,674 | 7/1977 | Sekiguchi | 350/184 |
| 4,776,679 | 10/1988 | Kitagishi et al. | 350/427 |
| 4,810,070 | 3/1989 | Suda et al. | 350/413 |
| 4,842,386 | 6/1989 | Kitagishi et al. | 350/427 |
| 4,907,866 | 3/1990 | Kitagishi et al. | 350/426 |
| 5,011,272 | 4/1991 | Nakayama et al. | 350/427 |
| 5,078,481 | 1/1992 | Nakayama et al. | 359/680 |
| 5,087,988 | 2/1992 | Nakayama | 359/689 |
| 5,111,338 | 5/1992 | Nakayama | 359/686 |
| 5,113,287 | 5/1992 | Nakayama | 359/676 |
| 5,388,004 | 2/1995 | Adachi | 359/684 |
| 5,659,426 | 8/1997 | Aoki | 359/683 |

FOREIGN PATENT DOCUMENTS

| 55-38559 | 3/1980 | Japan | 359/684 |
| 5215967 | 8/1993 | Japan . | |
| 6148523 | 5/1994 | Japan . | |

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A zoom lens having a first lens unit remaining stationary and having positive refracting power, a second lens unit having negative refracting power, a third lens unit having positive refracting power, a fourth lens unit having negative refracting power and a fifth lens unit remaining stationary and having positive refracting power to perform zooming by moving at least the second lens unit and the fourth lens unit and to perform focusing an infinite object to a nearest object by moving the fourth lens unit toward the image surface.

35 Claims, 55 Drawing Sheets

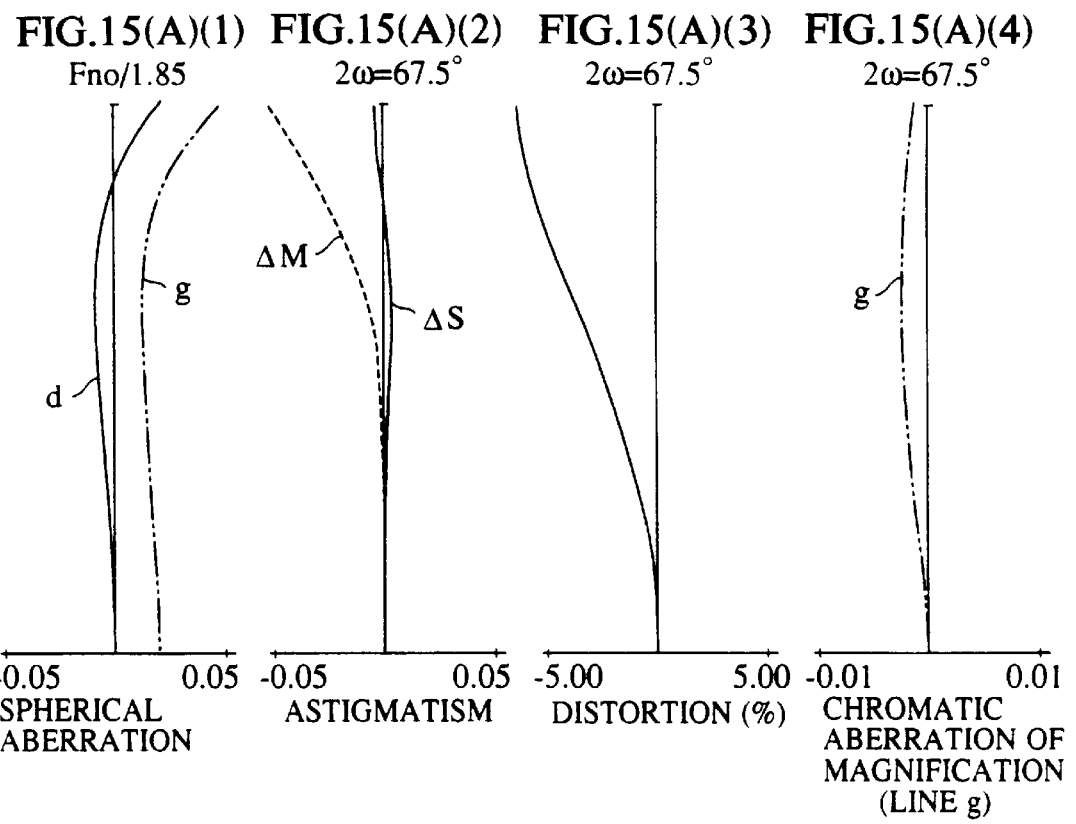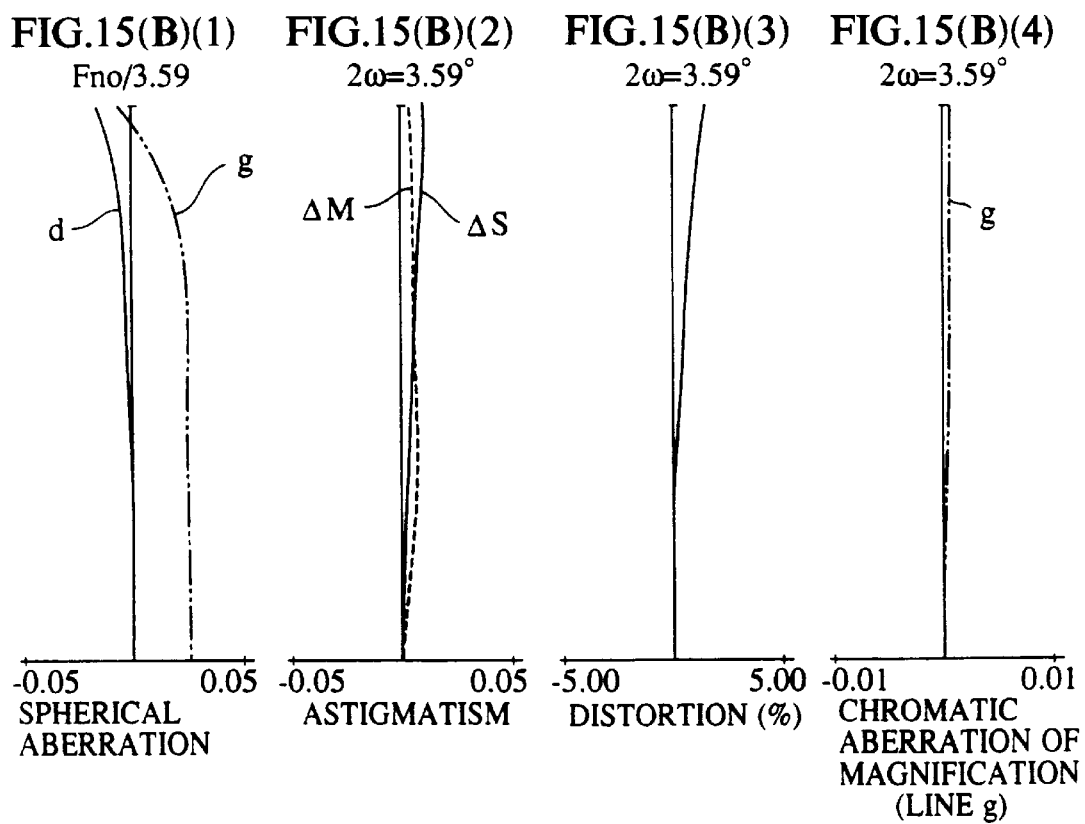

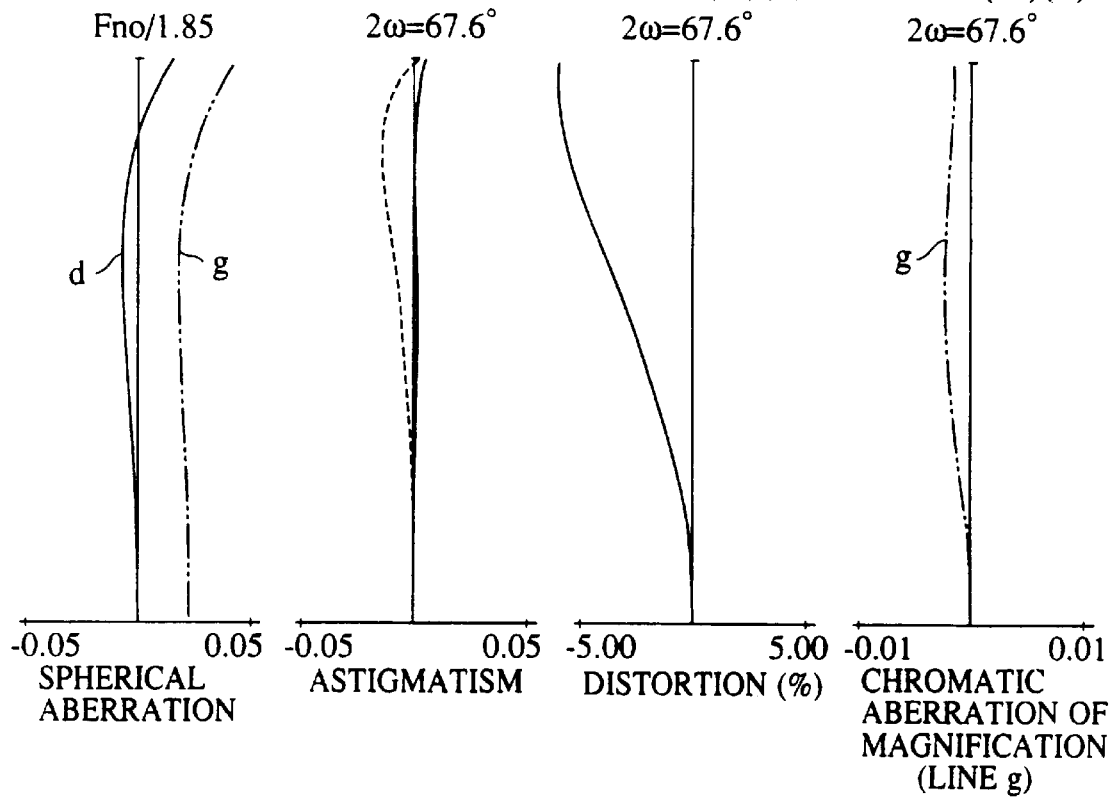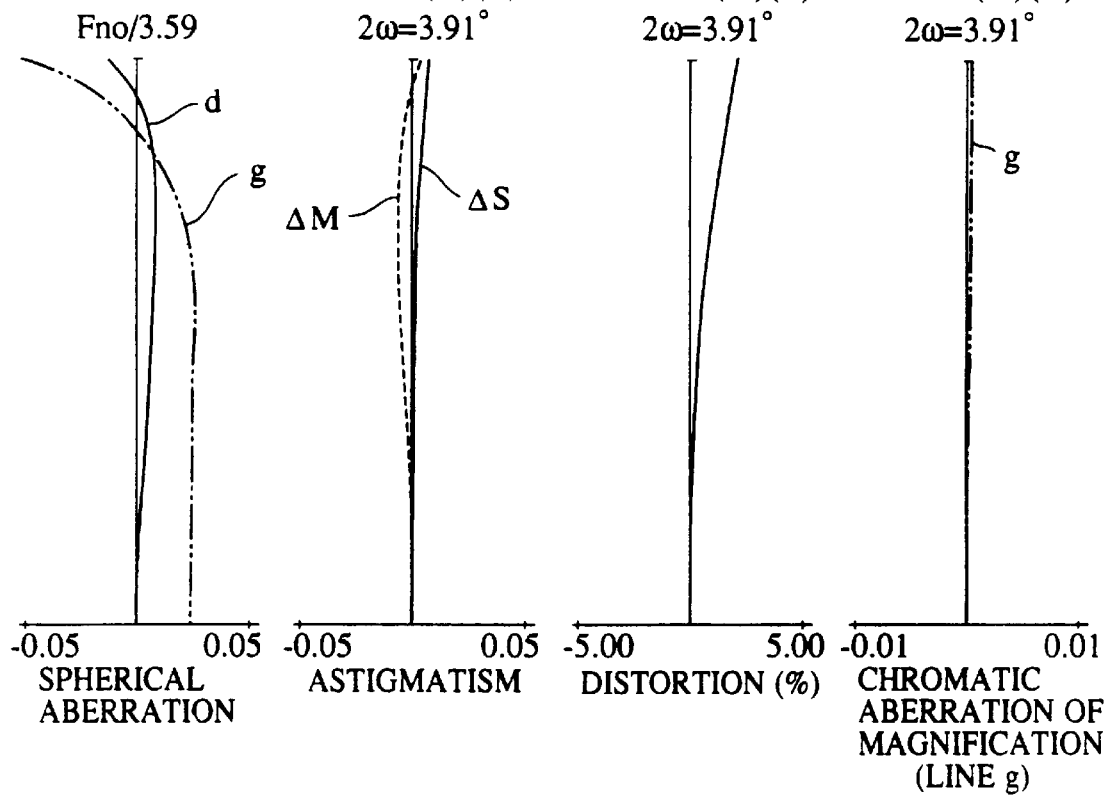

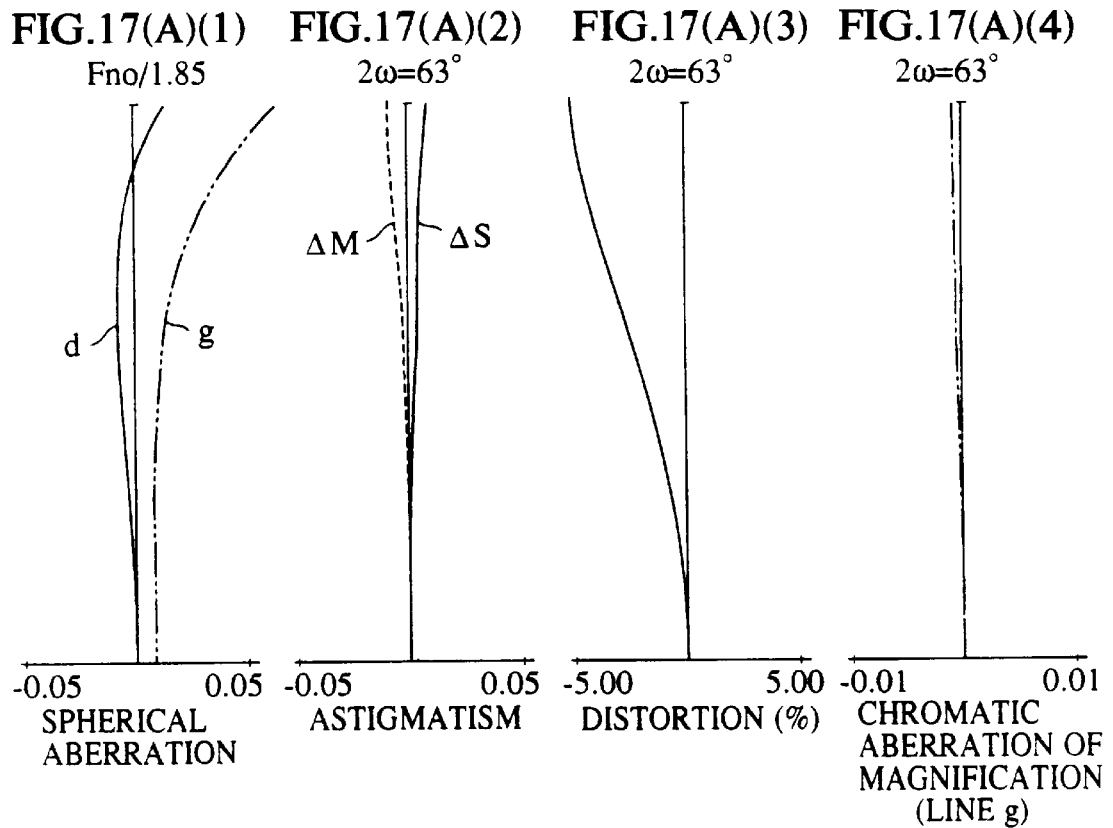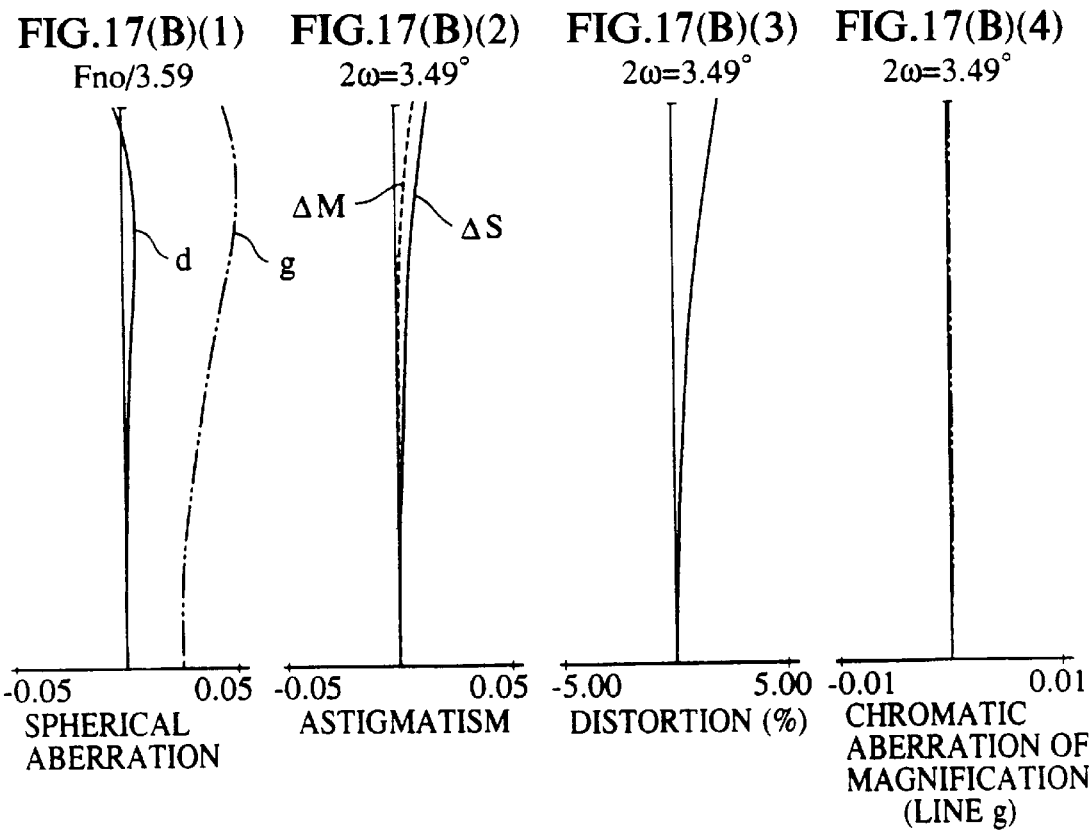

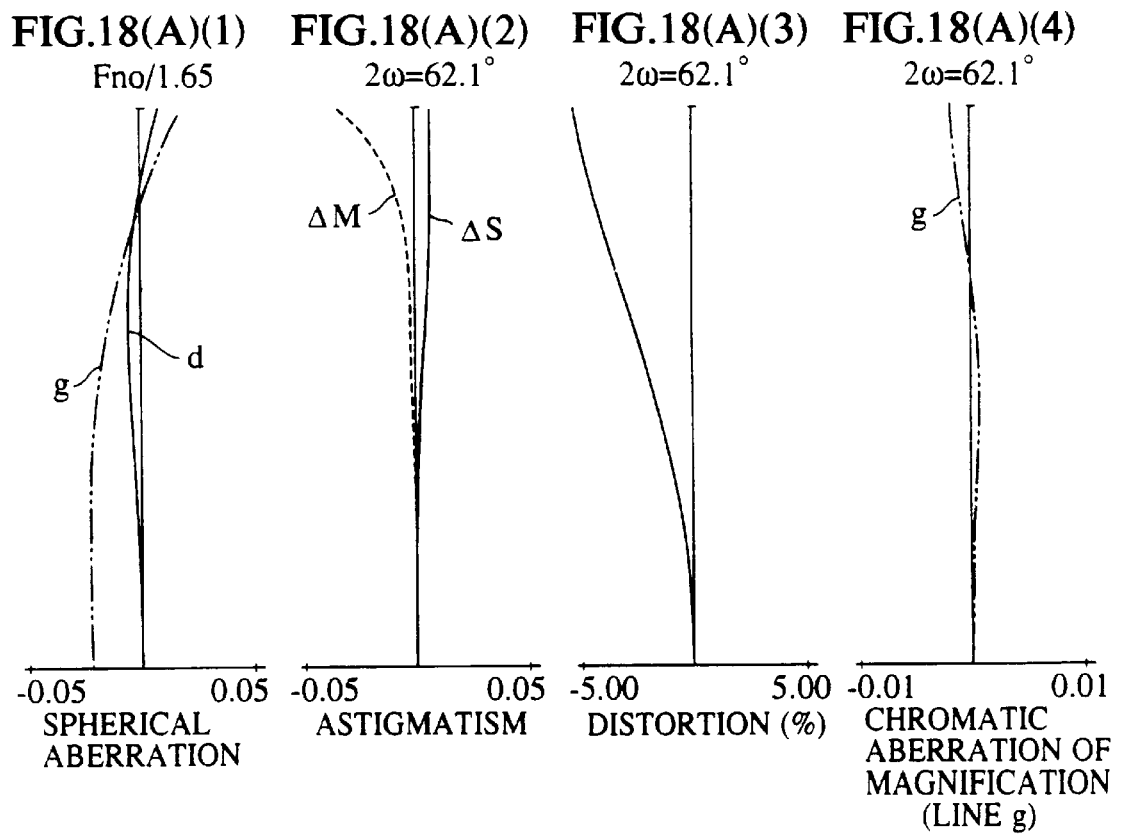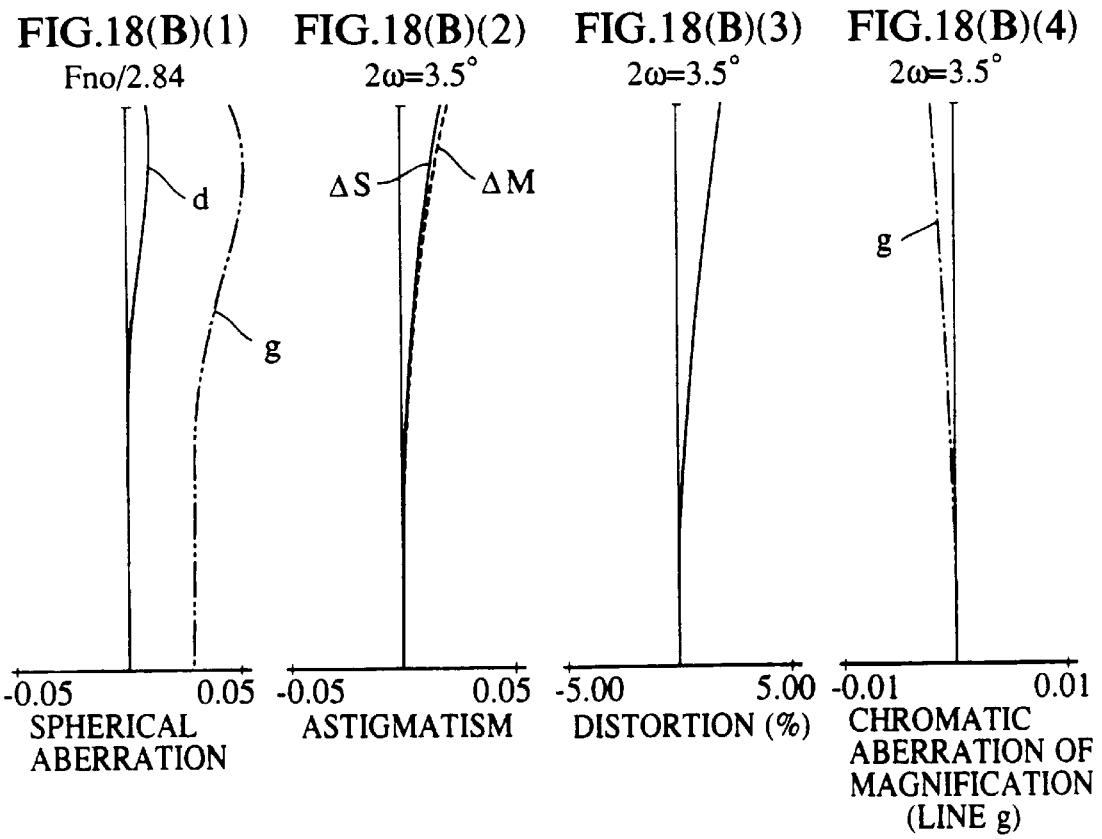

FIG.19(A)(1)
Fno/1.65
FIG.19(A)(2)
2ω=62°
FIG.19(A)(3)
2ω=62°
FIG.19(A)(4)
2ω=62°
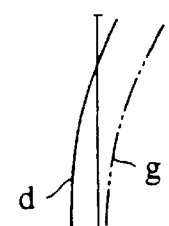
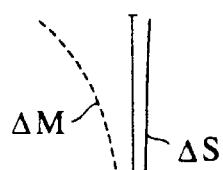
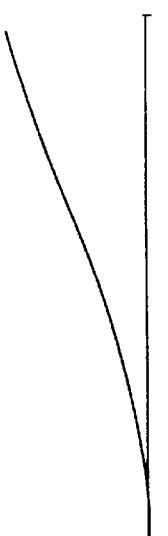
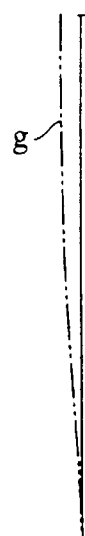
-0.05      0.05
SPHERICAL
ABERRATION
-0.05      0.05
ASTIGMATISM
-5.00      5.00
DISTORTION (%)
-0.01      0.01
CHROMATIC
ABERRATION OF
MAGNIFICATION
(LINE g)
FIG.19(B)(1)
Fno/3.65
FIG.19(B)(2)
2ω=3.53°
FIG.19(B)(3)
2ω=3.53°
FIG.19(B)(4)
2ω=3.53°
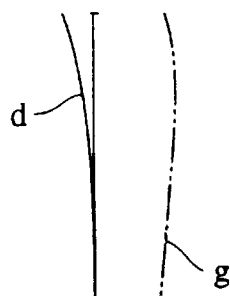
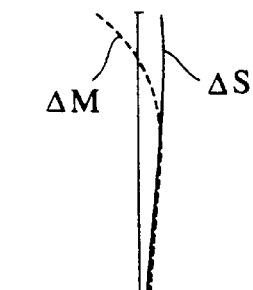
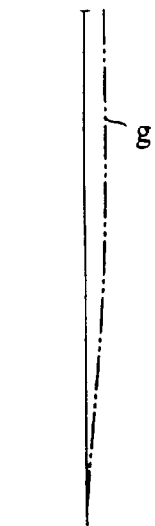
-0.05      0.05
SPHERICAL
ABERRATION
-0.05      0.05
ASTIGMATISM
-5.00      5.00
DISTORTION (%)
-0.01      0.01
CHROMATIC
ABERRATION OF
MAGNIFICATION
(LINE g)

FIG.20(A)(1)
Fno/1.85
FIG.20(A)(2)
2ω=63°
FIG.20(A)(3)
2ω=63°
FIG.20(A)(4)
2ω=63°
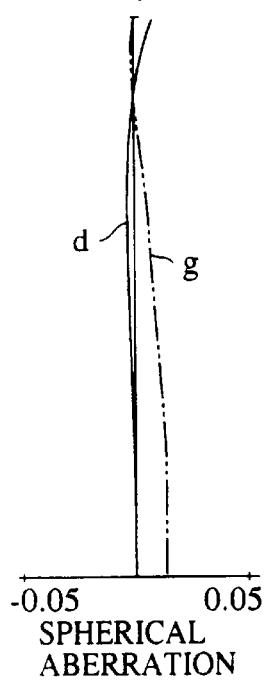
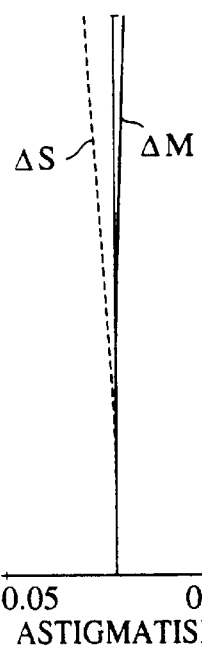
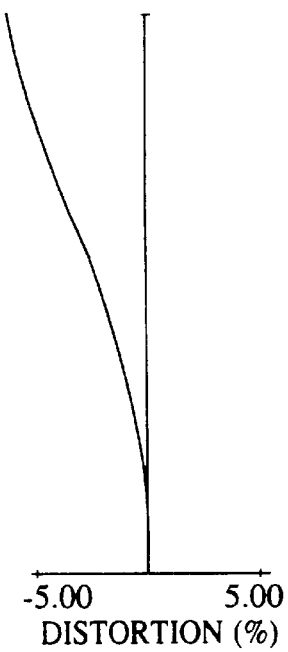
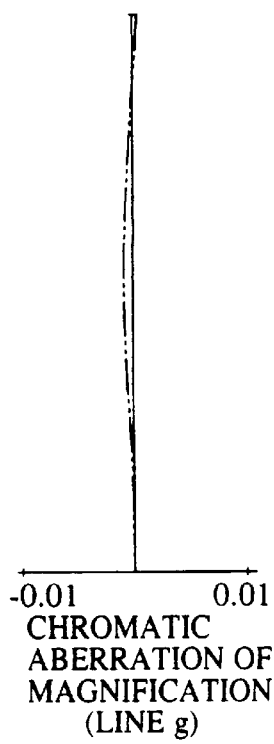
SPHERICAL ABERRATION | ASTIGMATISM | DISTORTION (%) | CHROMATIC ABERRATION OF MAGNIFICATION (LINE g)
FIG.20(B)(1)
Fno/3.59
FIG.20(B)(2)
2ω=3.52°
FIG.20(B)(3)
2ω=3.52°
FIG.20(B)(4)
2ω=3.52°
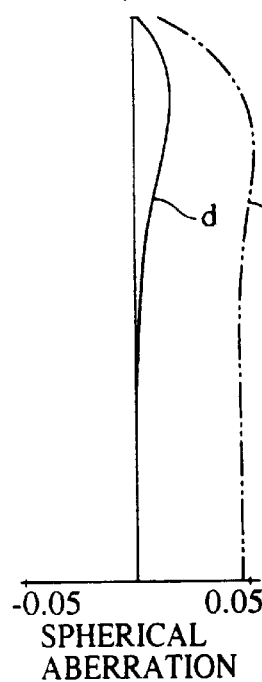
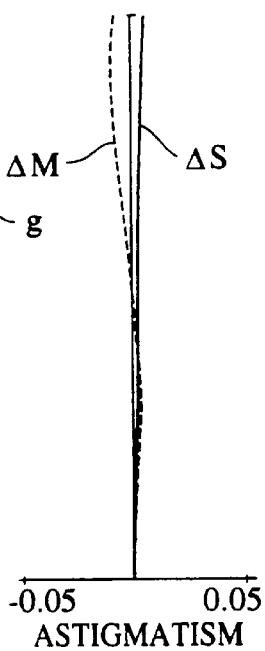
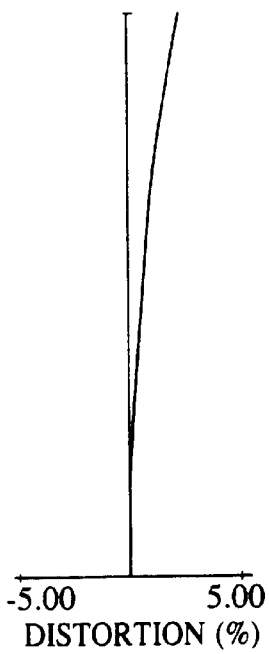
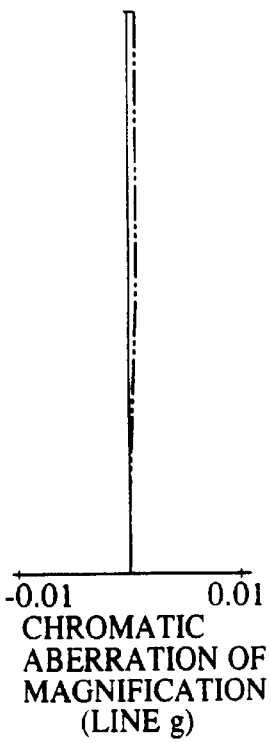
SPHERICAL ABERRATION | ASTIGMATISM | DISTORTION (%) | CHROMATIC ABERRATION OF MAGNIFICATION (LINE g)

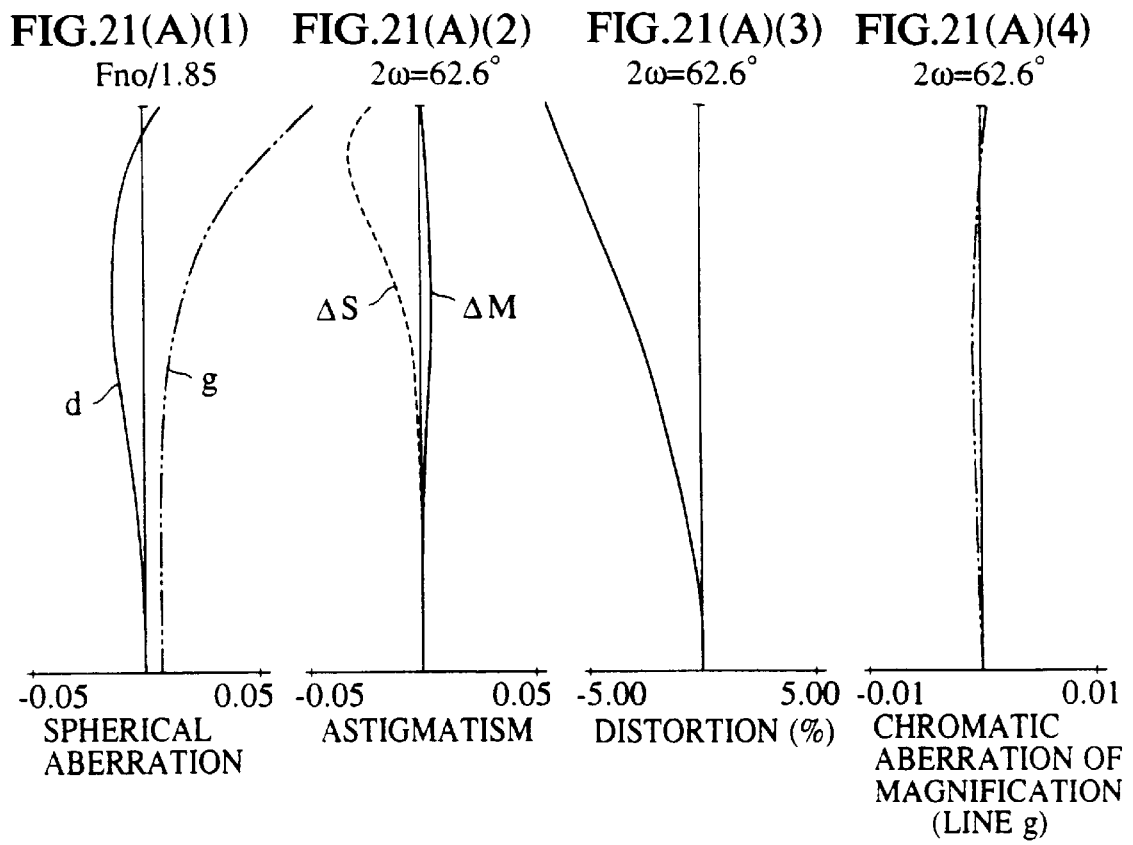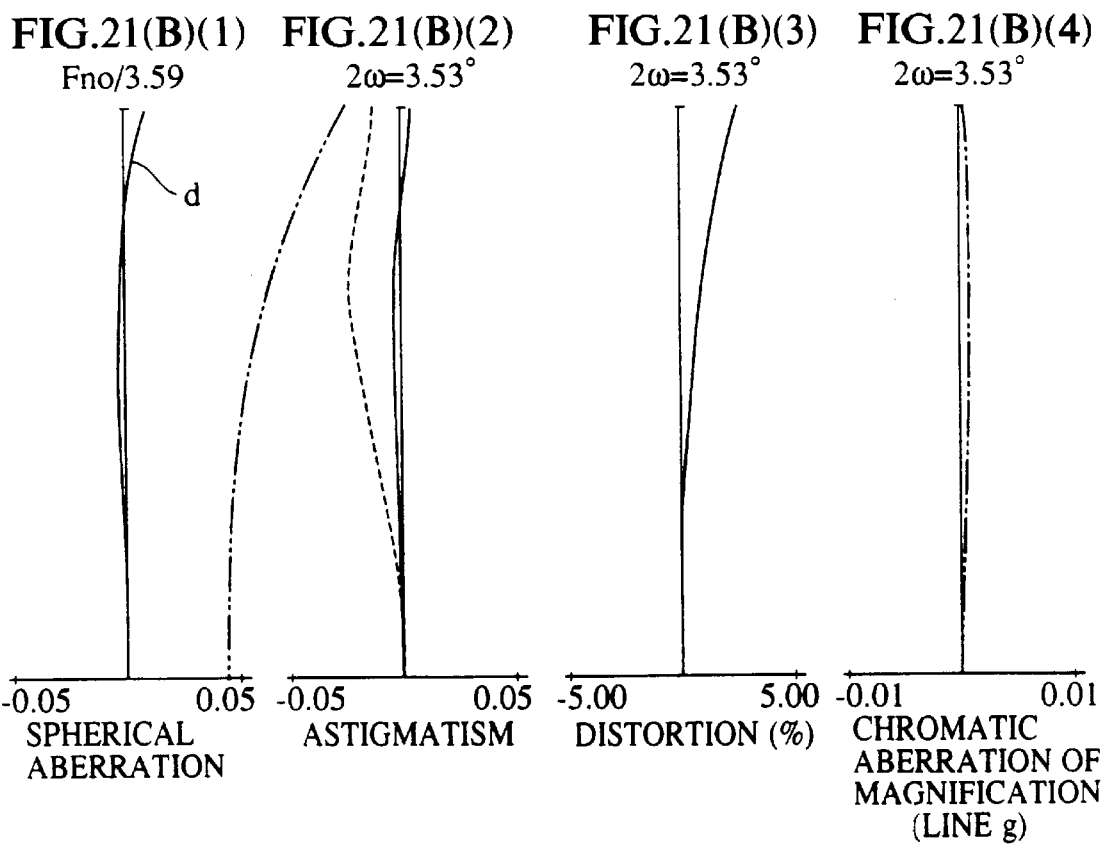

FIG.22(A)(1)
Fno/1.65
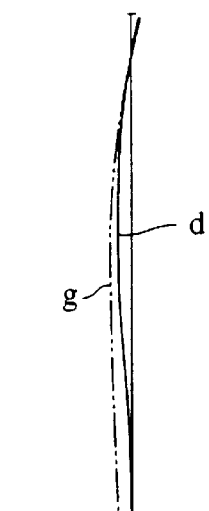
-0.05    0.05
SPHERICAL
ABERRATION
FIG.22(A)(2)
2ω=62.1°
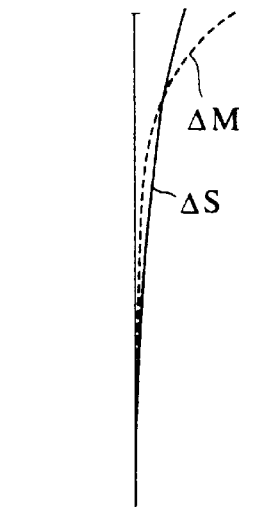
-0.05    0.05
ASTIGMATISM
FIG.22(A)(3)
2ω=62.1°
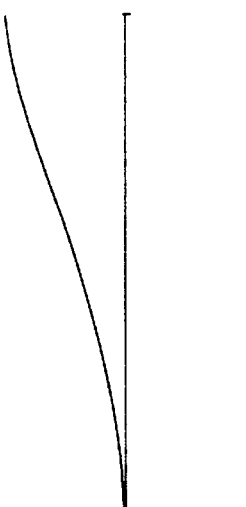
-5.00    5.00
DISTORTION (%)
FIG.22(A)(4)
2ω=62.1°
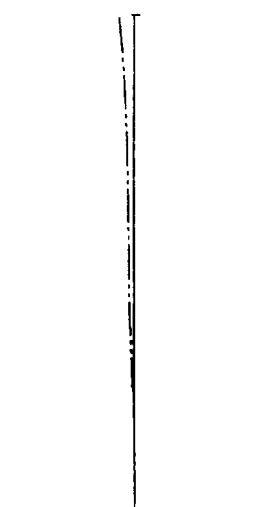
-0.01    0.01
CHROMATIC
ABERRATION OF
MAGNIFICATION
(LINE g)
FIG.22(B)(1)
Fno/3.69
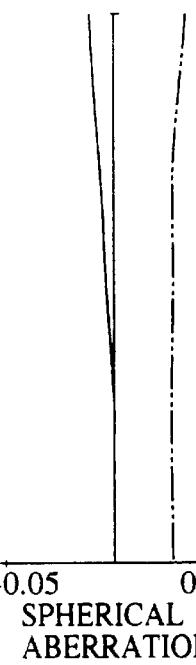
-0.05    0.05
SPHERICAL
ABERRATION
FIG.22(B)(2)
2ω=3.47°
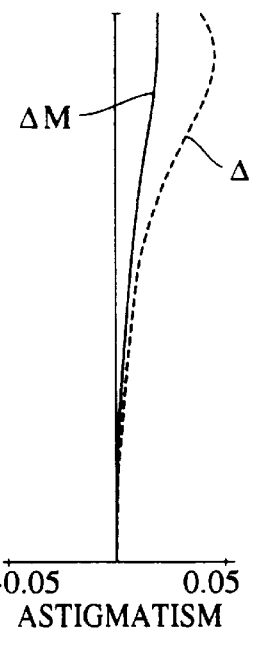
-0.05    0.05
ASTIGMATISM
FIG.22(B)(3)
2ω=3.47°
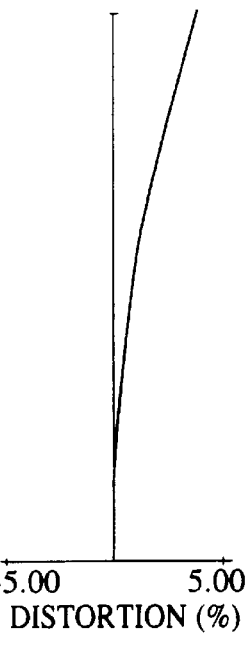
-5.00    5.00
DISTORTION (%)
FIG.22(B)(4)
2ω=3.47°
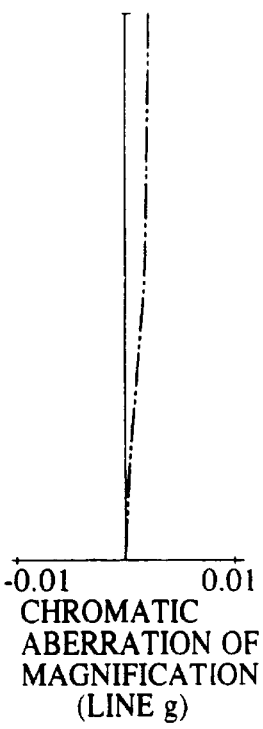
-0.01    0.01
CHROMATIC
ABERRATION OF
MAGNIFICATION
(LINE g)

FIG.23(A)(1)
Fno/1.65
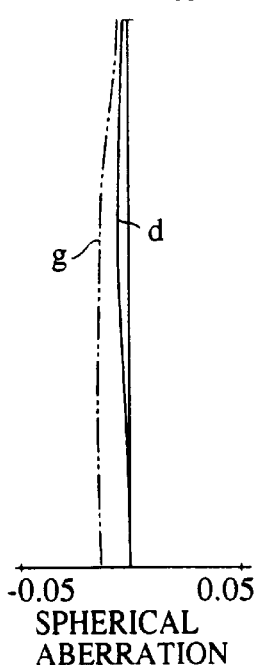
-0.05　　0.05
SPHERICAL
ABERRATION
FIG.23(A)(2)
2ω=62.1°
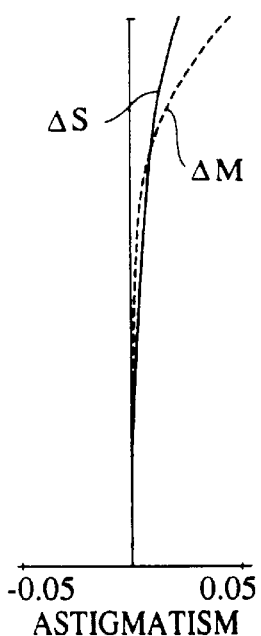
-0.05　　0.05
ASTIGMATISM
FIG.23(A)(3)
2ω=62.1°
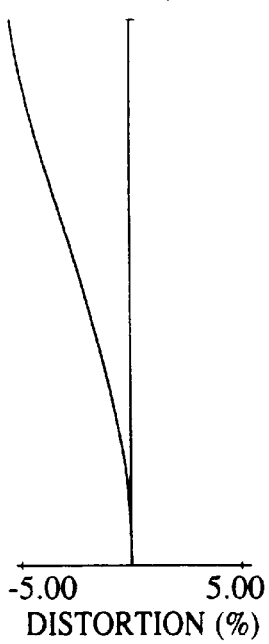
-5.00　　5.00
DISTORTION (%)
FIG.23(A)(4)
2ω=62.1°
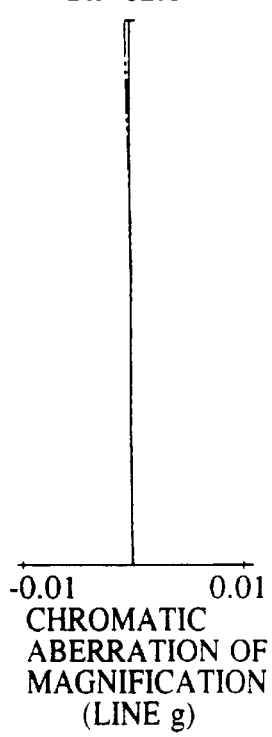
-0.01　　0.01
CHROMATIC
ABERRATION OF
MAGNIFICATION
(LINE g)
FIG.23(B)(1)
Fno/3.69
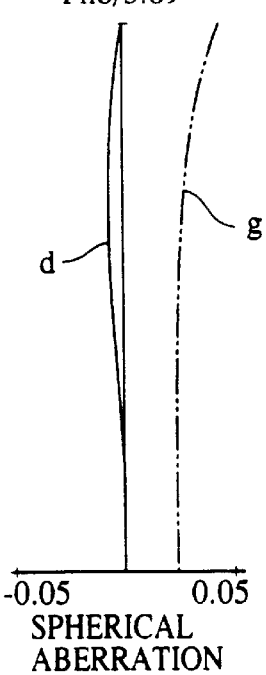
-0.05　　0.05
SPHERICAL
ABERRATION
FIG.23(B)(2)
2ω=3.47°
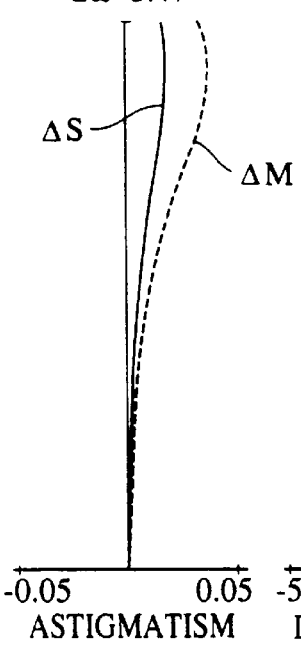
-0.05　　0.05
ASTIGMATISM
FIG.23(B)(3)
2ω=3.47°
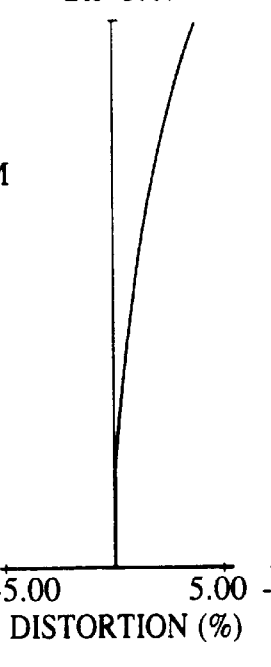
-5.00　　5.00
DISTORTION (%)
FIG.23(B)(4)
2ω=3.47°
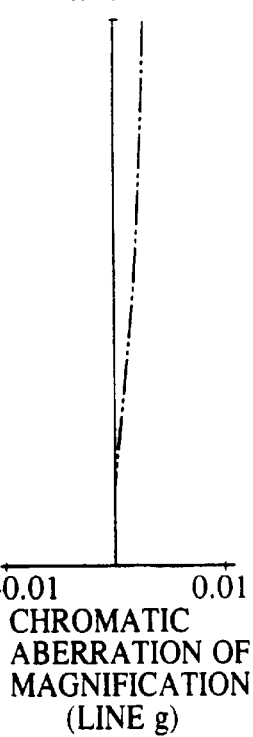
-0.01　　0.01
CHROMATIC
ABERRATION OF
MAGNIFICATION
(LINE g)

FIG.24(A)(1)
Fno/1.65
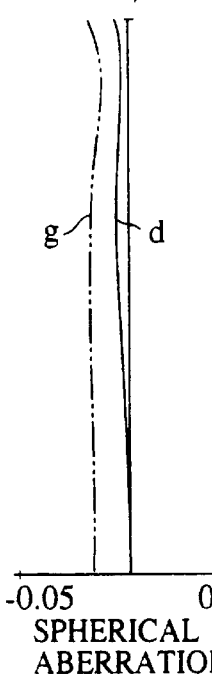
-0.05　　　0.05
SPHERICAL
ABERRATION
FIG.24(A)(2)
2ω=62.1°
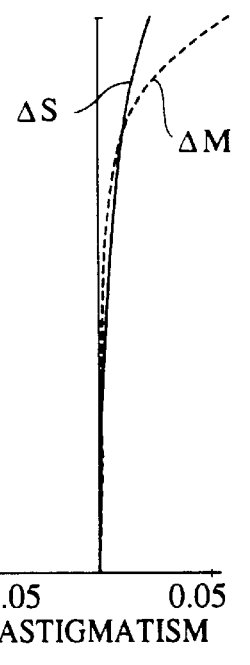
-0.05　　　0.05
ASTIGMATISM
FIG.24(A)(3)
2ω=62.1°
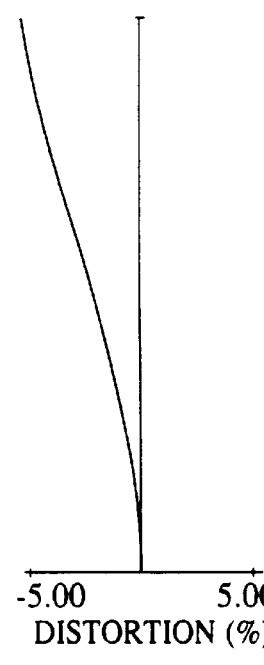
-5.00　　　5.00
DISTORTION (%)
FIG.24(A)(4)
2ω=62.1°
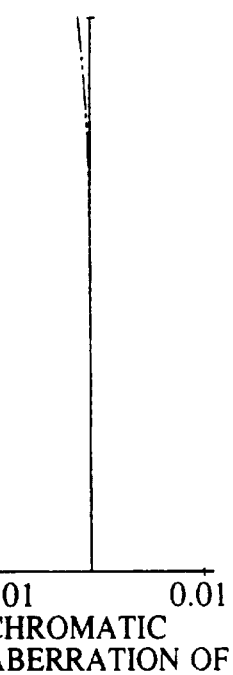
-0.01　　　0.01
CHROMATIC
ABERRATION OF
MAGNIFICATION
(LINE g)
FIG.24(B)(1)
Fno/3.69
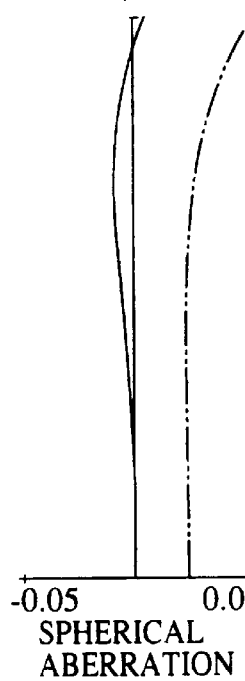
-0.05　　　0.05
SPHERICAL
ABERRATION
FIG.24(B)(2)
2ω=3.47°
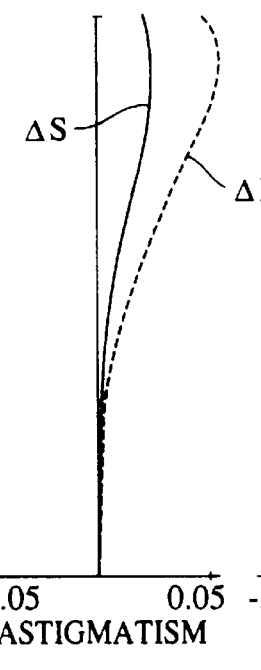
-0.05　　　0.05
ASTIGMATISM
FIG.24(B)(3)
2ω=3.47°
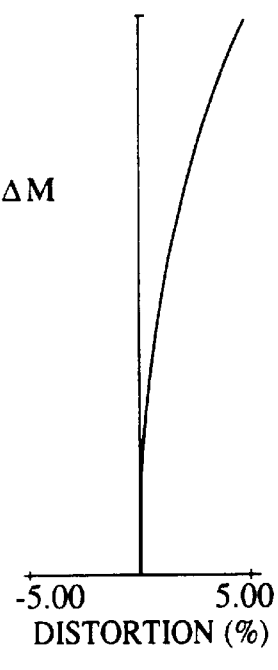
-5.00　　　5.00
DISTORTION (%)
FIG.24(B)(4)
2ω=3.47°
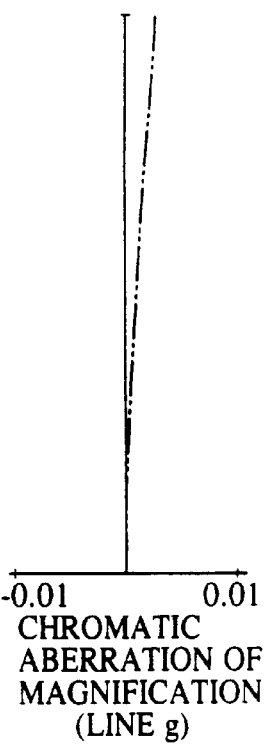
-0.01　　　0.01
CHROMATIC
ABERRATION OF
MAGNIFICATION
(LINE g)

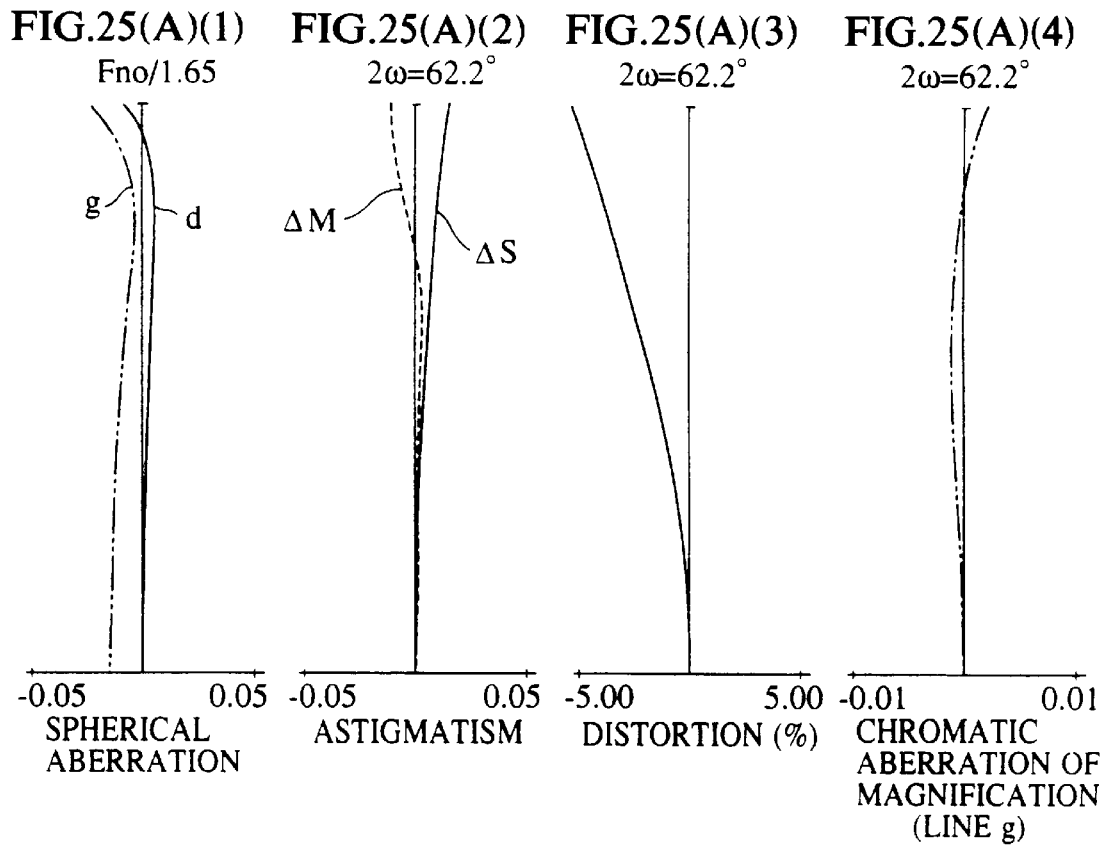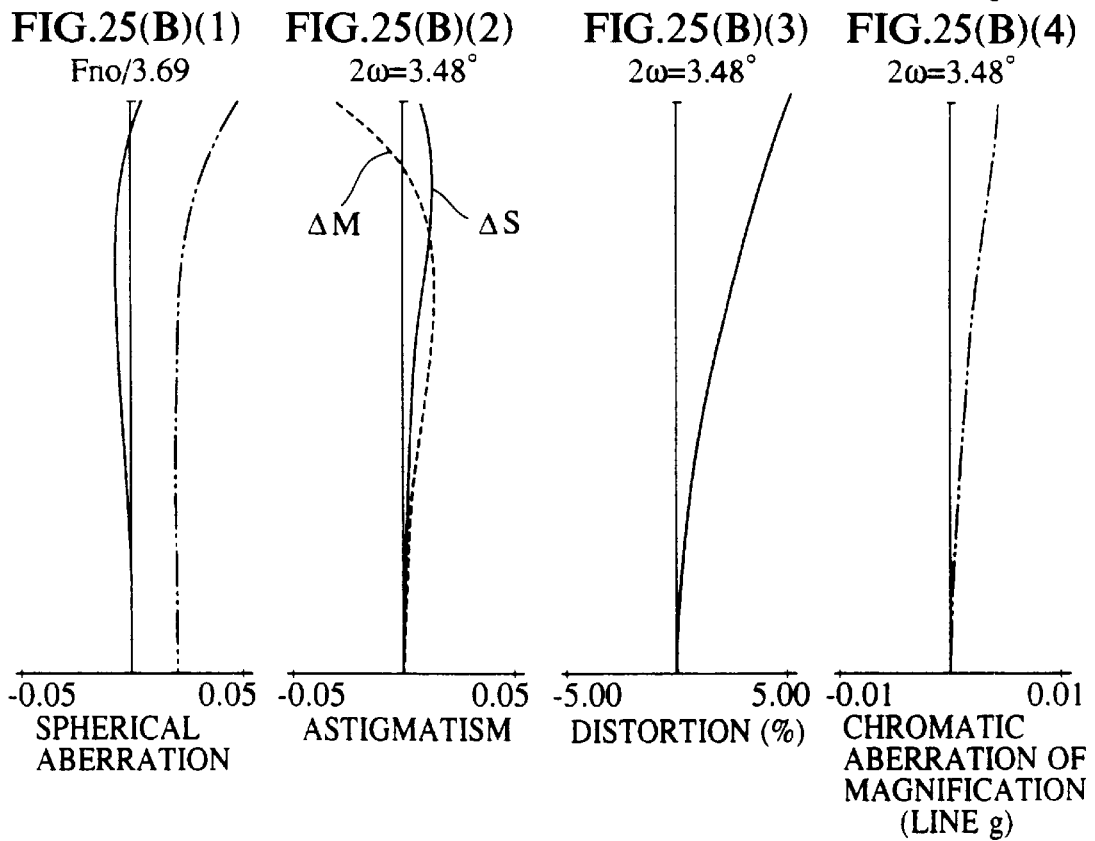

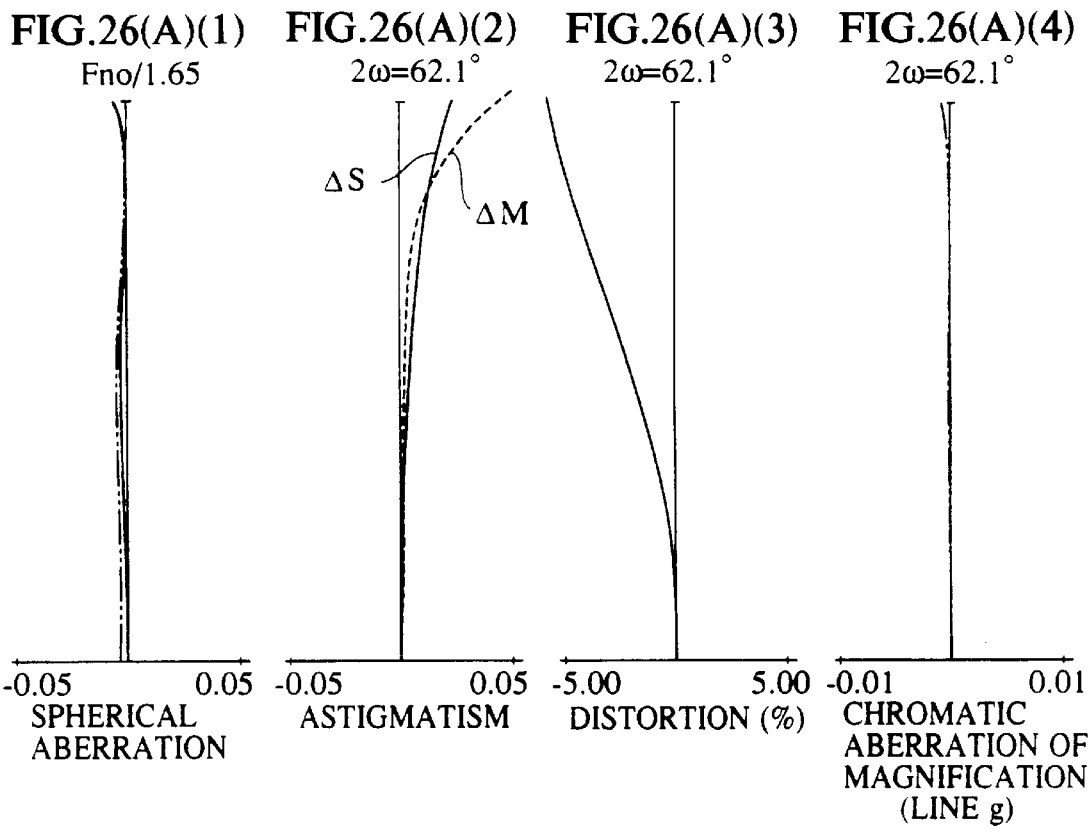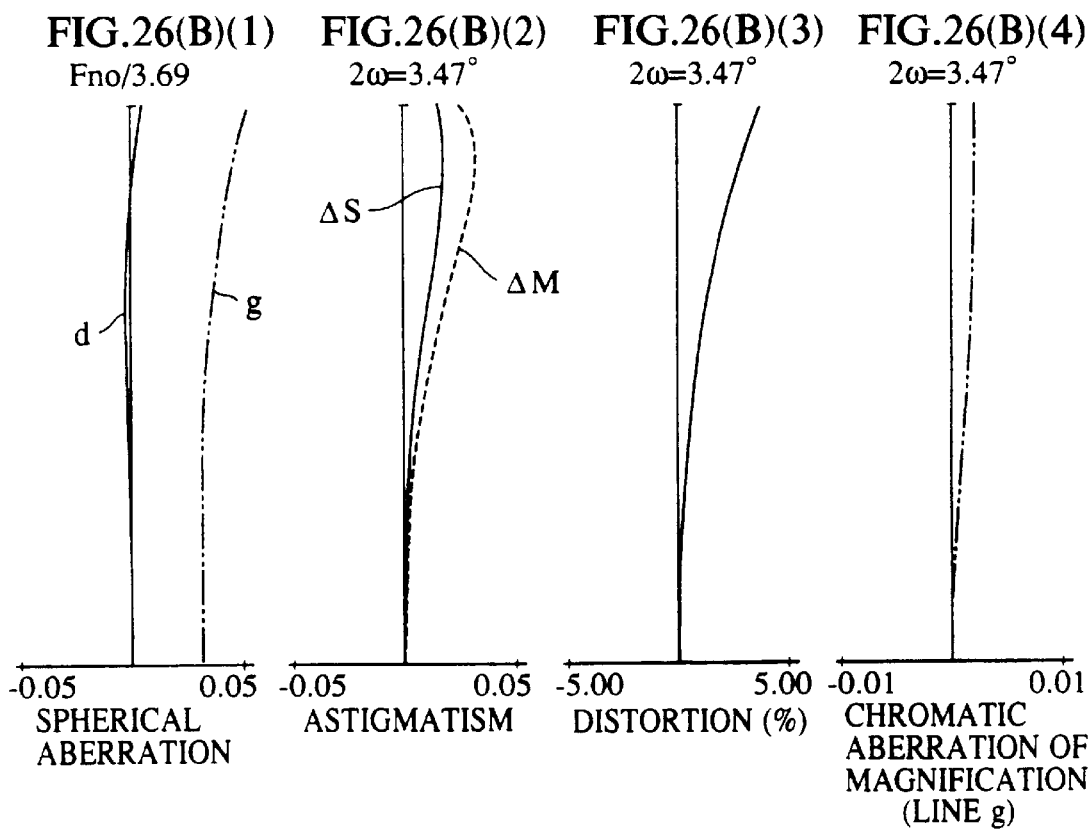

FIG.27(A)(1)
Fno/1.65
FIG.27(A)(2)
2ω=62.1°
FIG.27(A)(3)
2ω=62.1°
FIG.27(A)(4)
2ω=62.1°
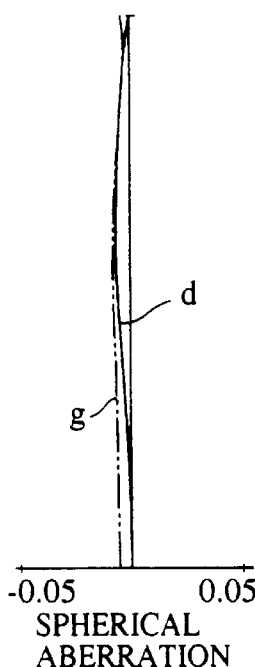
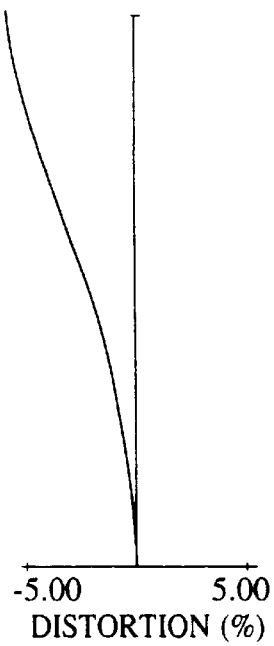
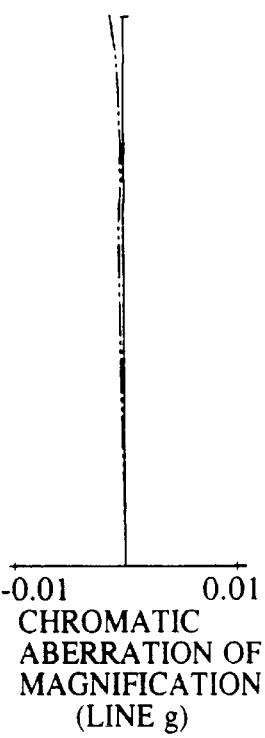
SPHERICAL ABERRATION | ASTIGMATISM | DISTORTION (%) | CHROMATIC ABERRATION OF MAGNIFICATION (LINE g)
FIG.27(B)(1)
Fno/3.69
FIG.27(B)(2)
2ω=3.47°
FIG.27(B)(3)
2ω=3.47°
FIG.27(B)(4)
2ω=3.47°
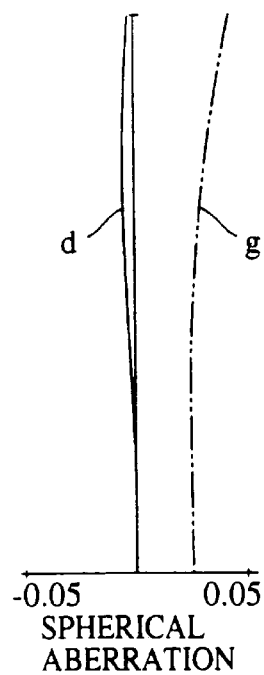
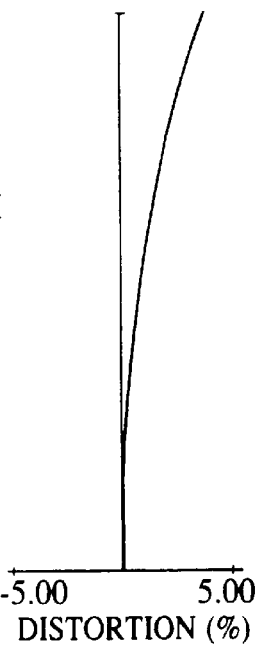
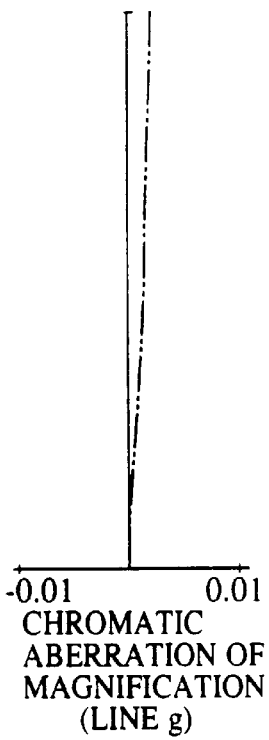
SPHERICAL ABERRATION | ASTIGMATISM | DISTORTION (%) | CHROMATIC ABERRATION OF MAGNIFICATION (LINE g)

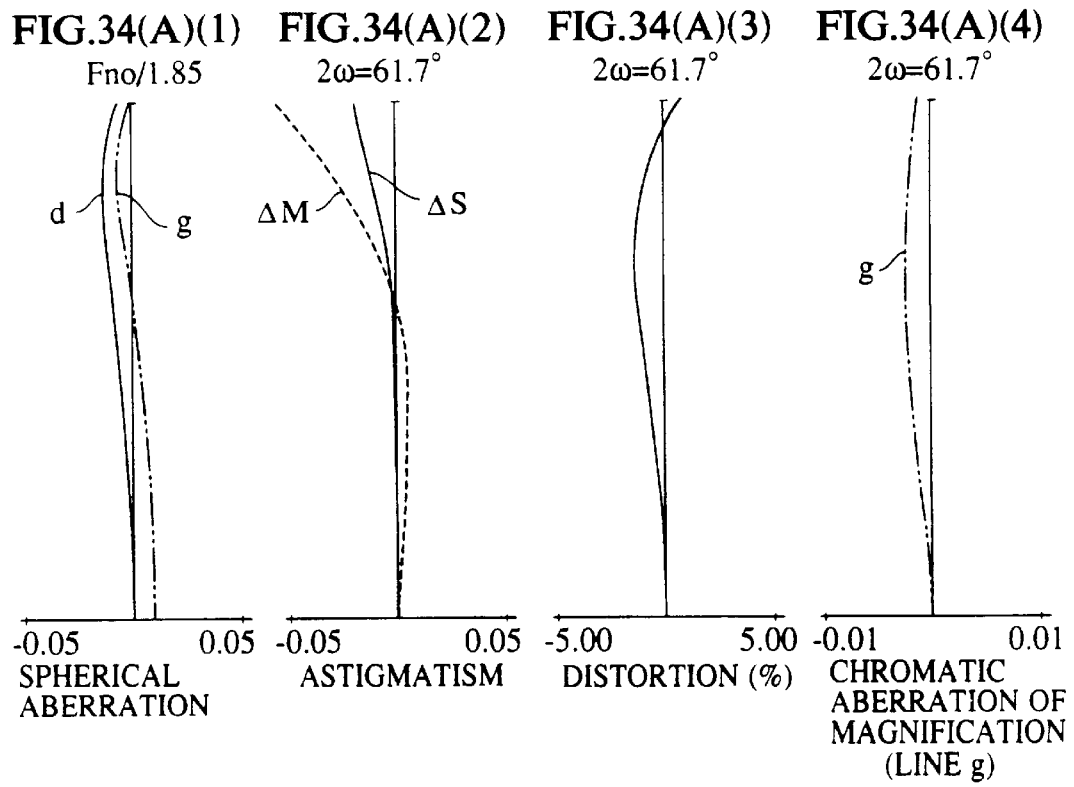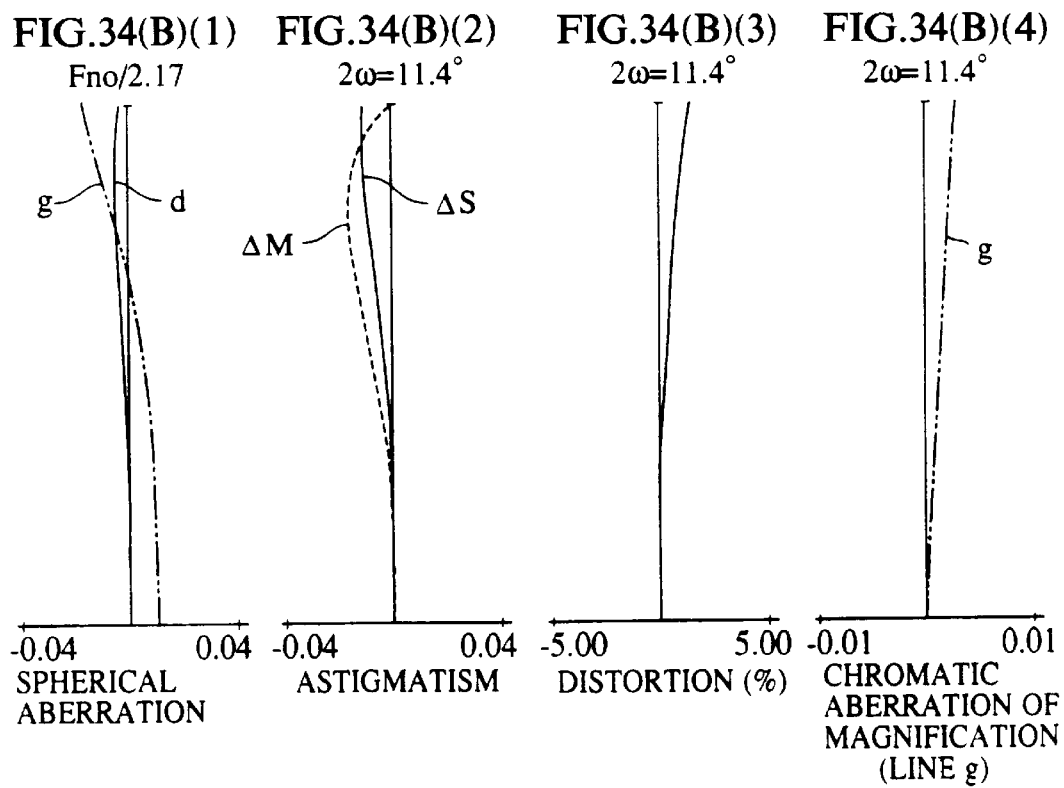

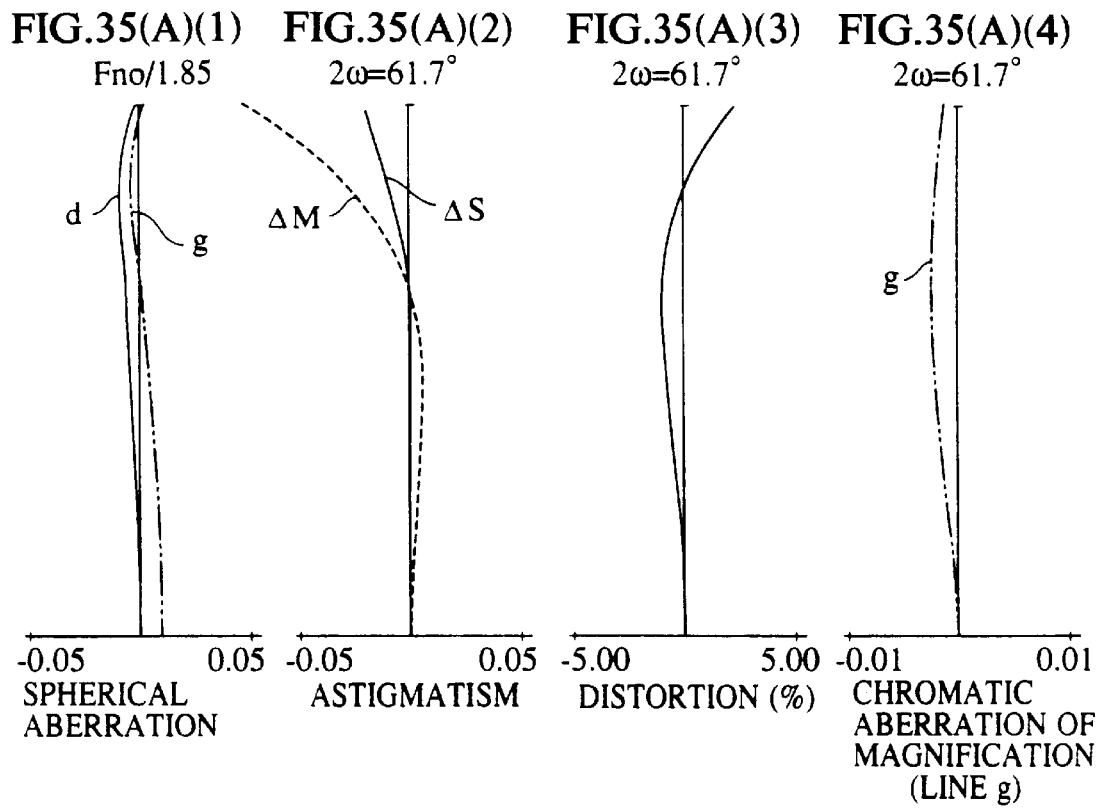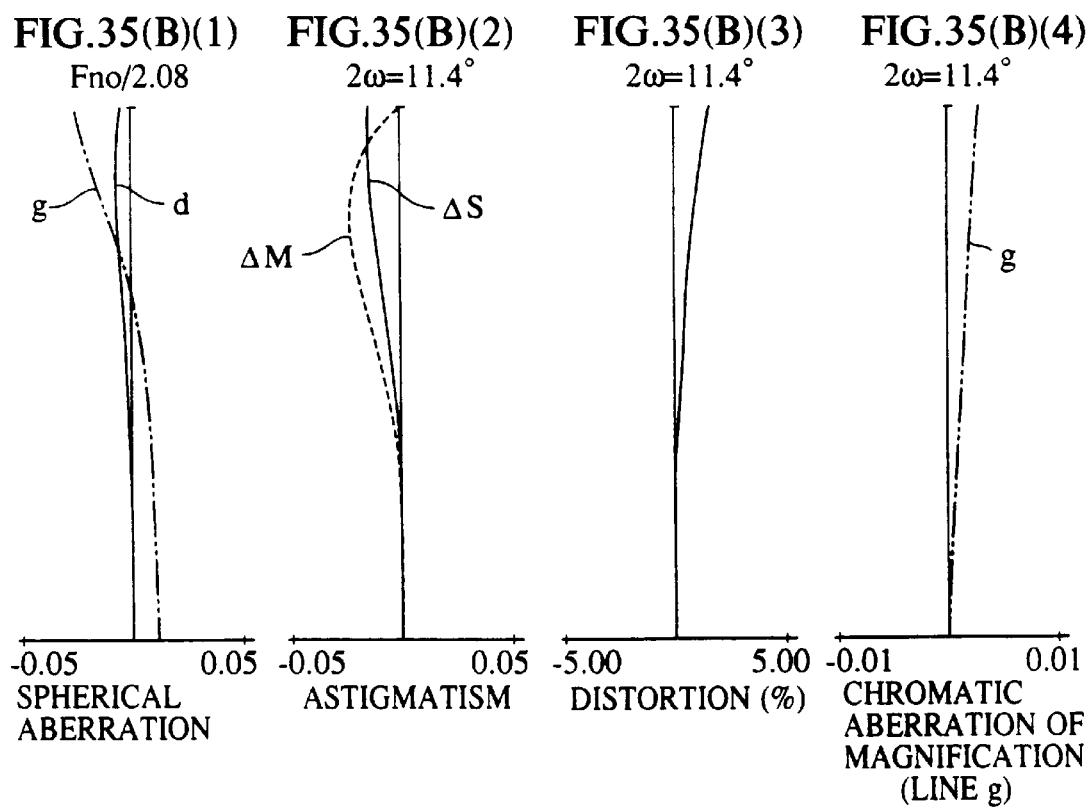

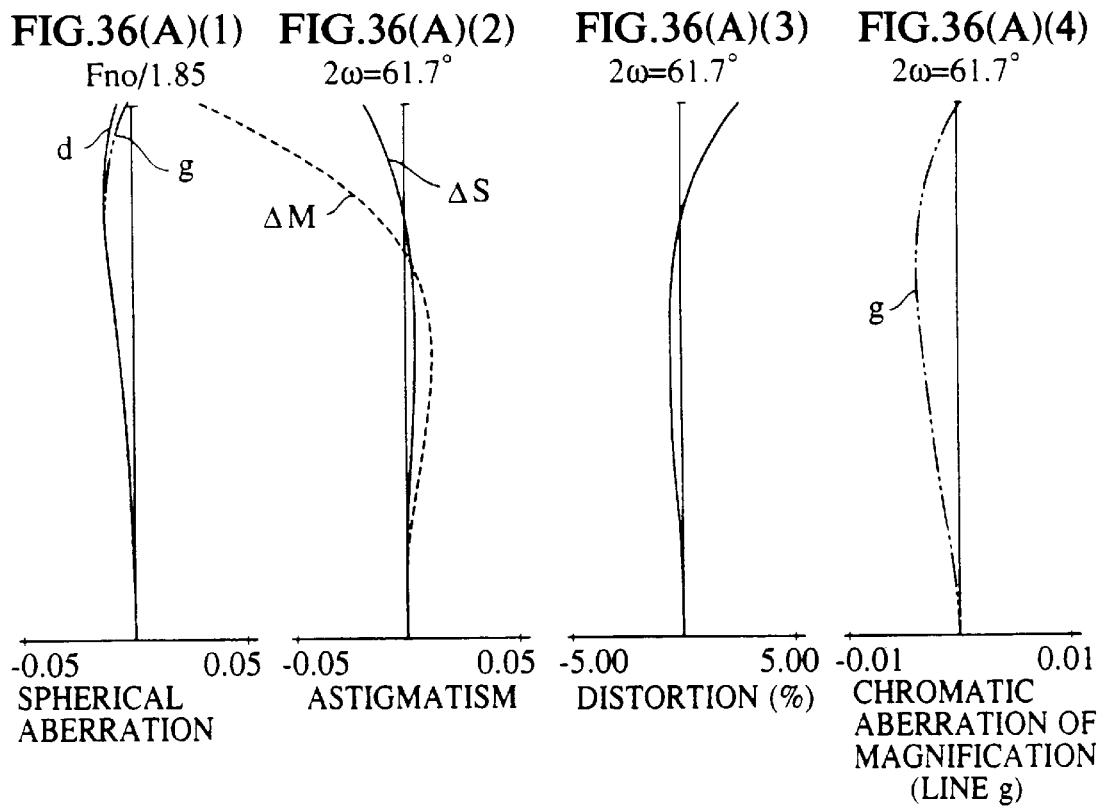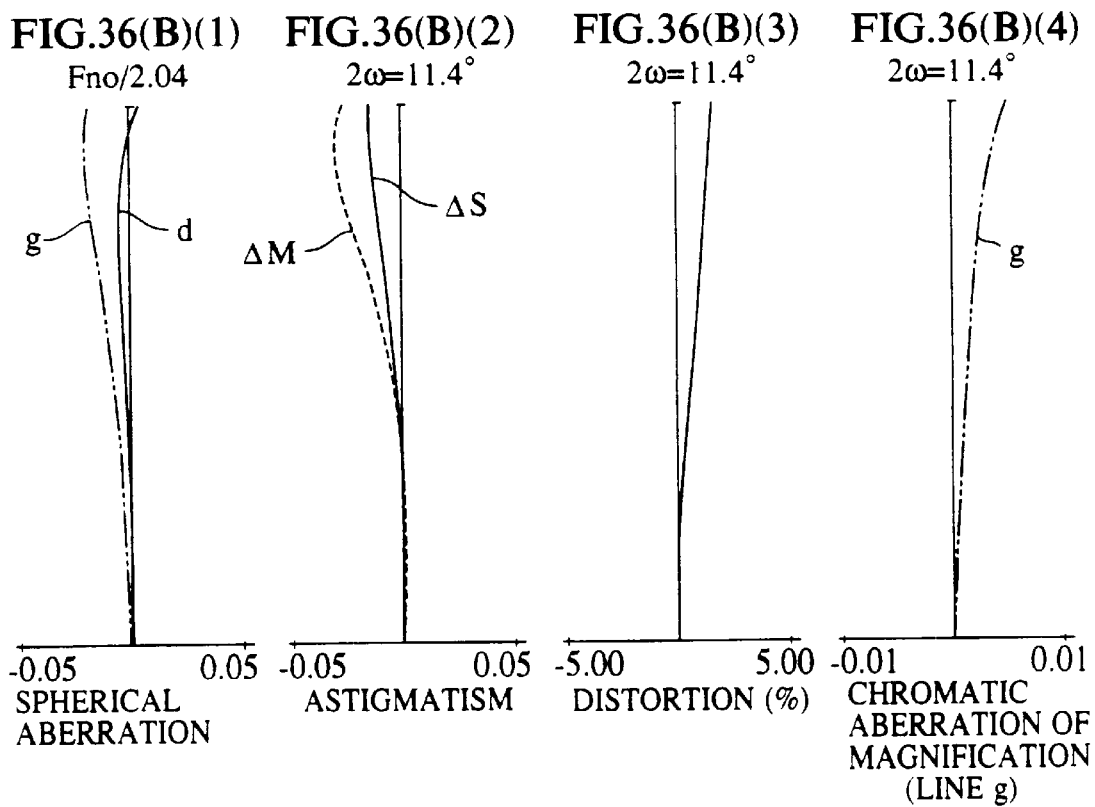

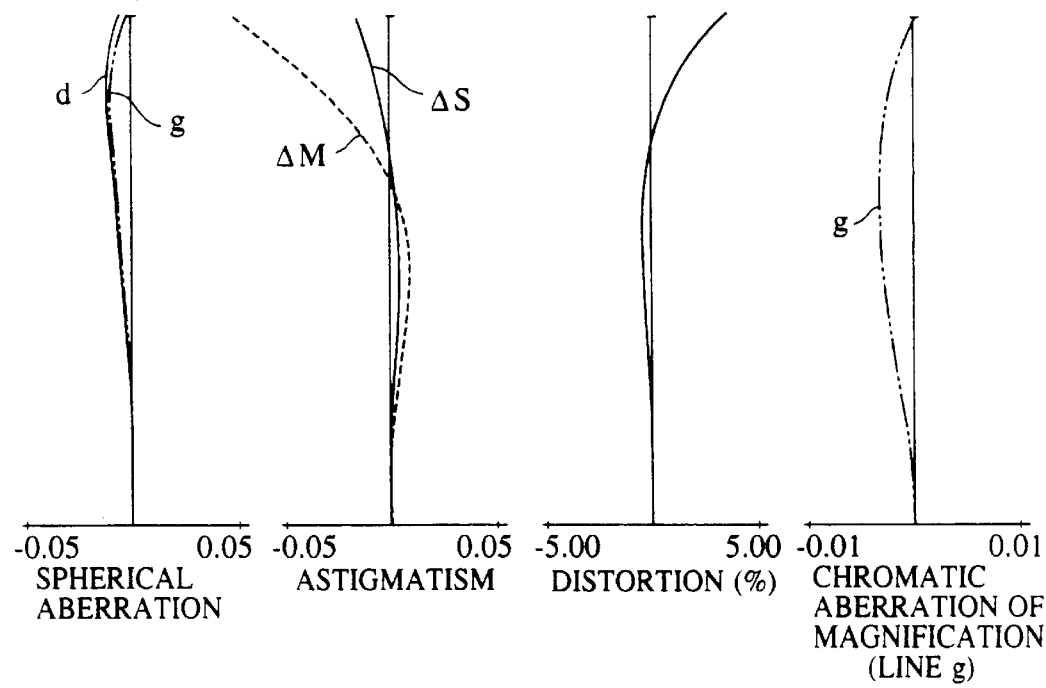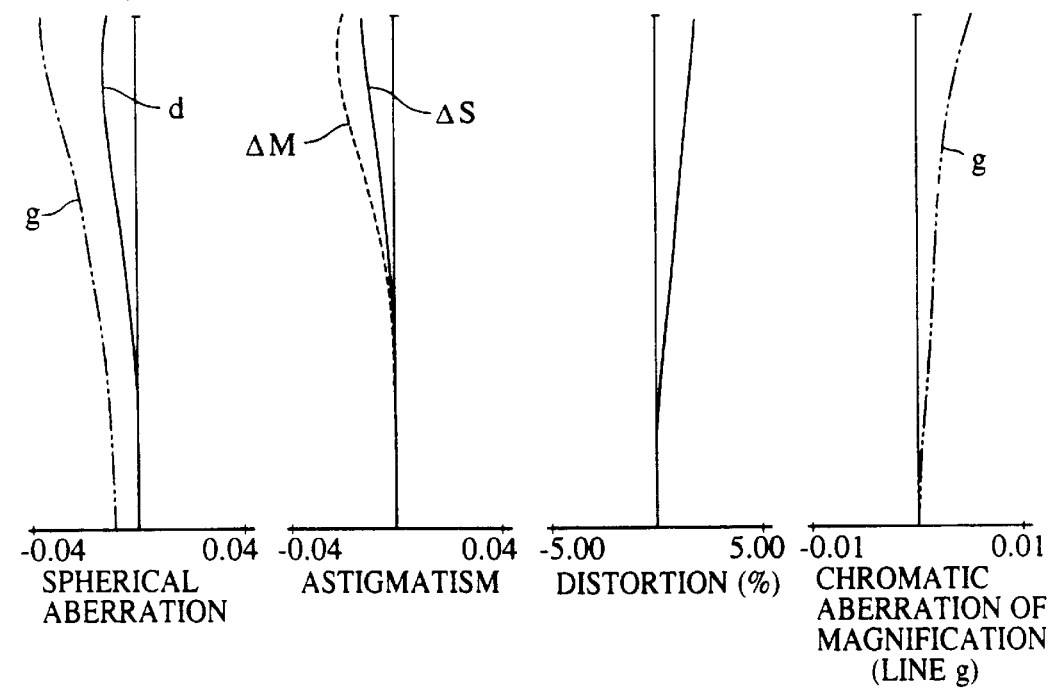

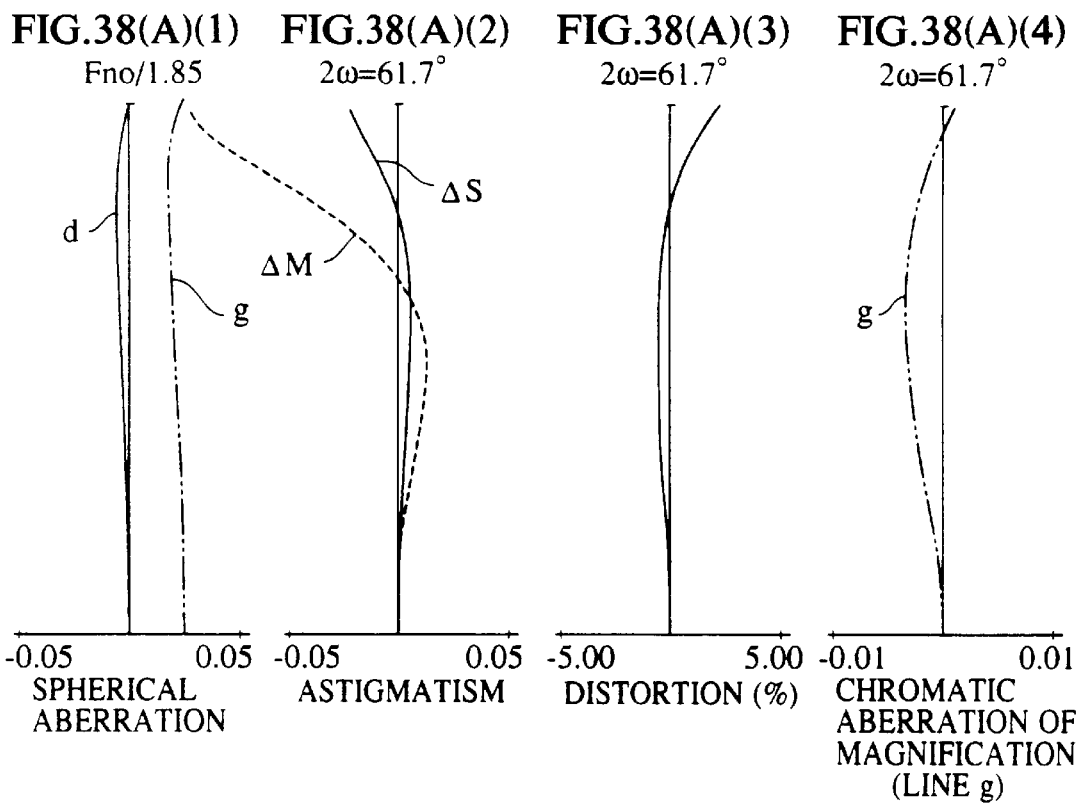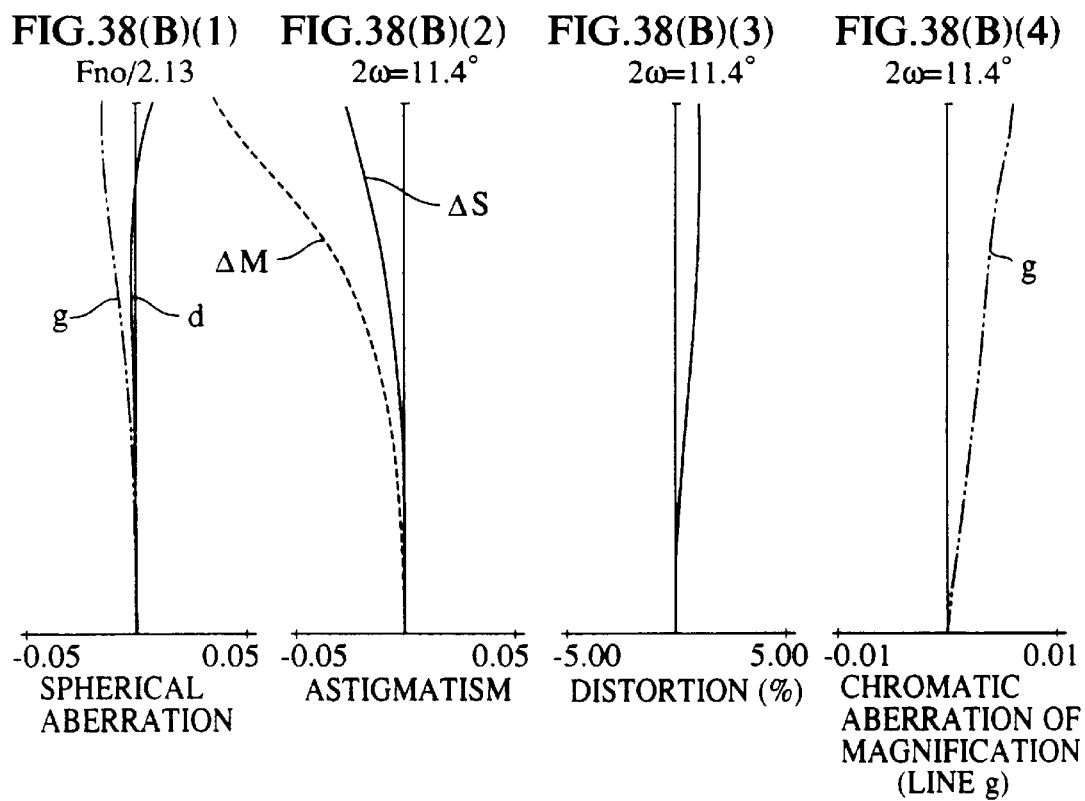

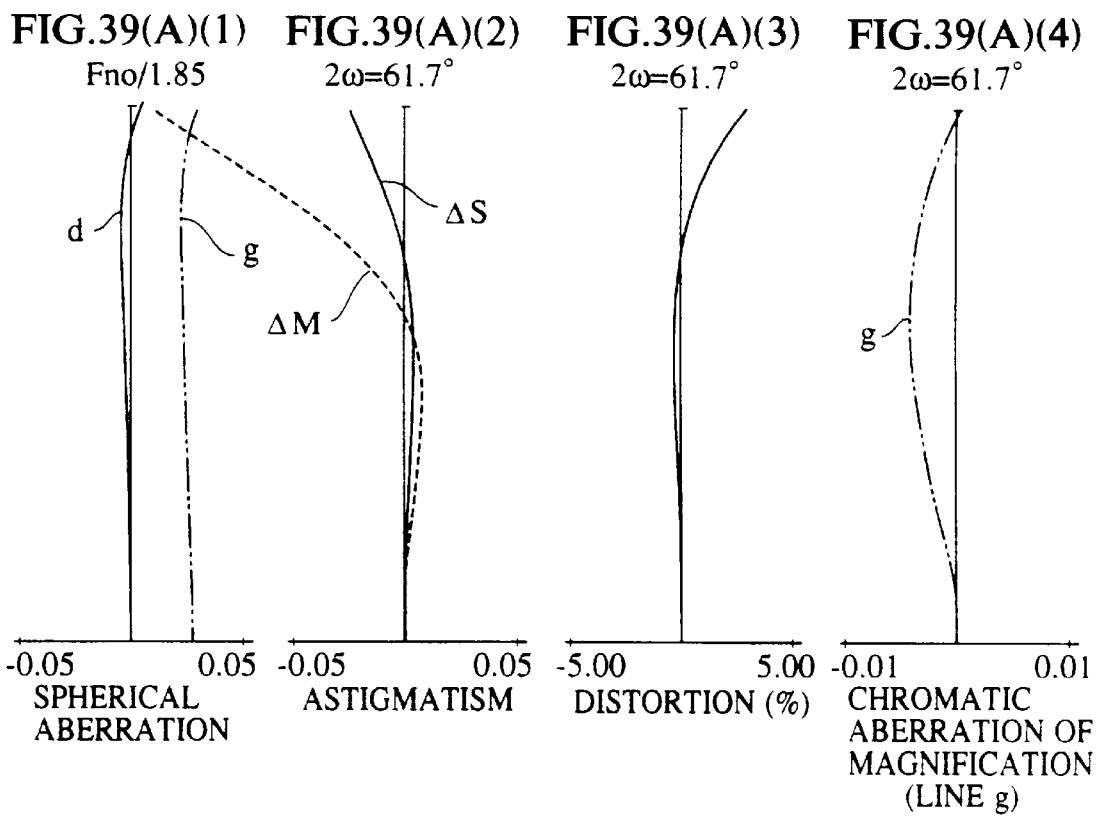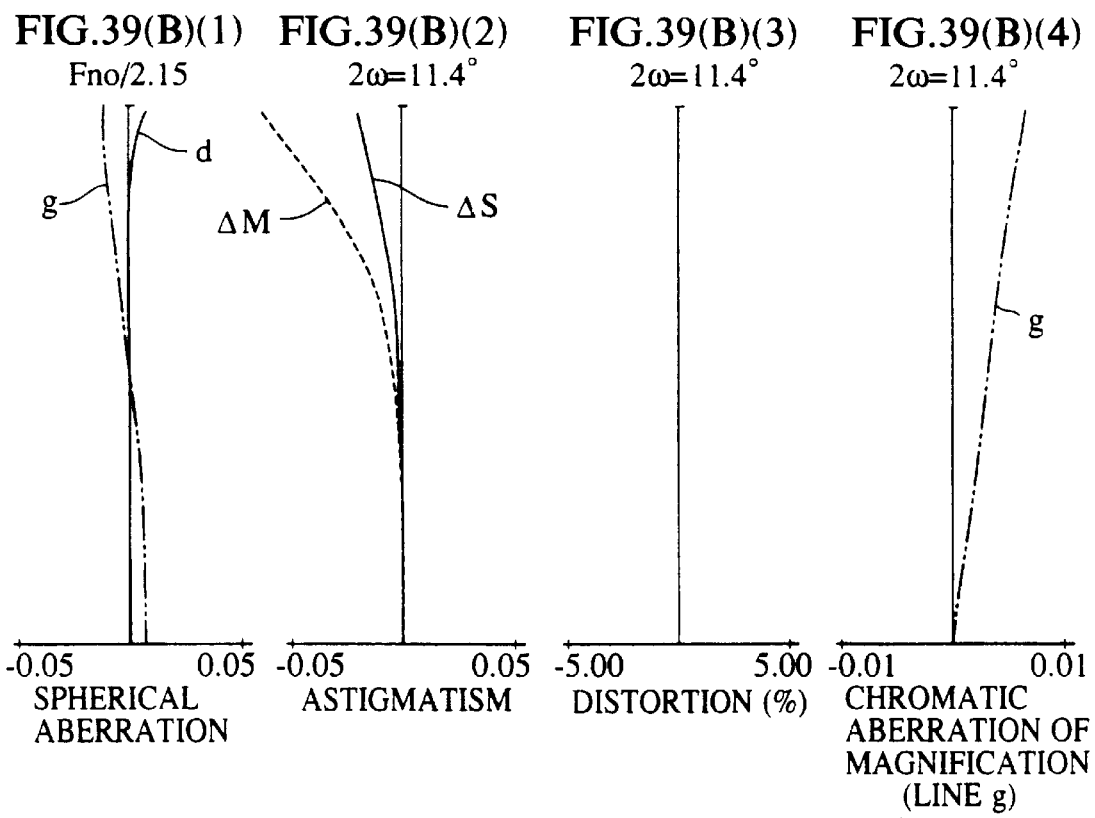

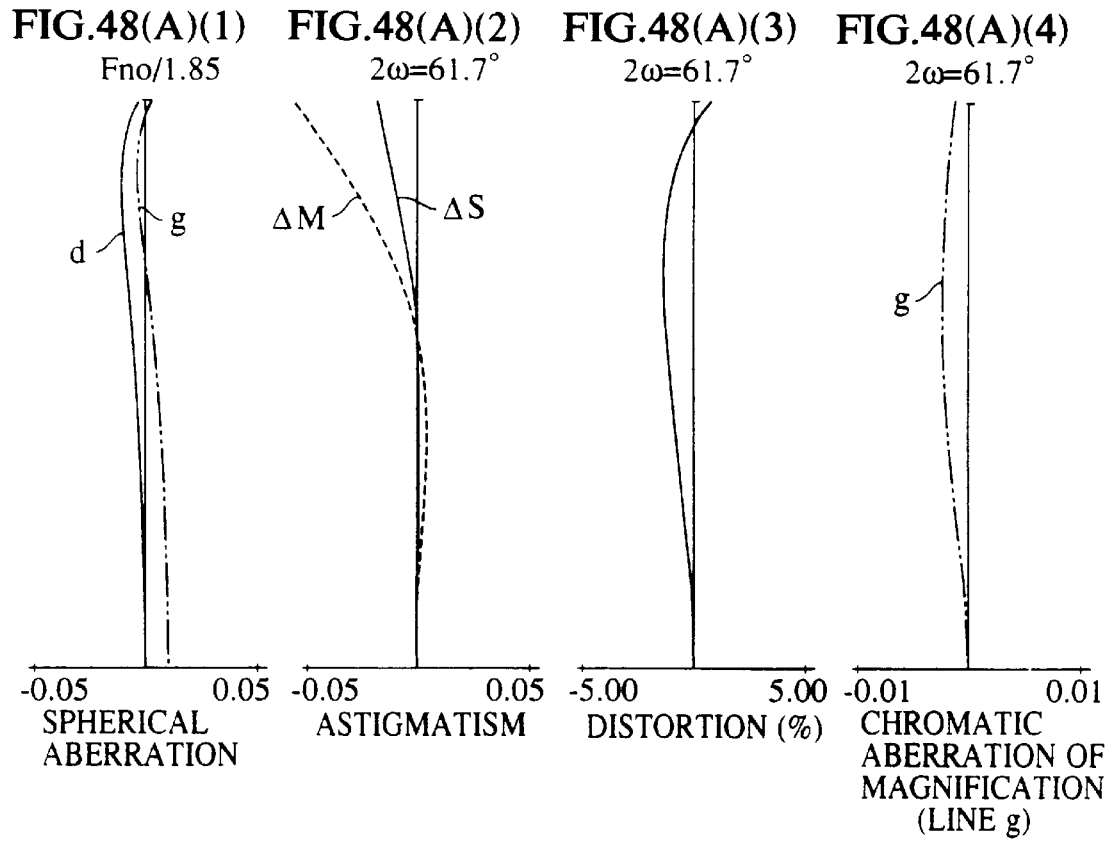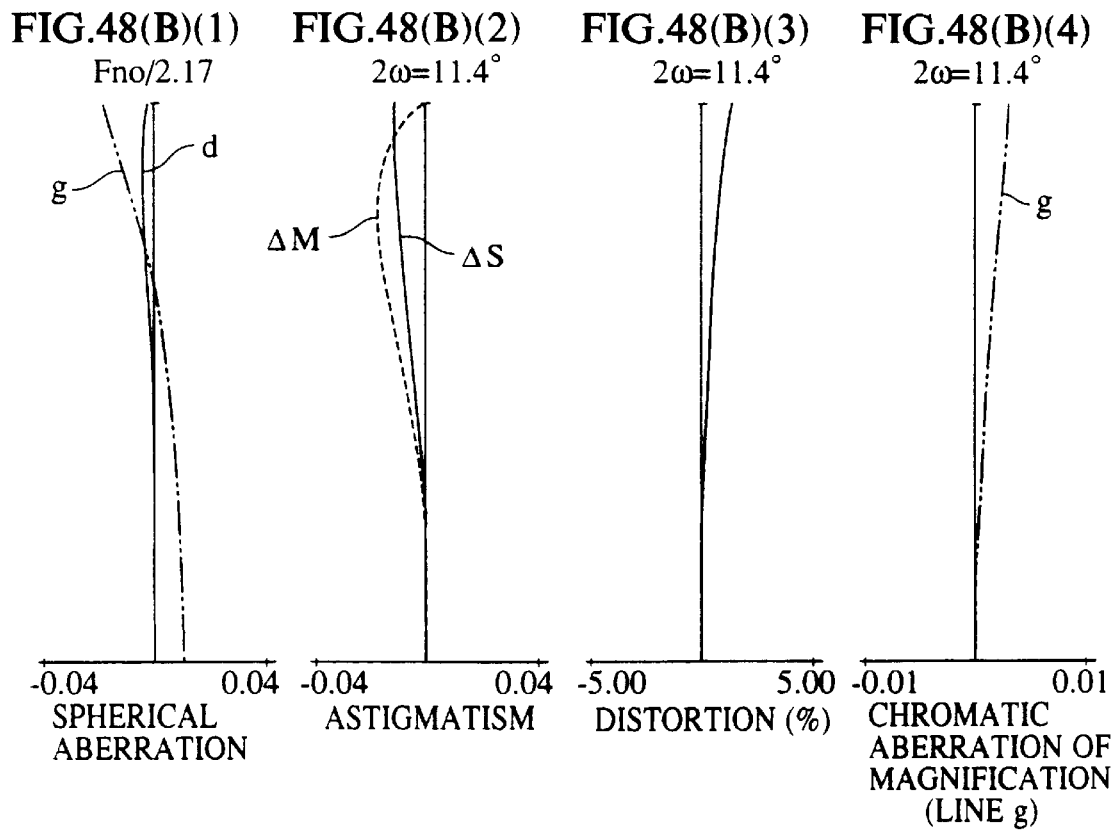

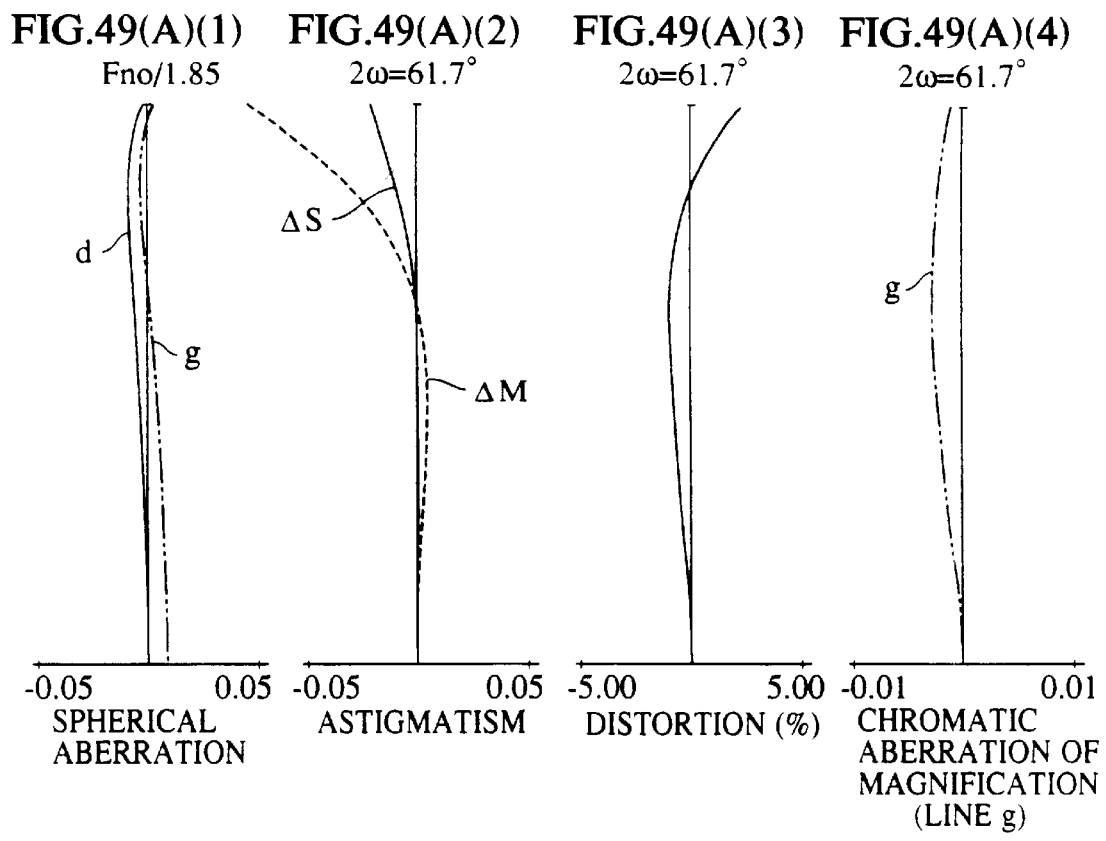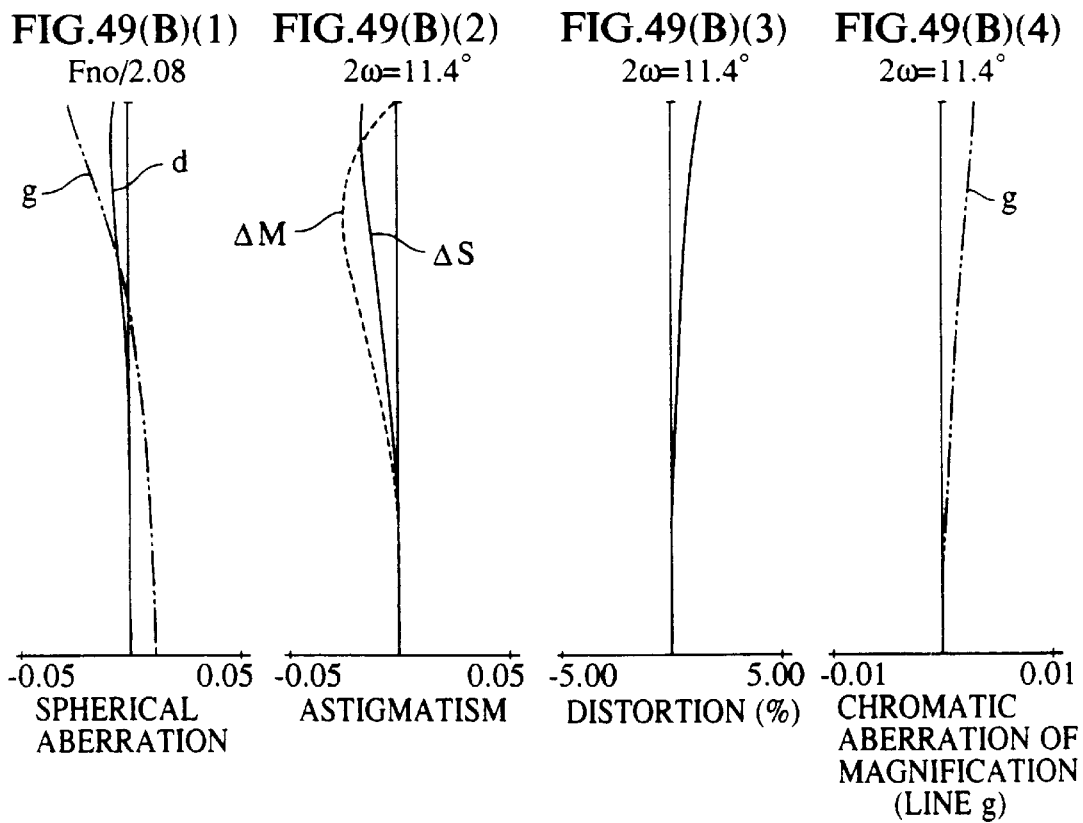

FIG.50(A)(1)
Fno/1.85
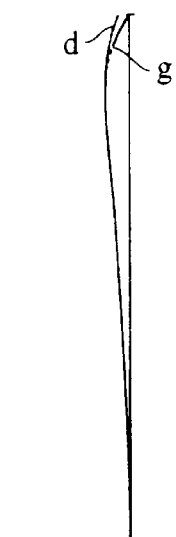
-0.05   0.05
SPHERICAL
ABERRATION
FIG.50(A)(2)
2ω=61.7°
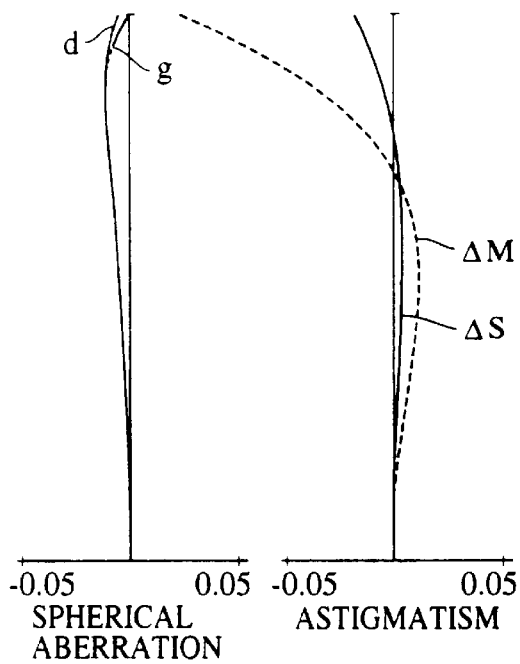
-0.05   0.05
ASTIGMATISM
FIG.50(A)(3)
2ω=61.7°
-5.00   5.00
DISTORTION (%)
FIG.50(A)(4)
2ω=61.7°
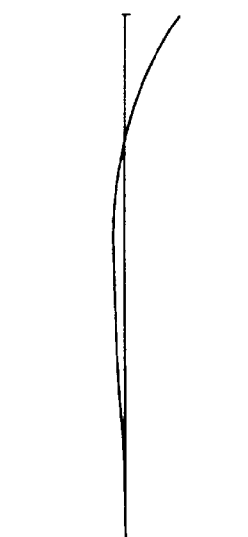
-0.01   0.01
CHROMATIC
ABERRATION OF
MAGNIFICATION
(LINE g)
FIG.50(B)(1)
Fno/2.04
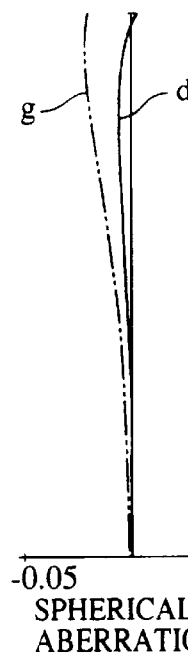
-0.05   0.05
SPHERICAL
ABERRATION
FIG.50(B)(2)
2ω=11.4°
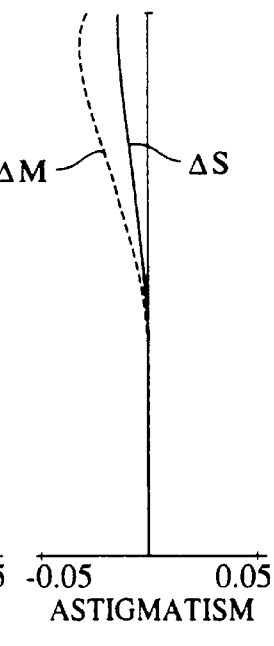
-0.05   0.05
ASTIGMATISM
FIG.50(B)(3)
2ω=11.4°
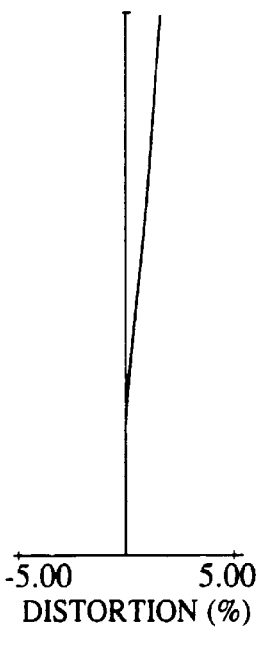
-5.00   5.00
DISTORTION (%)
FIG.50(B)(4)
2ω=11.4°
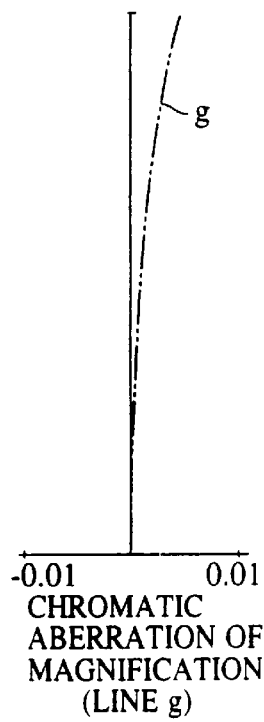
-0.01   0.01
CHROMATIC
ABERRATION OF
MAGNIFICATION
(LINE g)

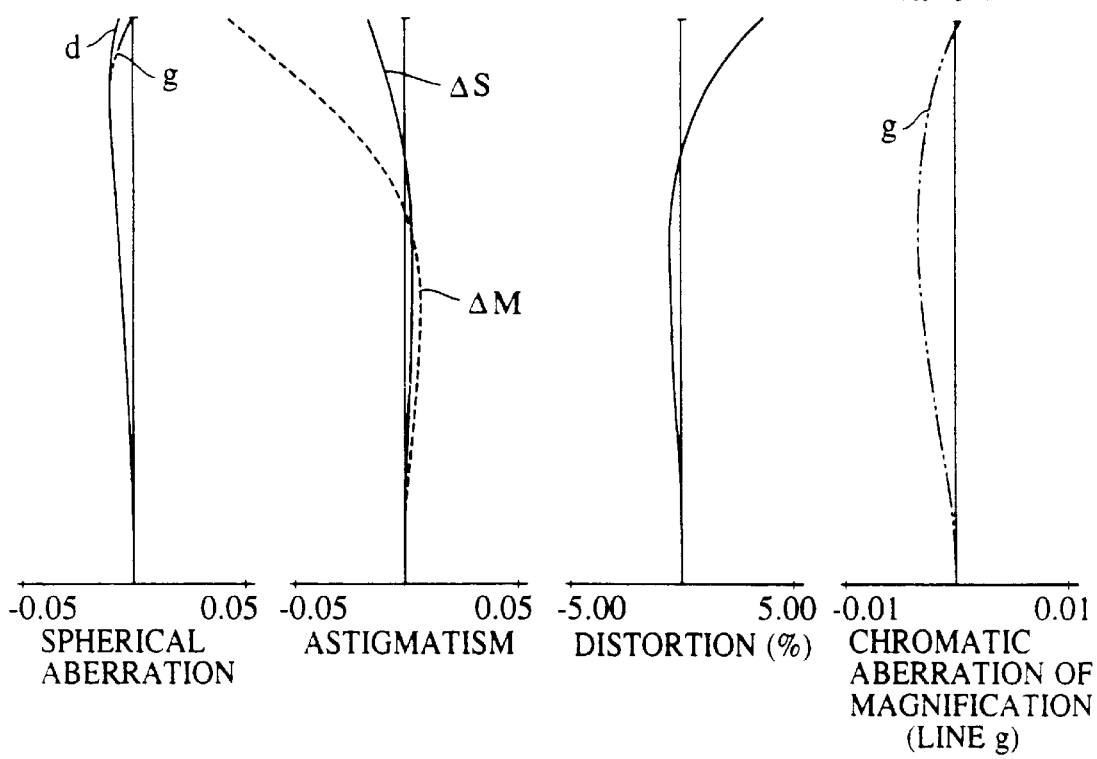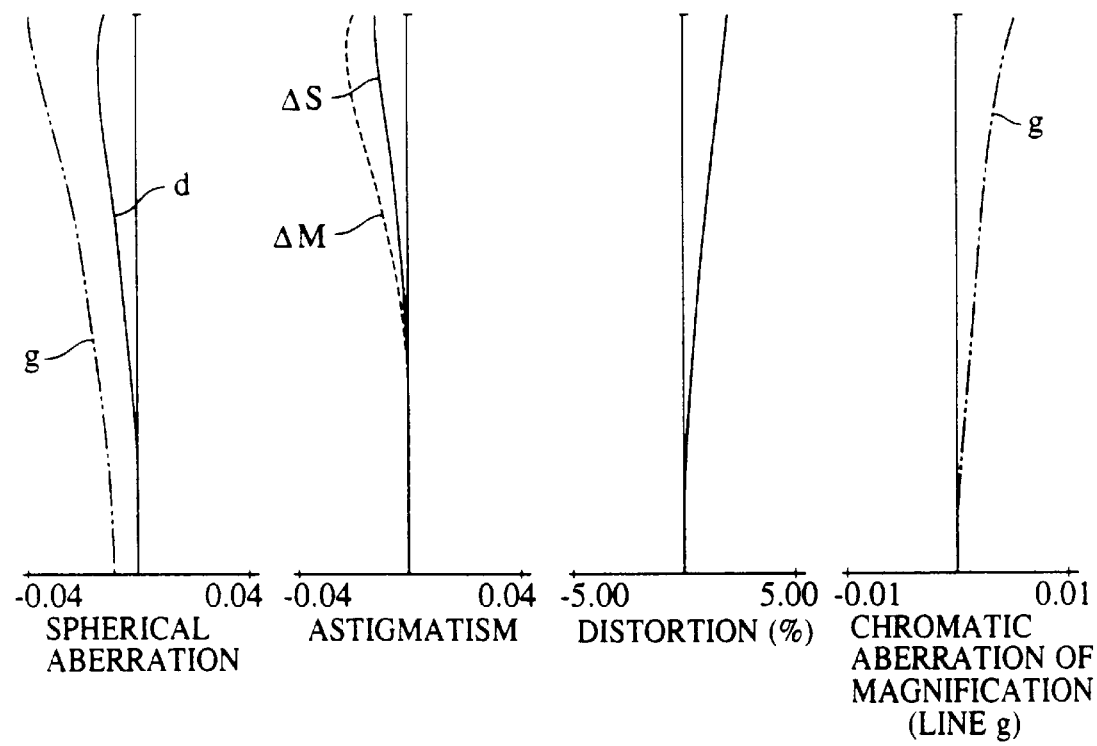

FIG.52(A)(1)
Fno/1.85
FIG.52(A)(2)
2ω=61.7°
FIG.52(A)(3)
2ω=61.7°
FIG.52(A)(4)
2ω=61.7°
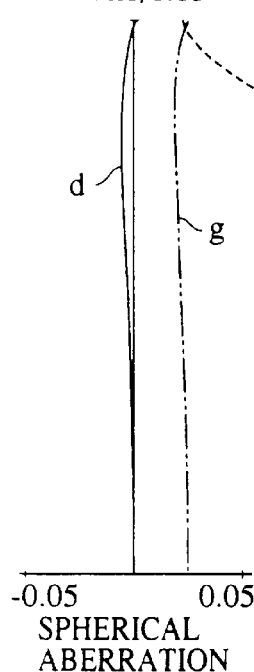
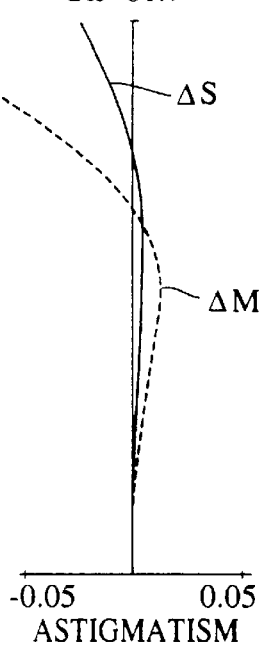
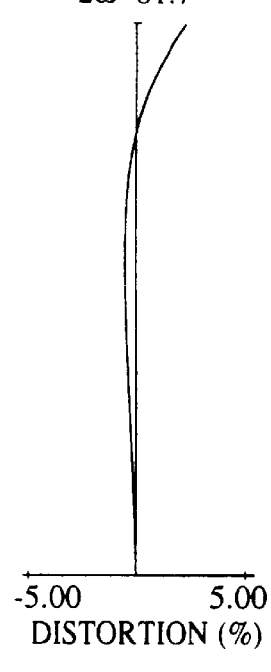
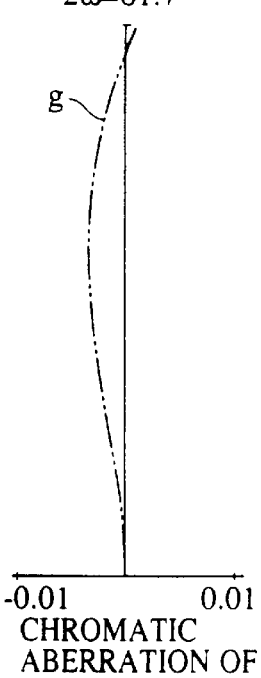
SPHERICAL ABERRATION | ASTIGMATISM | DISTORTION (%) | CHROMATIC ABERRATION OF MAGNIFICATION (LINE g)
FIG.52(B)(1)
Fno/2.13
FIG.52(B)(2)
2ω=11.4°
FIG.52(B)(3)
2ω=11.4°
FIG.52(B)(4)
2ω=11.4°
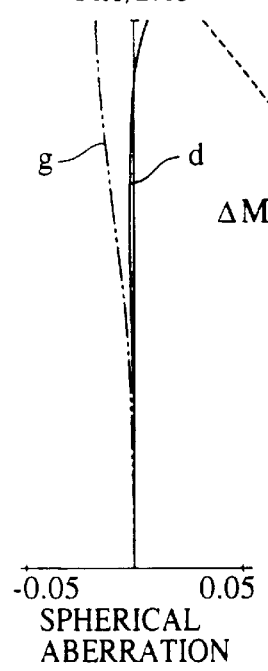
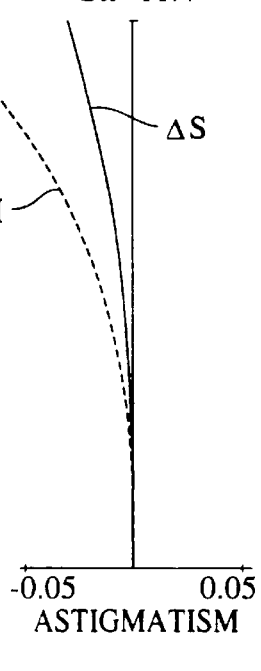
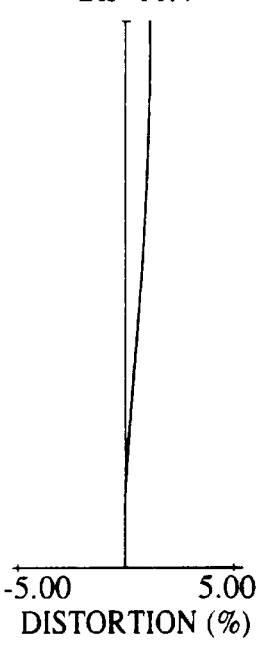
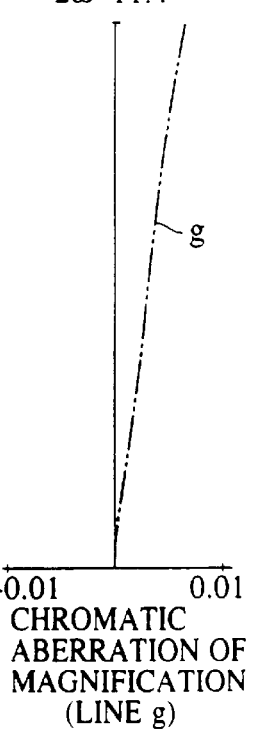
SPHERICAL ABERRATION | ASTIGMATISM | DISTORTION (%) | CHROMATIC ABERRATION OF MAGNIFICATION (LINE g)

FIG.53(A)(1)
Fno/1.85
FIG.53(A)(2)
2ω=61.7°
FIG.53(A)(3)
2ω=61.7°
FIG.53(A)(4)
2ω=61.7°
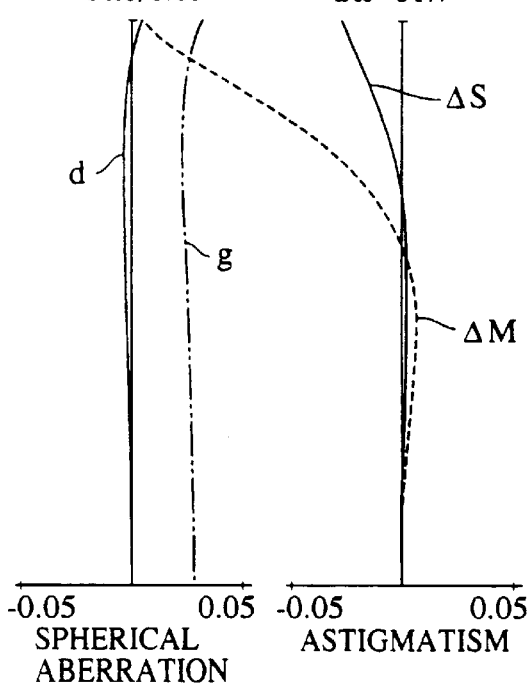
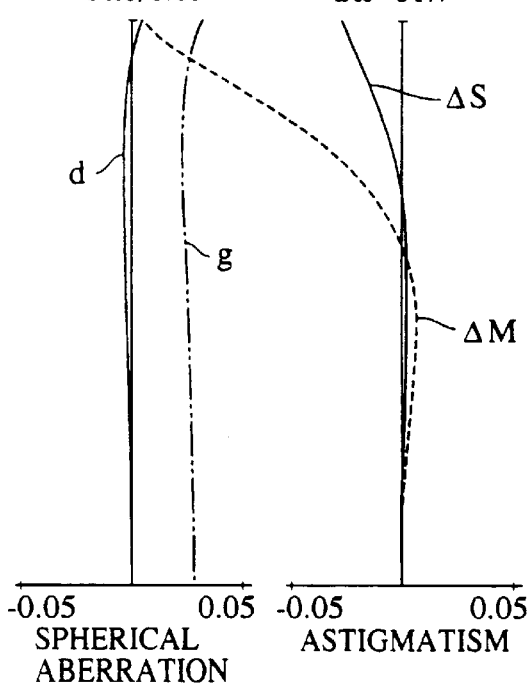
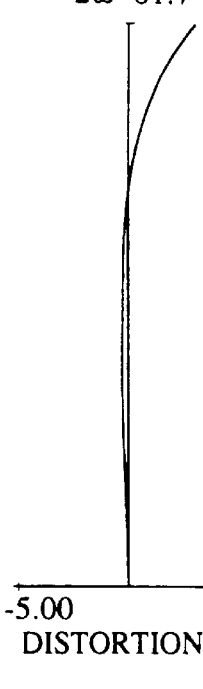
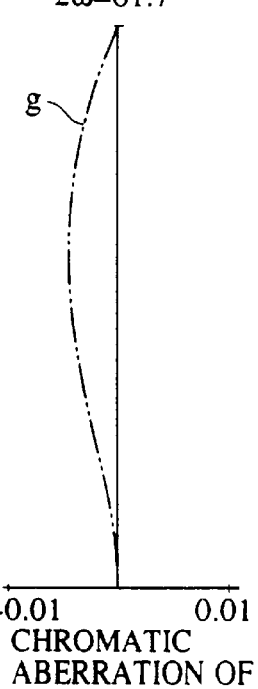
SPHERICAL ABERRATION
ASTIGMATISM
DISTORTION (%)
CHROMATIC ABERRATION OF MAGNIFICATION (LINE g)
FIG.53(B)(1)
Fno/2.15
FIG.53(B)(2)
2ω=11.4°
FIG.53(B)(3)
2ω=11.4°
FIG.53(B)(4)
2ω=11.4°
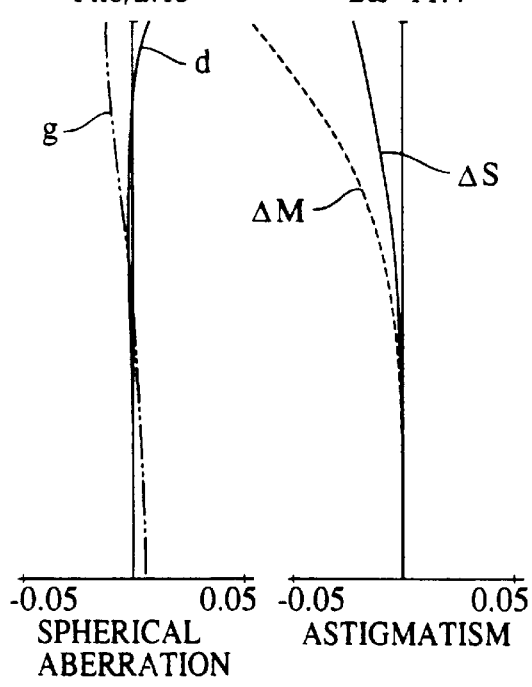
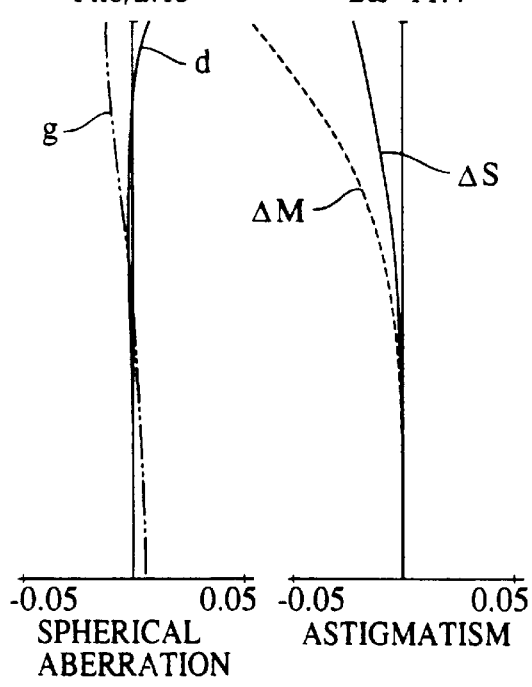
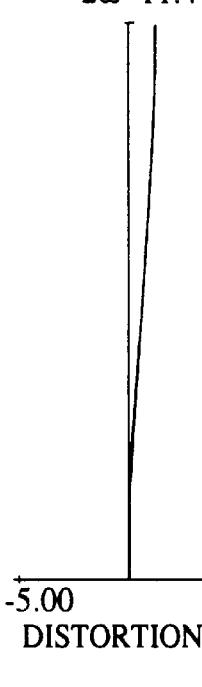
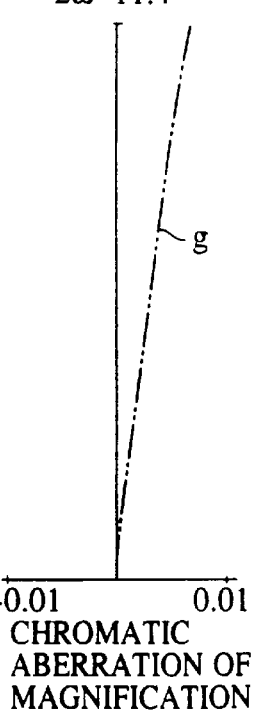
SPHERICAL ABERRATION
ASTIGMATISM
DISTORTION (%)
CHROMATIC ABERRATION OF MAGNIFICATION (LINE g)

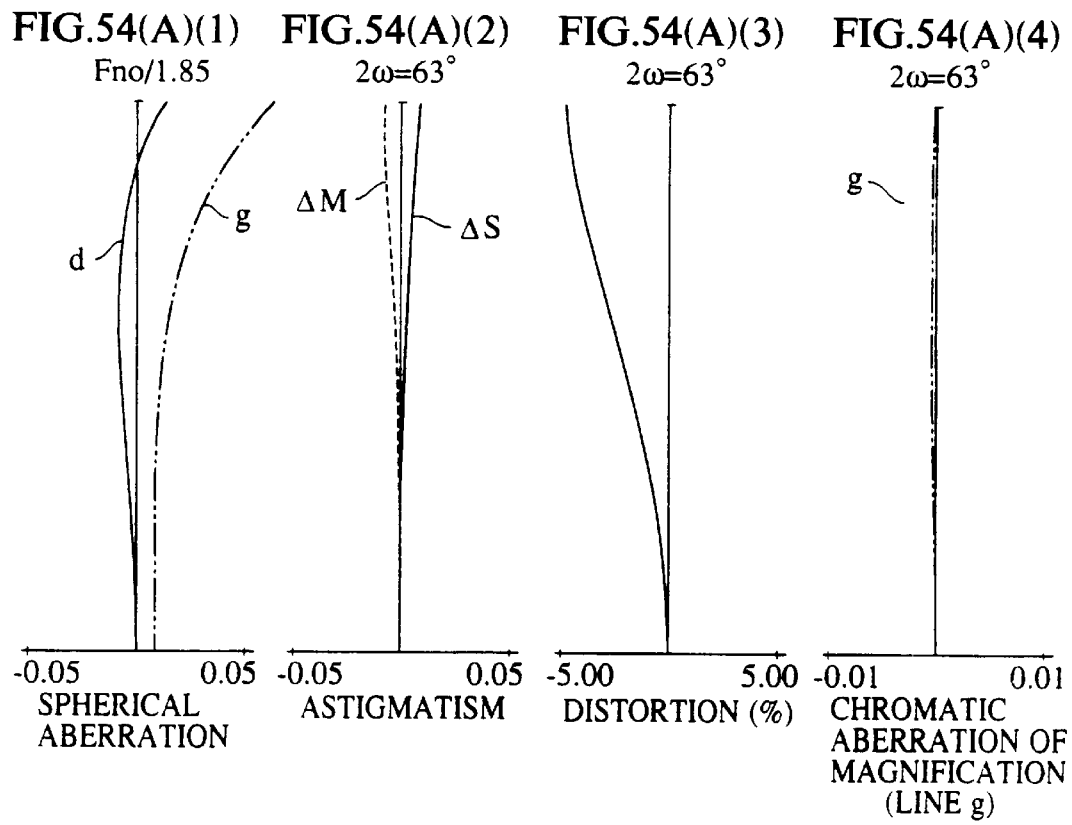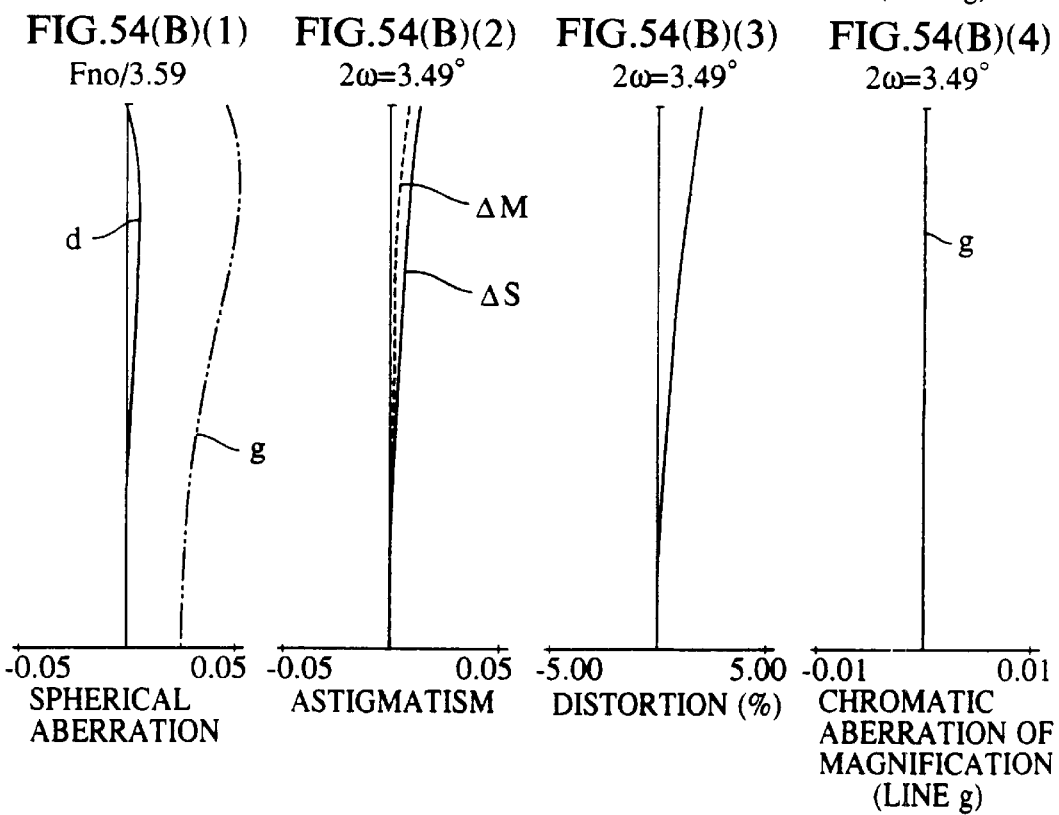

FIG.55(A)(1)
Fno/1.65
FIG.55(A)(2)
2ω=62.1°
FIG.55(A)(3)
2ω=62.1°
FIG.55(A)(4)
2ω=62.1°
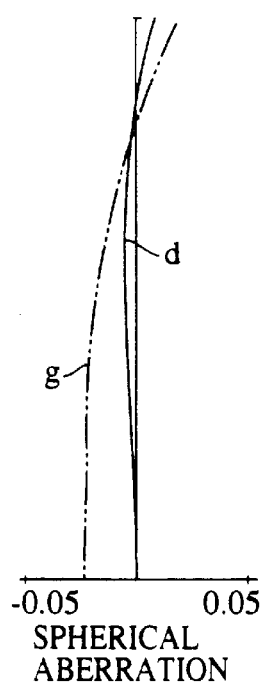
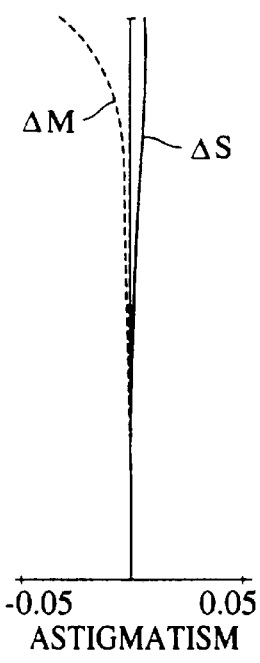
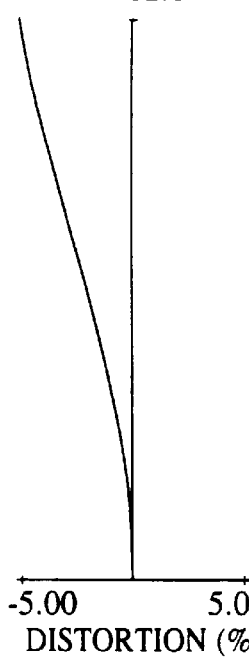
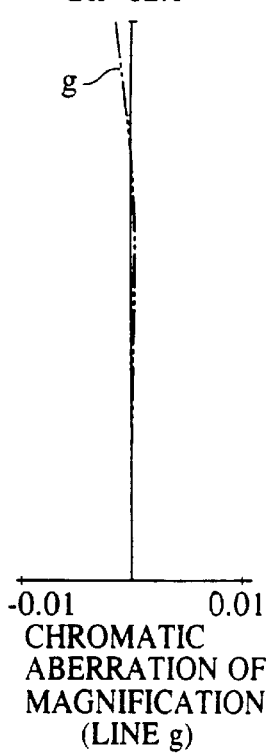
SPHERICAL ABERRATION | ASTIGMATISM | DISTORTION (%) | CHROMATIC ABERRATION OF MAGNIFICATION (LINE g)
FIG.55(B)(1)
Fno/2.84
FIG.55B)(2)
2ω=3.5°
FIG.55(B)(3)
2ω=3.5°
FIG.55(B)(4)
2ω=3.5°
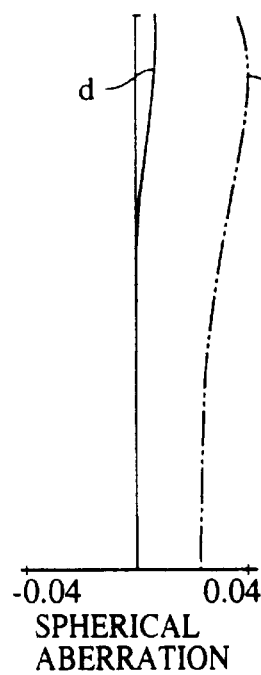
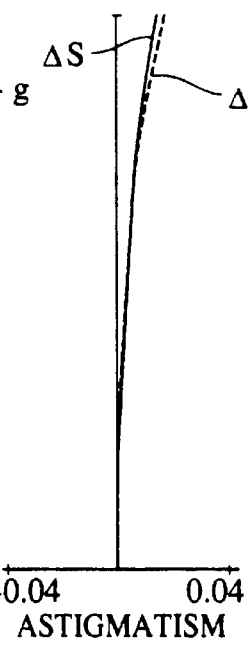
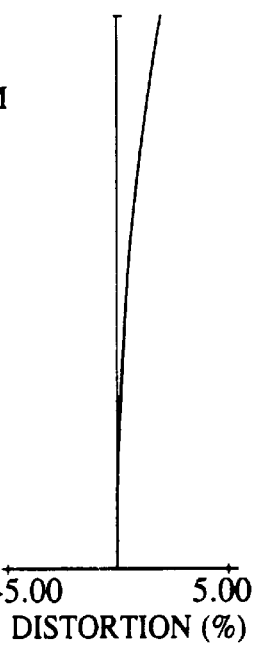
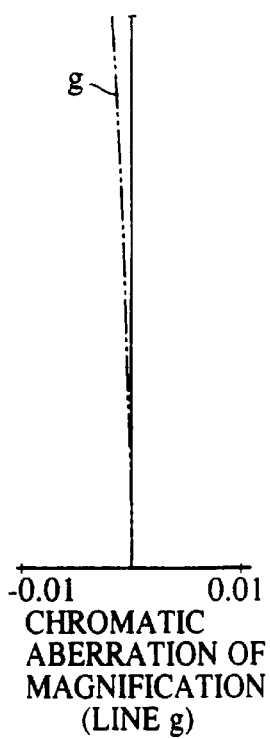
SPHERICAL ABERRATION | ASTIGMATISM | DISTORTION (%) | CHROMATIC ABERRATION OF MAGNIFICATION (LINE g)

REAR FOCUSING ZOOM LENS

BACKGROUND OF THE INVENTION

1. Field of the Invention

The present invention relates to a rear focusing zoom lens, and, more particularly, to a rear focusing zoom lens for use in a photographing camera, a video camera, a broadcasting camera or the like and exhibiting a high power-variable ratio and aperture ratio, relatively wide angle of view and short overall length such that the variable power ratio is 6 to 20 and the F-number is about 1.6 to 1.8 at a wide angle end thereof.

2. Related Background Art

Recently, the trend of reducing the size and weight of a personal video camera or the like has caused the sizes of photographing lenses to be reduced significantly. In particular, the overall length of the lens and the diameter of the front lens have been intended to be decreased, and the structure has been desired to be simplified.

As a means for achieving the foregoing objects, a so-called rear focusing zoom lens has been known, in which focusing is performed by moving lens units other than the first lens unit near an object.

Generally, in the rear focusing zoom lens, the first group has a small effective aperture as compared with that of a zoom lens of a type in which focusing is performed by moving the first lens unit. Therefore, the size of the overall lens system can easily be reduced, and close-up photographing, in particular, very close-up photographing can easily be performed. Furthermore, since relatively small and light lens units are moved to perform the close-up photographing operation or the very close-up photographing operation, the power required to move the lens units can be reduced, and, therefore, focusing of an image can quickly be performed.

A rear focusing zoom lens of the foregoing type has been disclosed in Japanese Patent Laid-Open No. 5-215967, which comprises five lens units consisting of a first lens unit having positive refracting power that is fixed during the power variation, a second lens unit having negative refracting power for varying the power, a third lens unit having positive refracting power, a fourth lens unit having negative refracting power, and a fifth lens unit having positive refracting power for correcting change in the image surface occurring when the power is varied, the lens units being disposed in the foregoing sequential order when viewed from the object. When the power is varied, the third and/or the fourth lens unit is moved. When focusing is performed, at least any of the third, fourth and the fifth lens unit is moved.

The applicant of the present invention has disclosed a rear focusing zoom lens in Japanese Patent Laid-Open No. 6-148523 which comprises five lens units consisting of a first lens unit having positive refracting power, a second lens unit having negative refracting power, an aperture stop, a third lens unit having positive refracting power, a fourth lens unit having negative refracting power, and a fifth lens unit having positive refracting power, the lens units being disposed in the foregoing sequential order when viewed from the object. The second lens unit is moved toward the image surface to vary the power from the wide angle end to the telescopic end. Change in the image surface occurring when the power is varied is corrected by moving the third and fourth lens units. Focusing is performed by moving at least any of the second, third and fourth lens units along the optical axis.

In general, if a zoom lens employs the rear focusing method, the size of the overall lens system can be reduced, focusing can be completed further quickly and further close-up photographing can be performed.

On the contrary, excessive aberration change occurs at the time of performing focusing, and there arises a problem in that a difficulty arises in reducing the size of the overall lens system from an infinite object to a near object while obtaining excellent optical performance.

If the zooming method is employed in which the three lens units are moved when the power is varied as disclosed above, the zooming mechanism will be undesirably complicated and the size of the lens mount cannot be reduced.

The zooming method, as disclosed in Japanese Patent Laid-Open No. 5-215967, in which the fifth lens unit, located near the image surface when the power is varied, is moved, causes the mechanism of the solid-state image sensing device, such as a CCD, and that near the film to be complicated. If dust adheres to the lens surface adjacent to the image surface, the dust image is undesirably taken on the film or the like and the image quality deteriorates.

SUMMARY OF THE INVENTION

Accordingly, an object of the present invention is to provide a small zoom lens exhibiting excellent power variable ratio.

Another object of the present invention is to provide a rear focusing zoom lens which is capable of performing rapid focusing.

Another object of the present invention is to provide a rear focusing zoom lens having excellent optical performance.

According to one aspect of the present invention, there is provided a rear focusing zoom lens comprising: a first lens unit remaining stationary and having positive refracting power; a second lens unit having negative refracting power; a third lens unit having positive refracting power; a fourth lens unit having negative refracting power; and a fifth lens unit remaining stationary and having positive refracting power, which are disposed in this sequential order when viewed from an object, wherein at least the second lens unit and the fourth lens unit are moved to perform zooming, and the fourth lens unit is moved toward an image surface to perform focusing of an infinite object to a nearest object.

Furthermore, the fourth lens unit is moved to form a concave locus facing the object when the fourth lens unit is moved from the wide angle end to the telescopic end to save the space and to reduce the diameter of the first lens unit. Furthermore, various optical conditions are satisfied so that focusing is performed satisfactorily and excellent optical performance is obtained.

Other and further objects, features and advantages of the invention will be evident from the following detailed description of the preferred embodiments in conjunction with the attached drawings.

BRIEF DESCRIPTION OF THE DRAWINGS

FIGS. 15(A)(1)–15(A)(4) and 15(B)(1)–15(B)(4) are graphs showing various aberrations according to Example 1 of the present invention;

FIGS. 16(A)(1)–16(A)(4) and 16(B)(1)–16(B)(4) are graphs showing various aberrations according to Example 2 of the present invention;

FIGS. 17(A)(1)–17(A)(4) and 17(B)(1)–17(B)(4) are graphs showing various aberrations according to Example 3 of the present invention;

FIGS. 18(A)(1)–18(A)(4) and 18(B)(1)–18(B)(4) are graphs showing various aberrations according to Example 4 of the present invention;

FIGS. 19(A)(1)–19(A)(4) and 19(B)(1)–19(B)(4) are graphs showing various aberrations according to Example 5 of the present invention;

FIGS. 20(A)(1)–20(A)(4) and 20(B)(1)–20(B)(4) are graphs showing various aberrations according to Example 6 of the present invention;

FIGS. 21(A)(1)–21(A)(4) and 21(B)(1)–21(B)(4) are graphs showing various aberrations according to Example 7 of the present invention;

FIGS. 22(A)(1)–22(A)(4) and 22(B)(1)–22(B)(4) are graphs showing various aberrations according to Example 8 of the present invention;

FIGS. 23(A)(1)–23(A)(4) and 23(B)(1)–23(B)(4) are graphs showing various aberrations according to Example 9 of the present invention;

FIGS. 24(A)(1)–24(A)(4) and 24(B)(1)–24(B)(4) are graphs showing various aberrations according to Example 10 of the present invention;

FIGS. 25(A)(1)–25(A)(4) and 25(B)(1)–25(B)(4) are graphs showing various aberrations according to Example 11 of the present invention;

FIGS. 26(A)(1)–26(A)(4) and 26(B)(1)–26(B)(4) are graphs showing various aberrations according to Example 12 of the present invention;

FIGS. 27(A)(1)–27(A)(4) and 27(B)(1)–27(B)(4) are graphs showing various aberrations according to Example 13 of the present invention;

FIGS. 34(A)(1)–34(A)(4) and 34(B)(1)–34(B)(4) are graphs showing various aberrations according to Example 14 of the present invention;

FIGS. 35(A)(1)–35(A)(4) and 35(B)(1)–35(B)(4) are graphs showing various aberrations according to Example 15 of the present invention;

FIGS. 36(A)(1)–36(A)(4) and 36(B)(1)–36(B)(4) are graphs showing various aberrations according to Example 16 of the present invention;

FIGS. 37(A)(1)–37(A)(4) and 37(B)(1)–37(B)(4) are graphs showing various aberrations according to Example 17 of the present invention;

FIGS. 38(A)(1)–38(A)(4) and 38(B)(1)–38(B)(4) are graphs showing various aberrations according to Example 18 of the present invention;

FIGS. 39(A)(1)–39(A)(4) and 39(B)(1)–39(B)(4) are graphs showing various aberrations according to Example 19 of the present invention;

FIGS. 48(A)(1)–48(A)(4) and 48(B)(1)–48(B)(4) are graphs showing various aberrations according to Example 20 of the present invention;

FIGS. 49(A)(1)–49(A)(4) and 49(B)(1)–49(B)(4) are graphs showing various aberrations according to Example 21 of the present invention;

FIGS. 50(A)(1)–50(A)(4) and 50(B)(1)–50(B)(4) are graphs showing various aberrations according to Example 22 of the present invention;

FIGS. 51(A)(1)–51(A)(4) and 51(B)(1)–51(B)(4) are graphs showing various aberrations according to Example 23 of the present invention;

FIGS. 52(A)(1)–52(A)(4) and 52(B)(1)–52(B)(4) are graphs showing various aberrations according to Example 24 of the present invention;

FIGS. 53(A)(1)–53(A)(4) and 53(B)(1)–53(B)(4) are graphs showing various aberrations according to Example 25 of the present invention;

FIGS. 54(A)(1)–54(A)(4) and 54(B)(1)–54(B)(4) are graphs showing various aberrations according to Example 26 of the present invention; and FIGS. 55(A)(1)–55(A)(4) and 55(B)(1)–55(B)(4) are graphs showing various aberrations according to Example 27 of the present invention.

DESCRIPTION OF THE PREFERRED EMBODIMENTS

Figure 1:
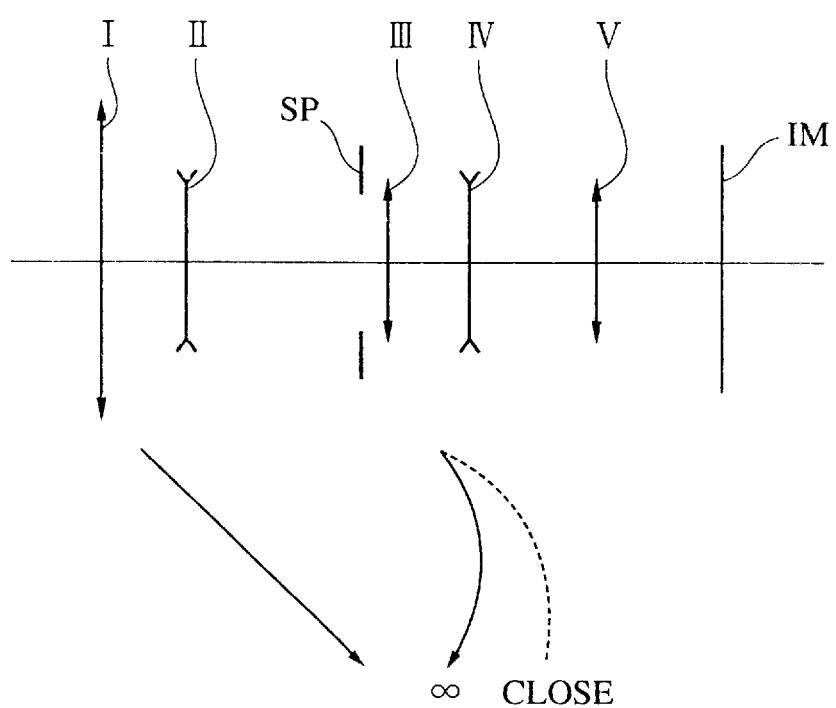
FIG. 1 is a diagram showing paraxial refracting power configuration of a zoom lens according to the present invention.
Figure 2:
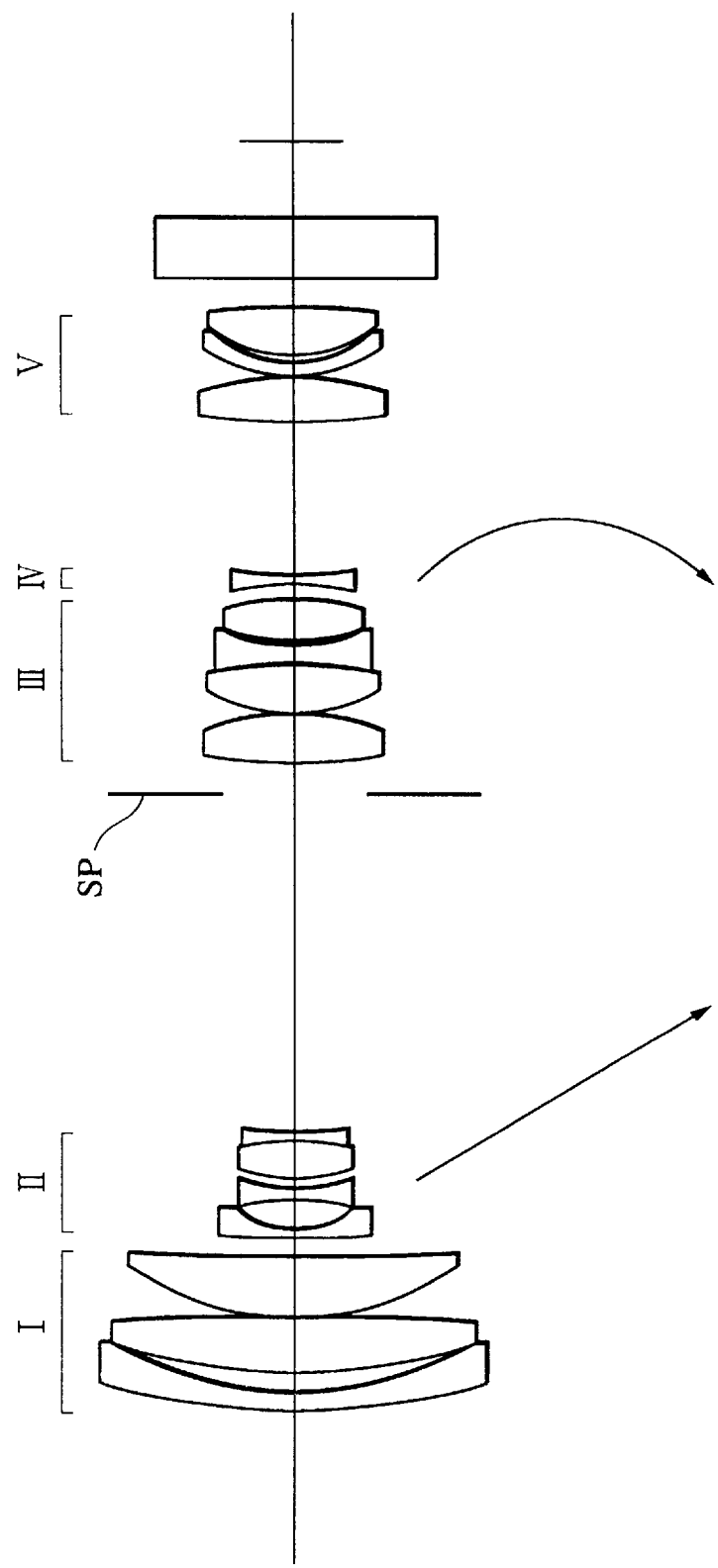
FIG. 2 is a cross sectional view of a lens according to Example 1 of the present invention at an end.
Figure 3:
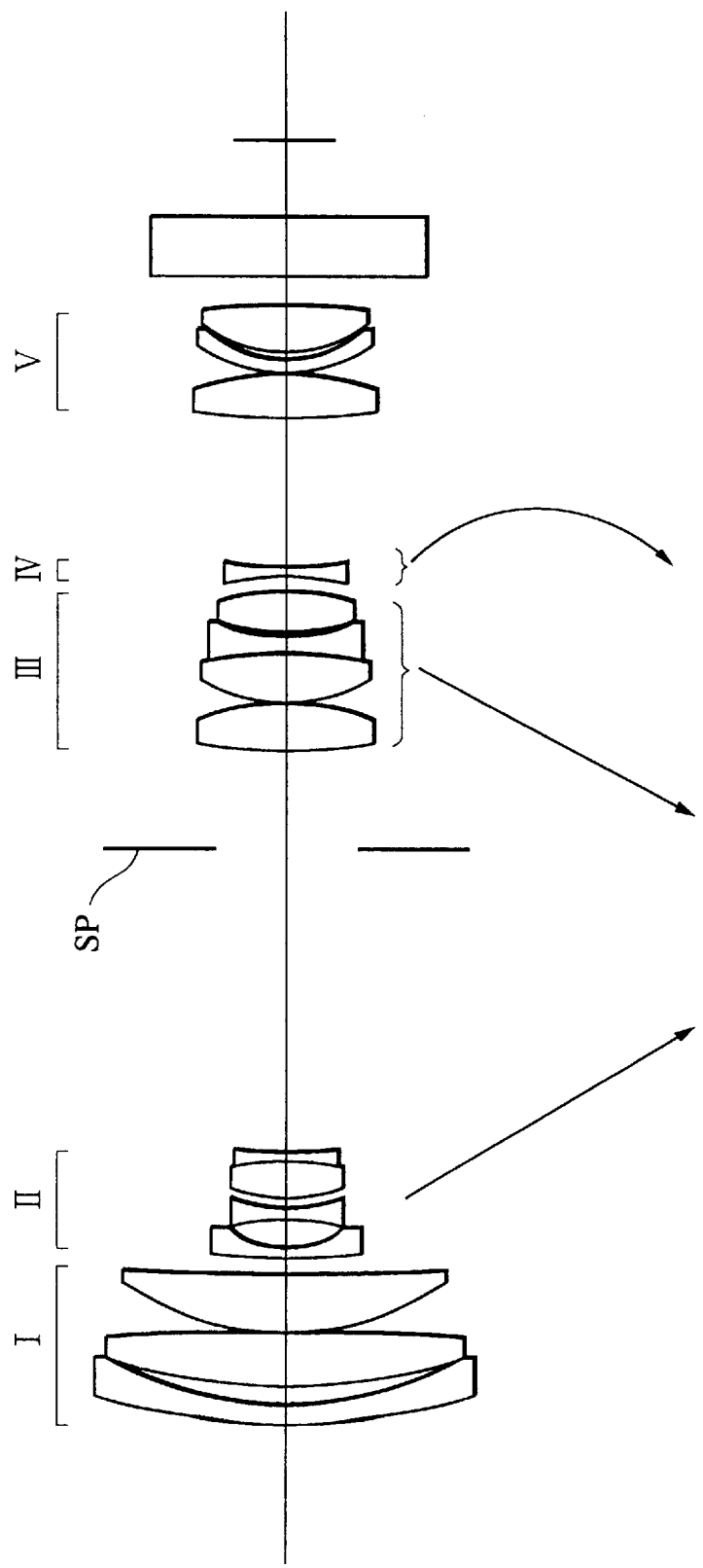
FIG. 3 is a cross sectional view of a lens according to Example 2 of the present invention at a wide angle end.
Figure 4:
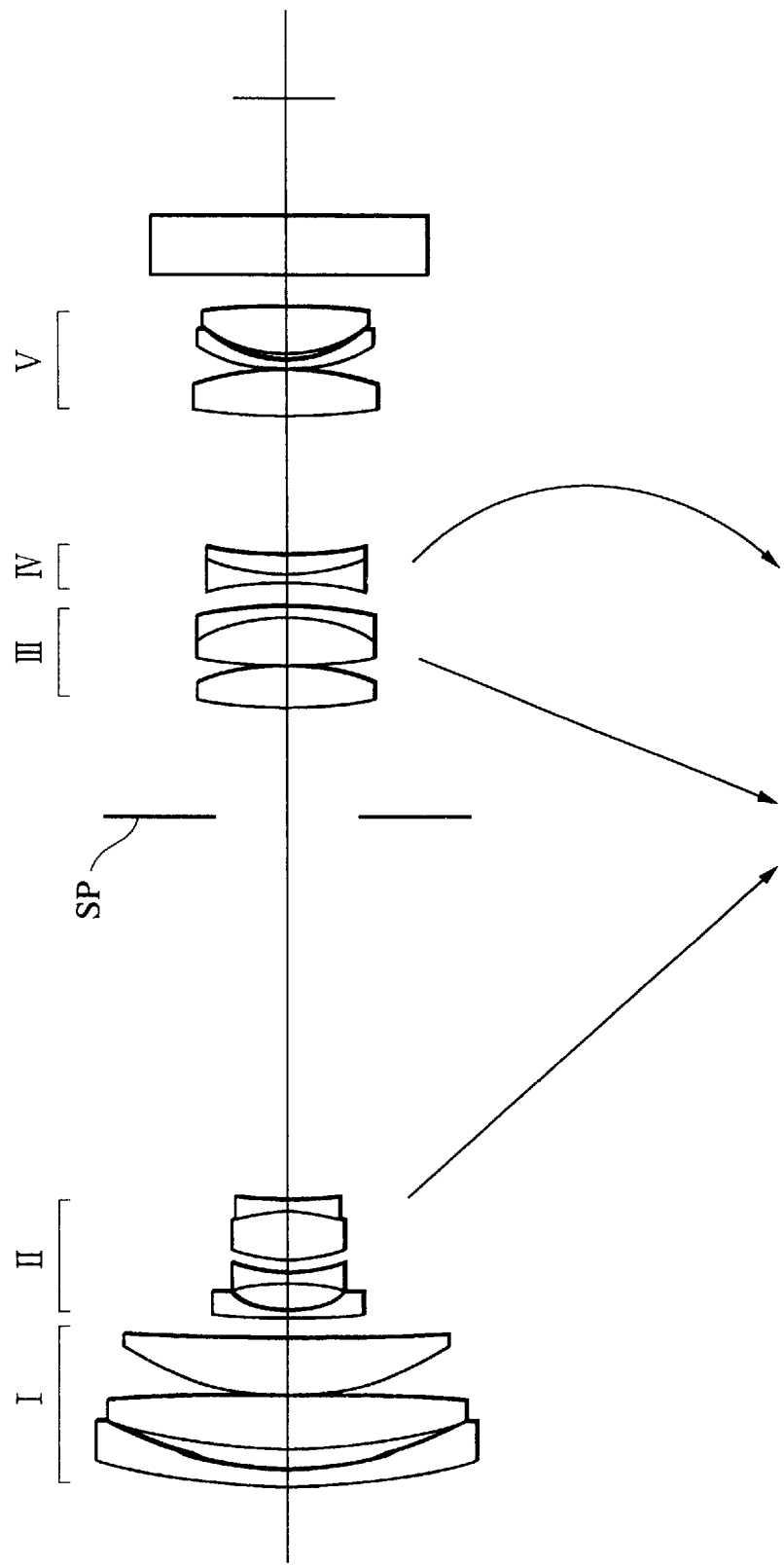
FIG. 4 is a cross sectional view of a lens according to Example 3 of the present invention at a wide angle end.
Figure 5:
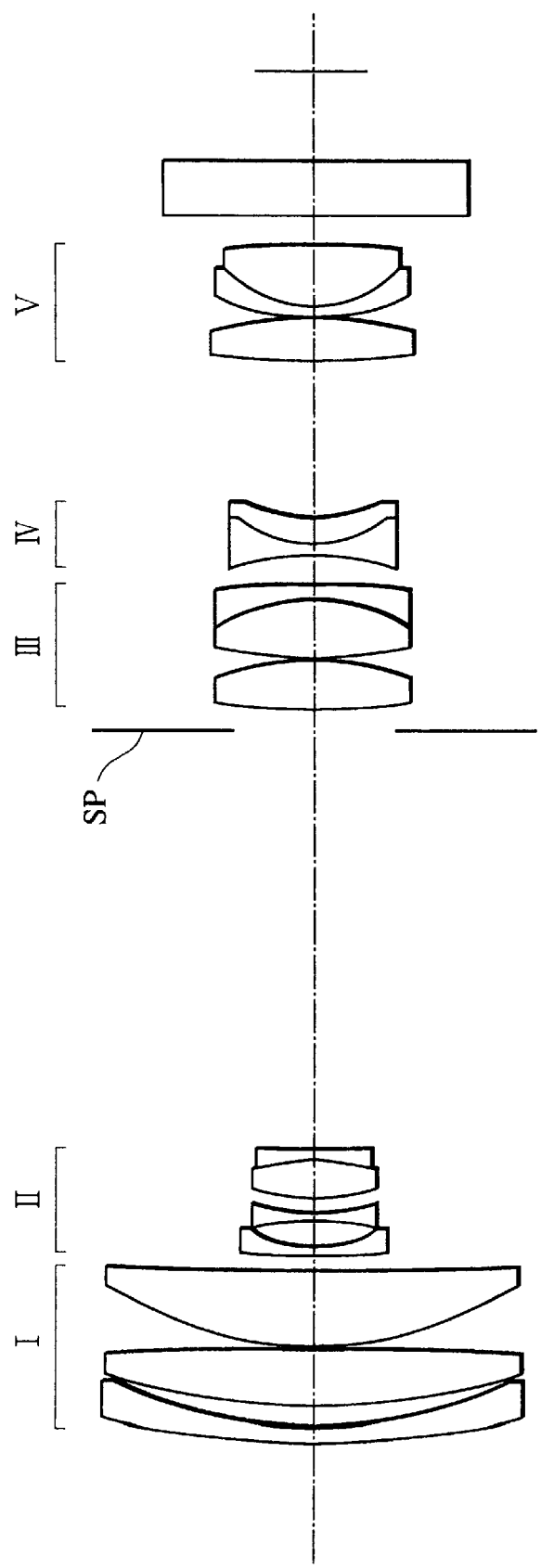
FIG. 5 is a cross sectional view of a lens according to Example 4 of the present invention at a wide angle end.
Figure 6:
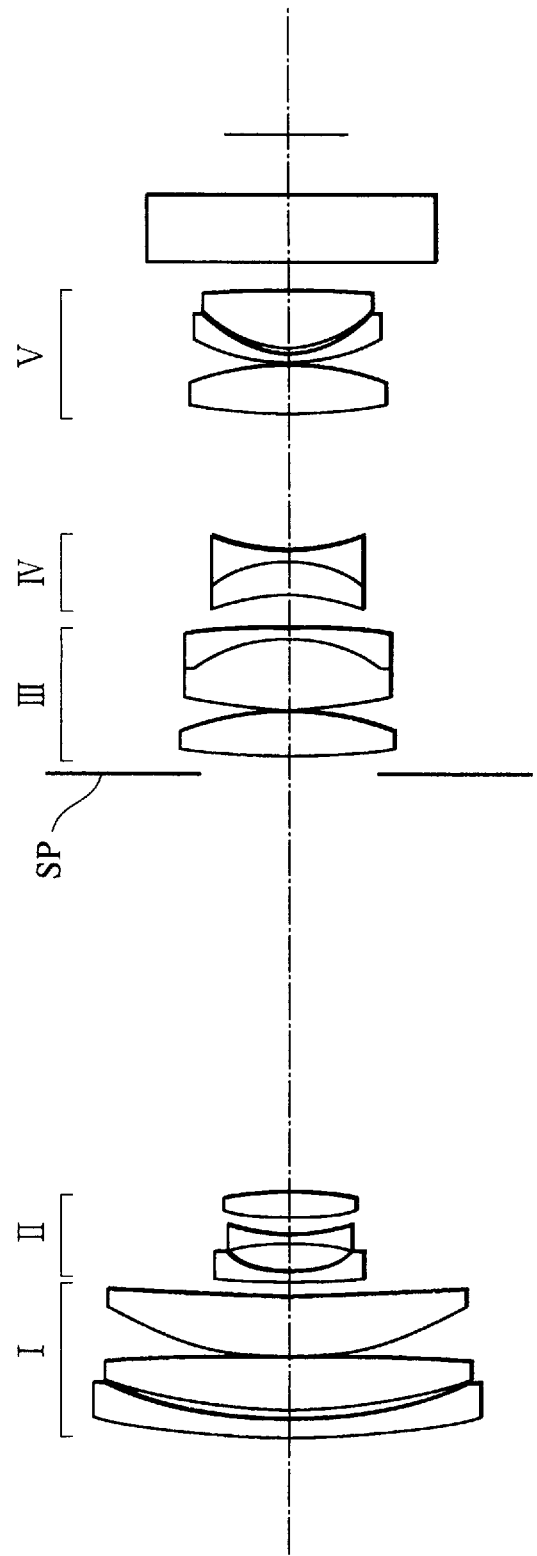
FIG. 6 is a cross sectional view of a lens according to Example 5 of the present invention at a wide angle end.
Figure 7:
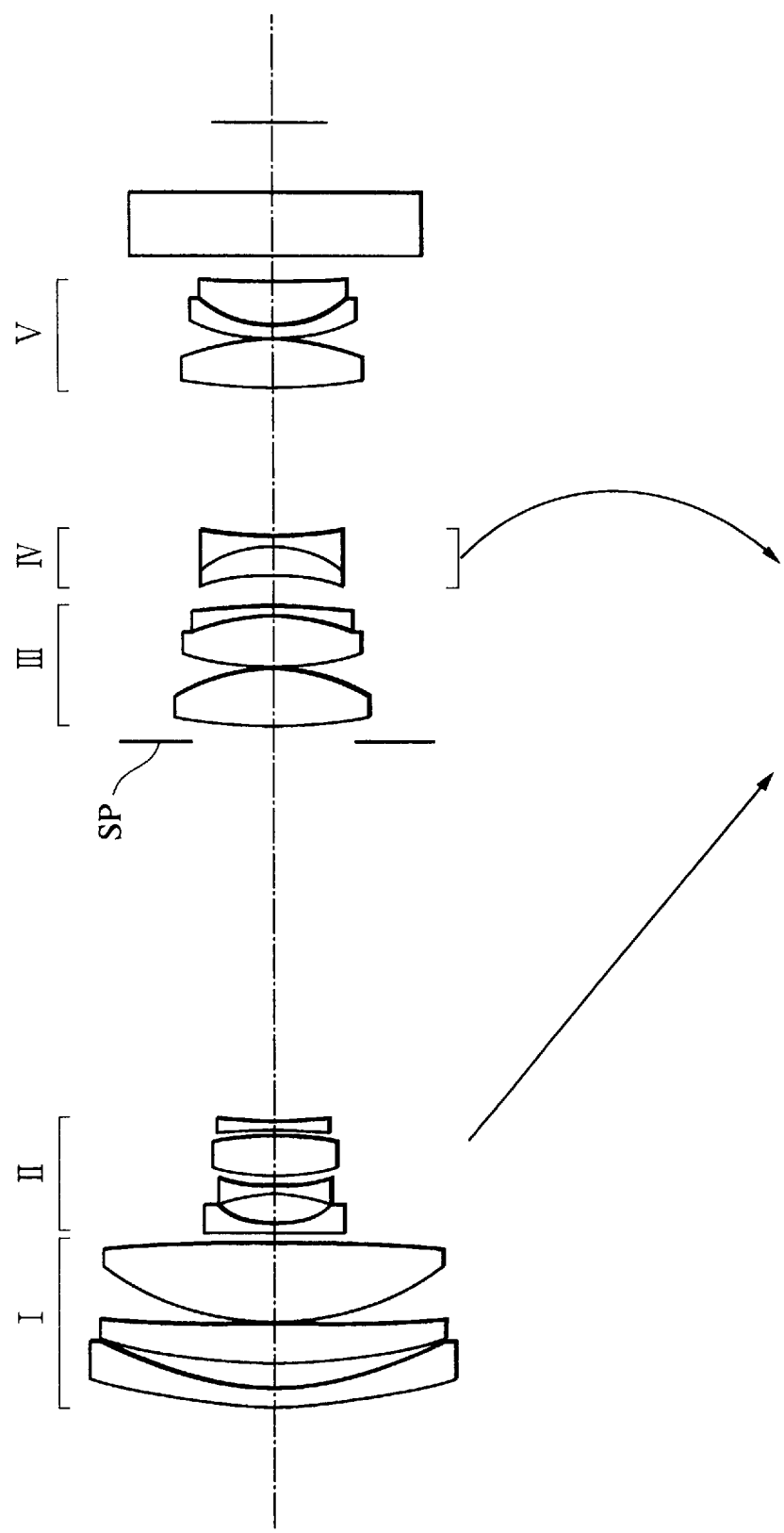
FIG. 7 is a cross sectional view of a lens according to Example 6 of the present invention at a wide angle end.
Figure 8:
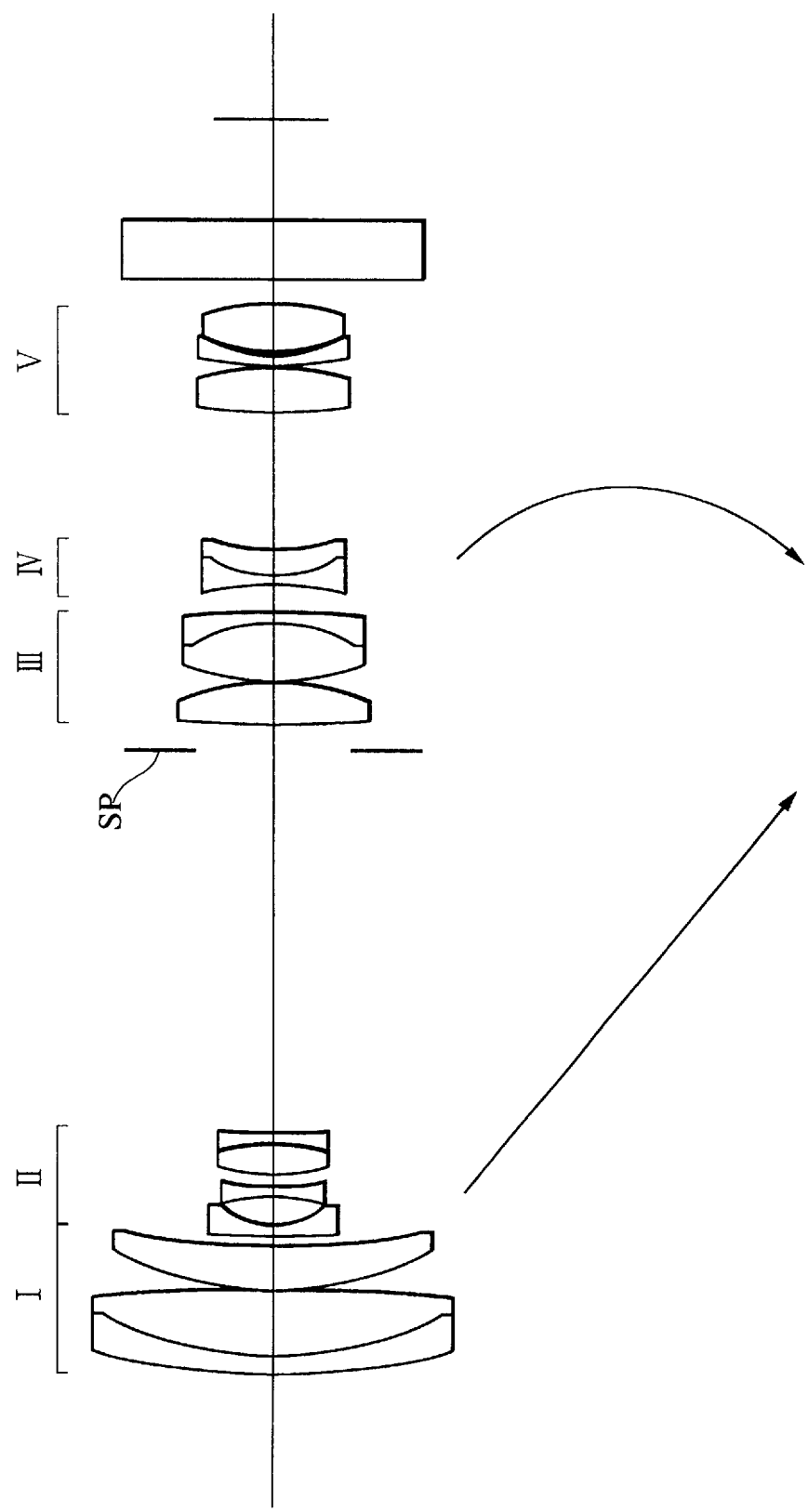
FIG. 8 is a cross sectional view of a lens according to Example 7 of the present invention at a wide angle end.
Figure 9:
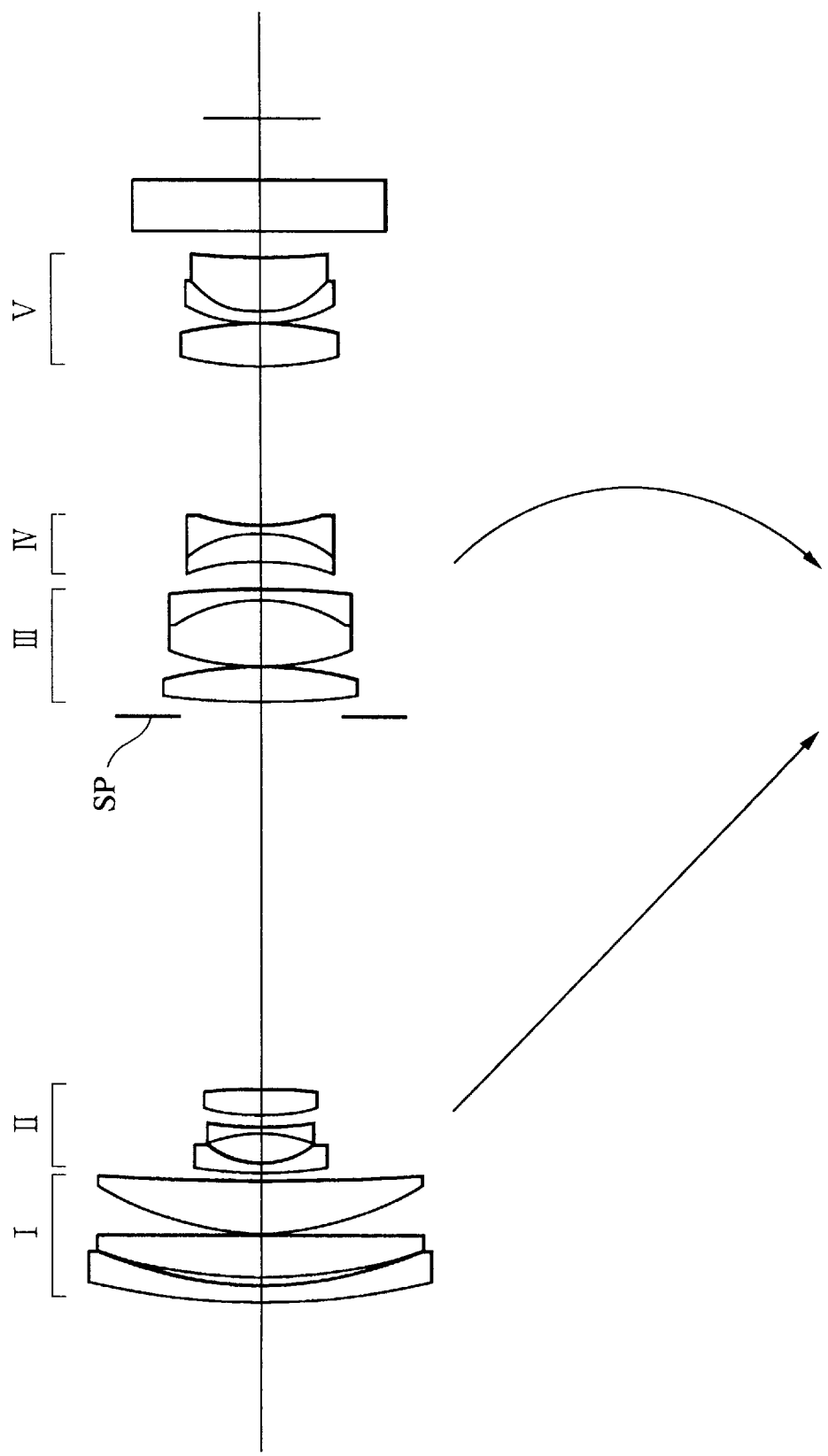
FIG. 9 is a cross sectional view of a lens according to Example 8 of the present invention at a wide angle end.
Figure 10:
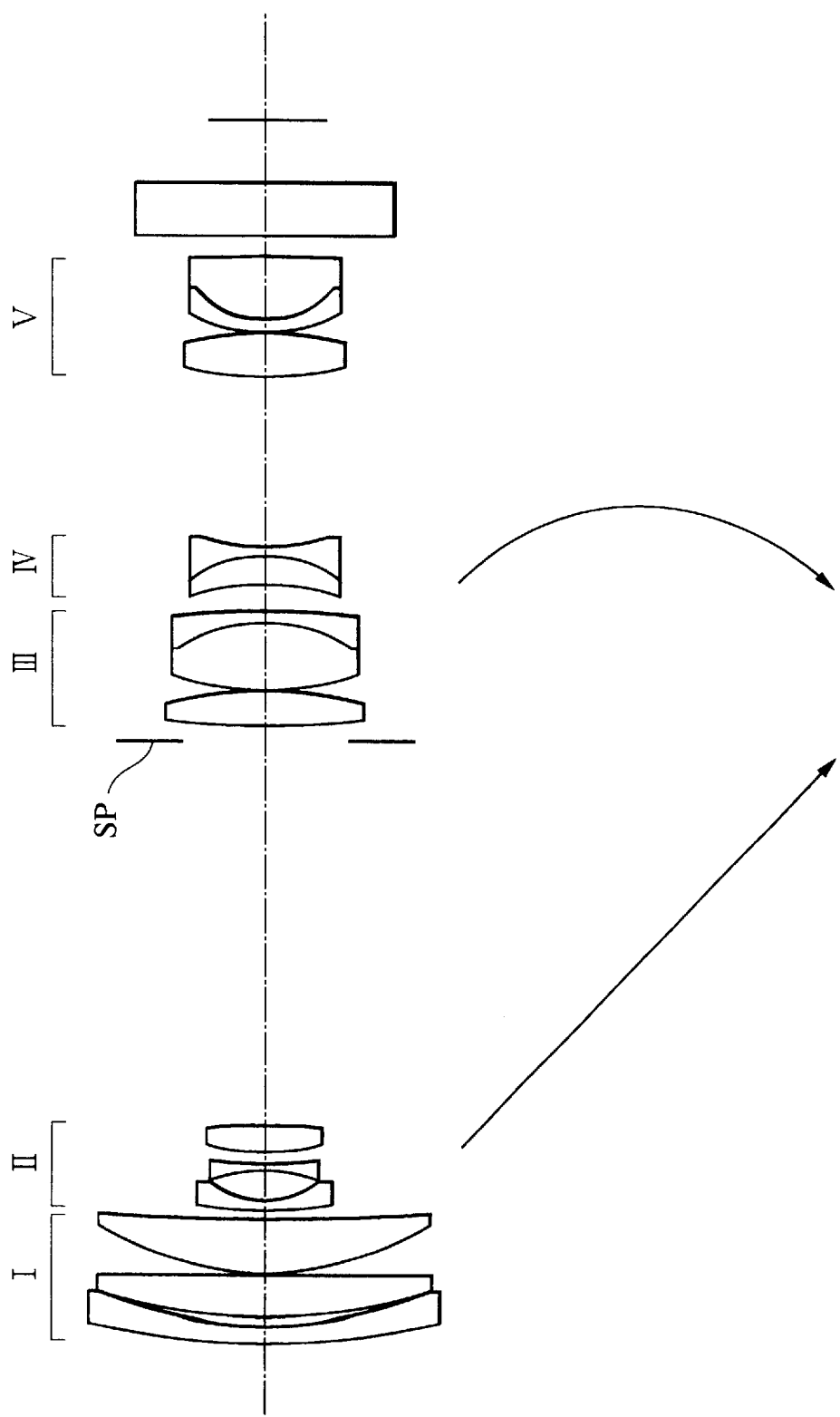
FIG. 10 is a cross sectional view of a lens according to Example 9 of the present invention at a wide angle end.
Figure 11:
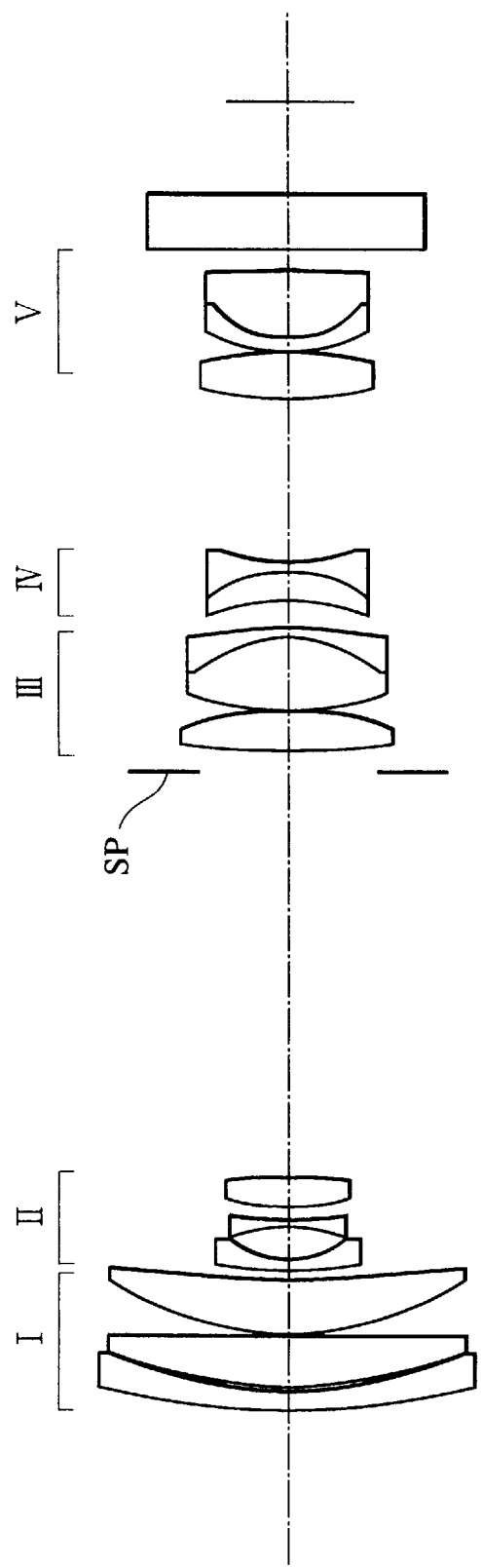
FIG. 11 is a cross sectional view of a lens according to Example 10 of the present invention at a wide angle end.
Figure 12:
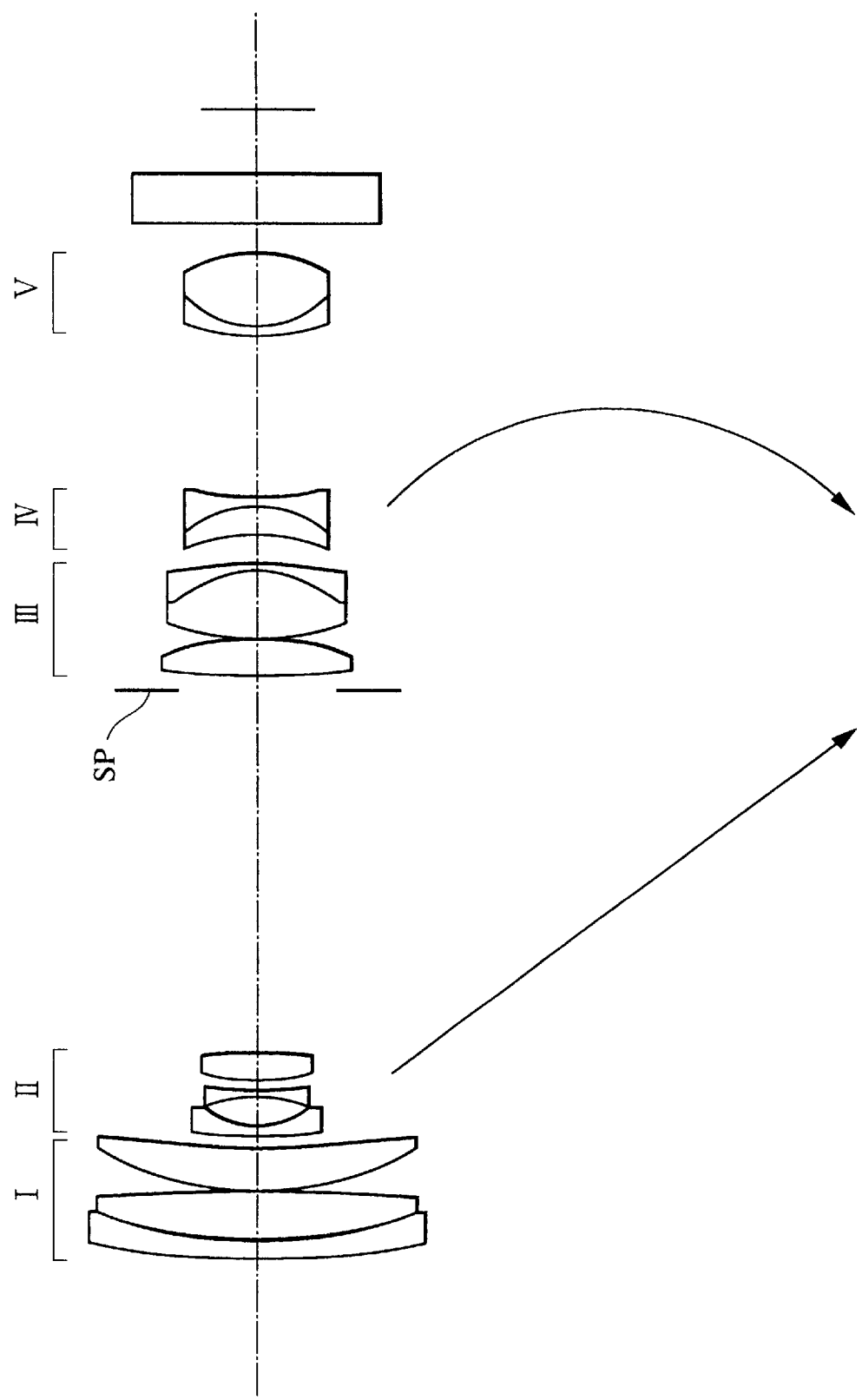
FIG. 12 is a cross sectional view of a lens according to Example 11 of the present invention at a wide angle end.
Figure 13:
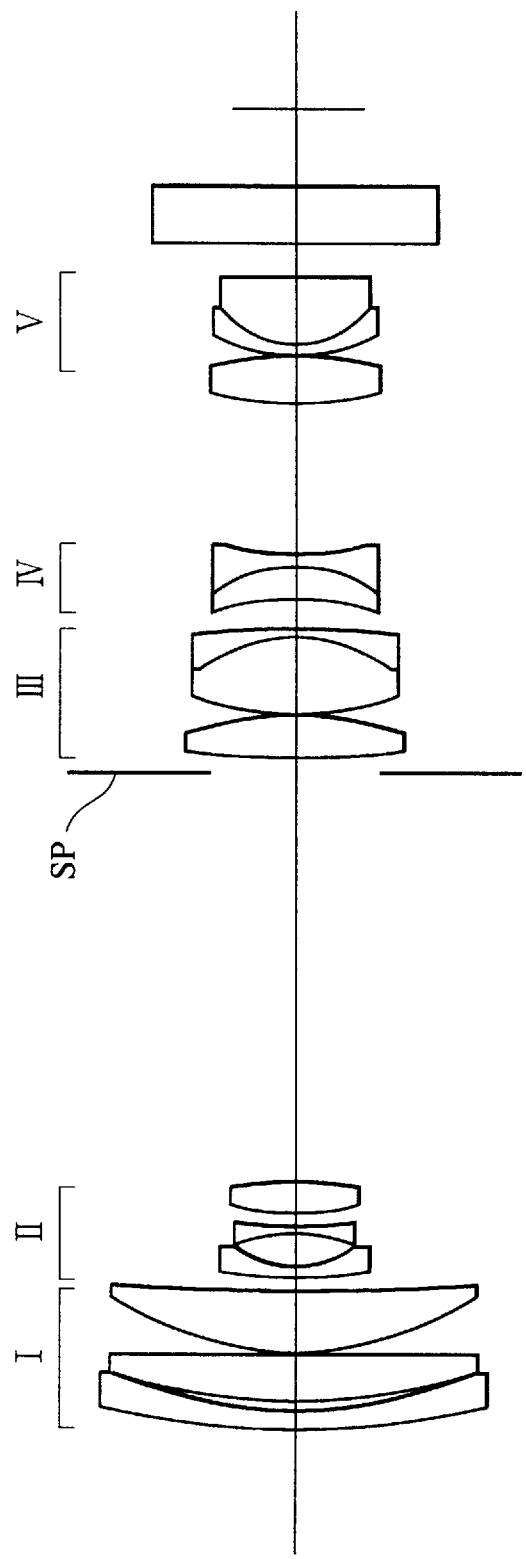
FIG. 13 is a cross sectional view of a lens according to Example 12 of the present invention at a wide angle end.
Figure 14:
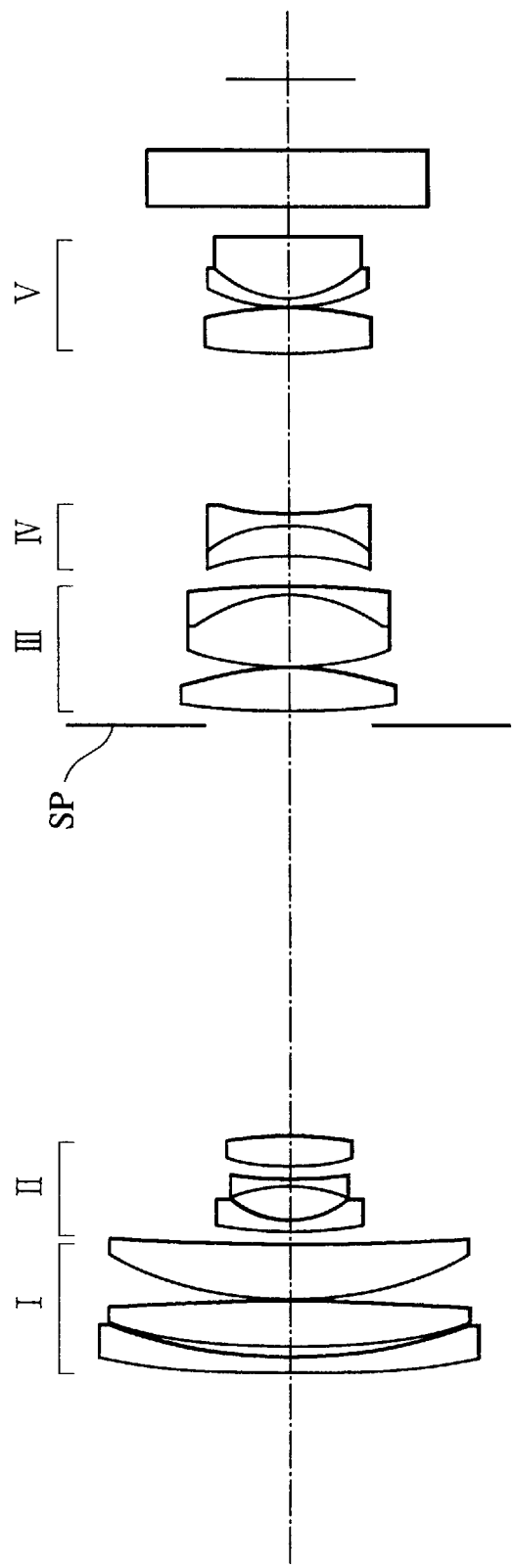
FIG. 14 is a cross sectional view of a lens according to Example 13 of the present invention at a wide angle end.
Figure 28:
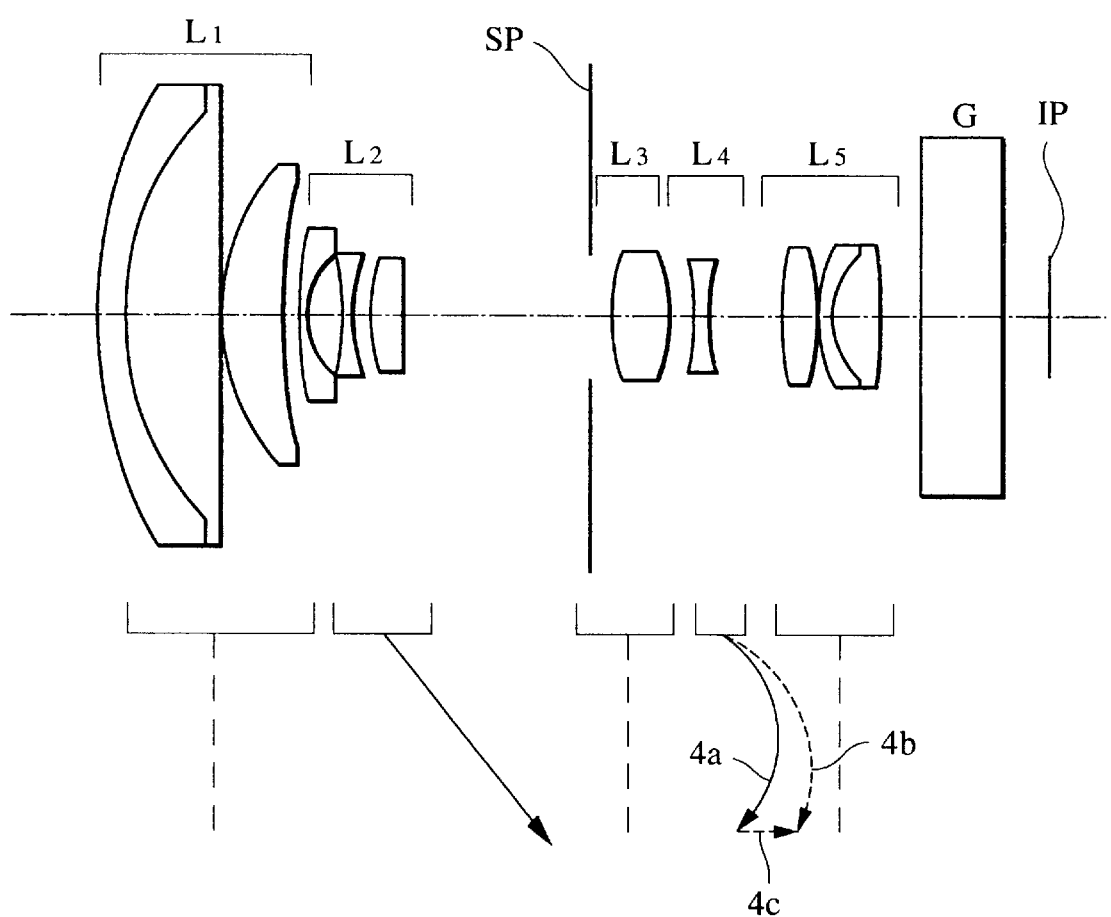
FIG. 28 is a cross sectional view of a lens according to Example 14 of the present invention.
Figure 29:
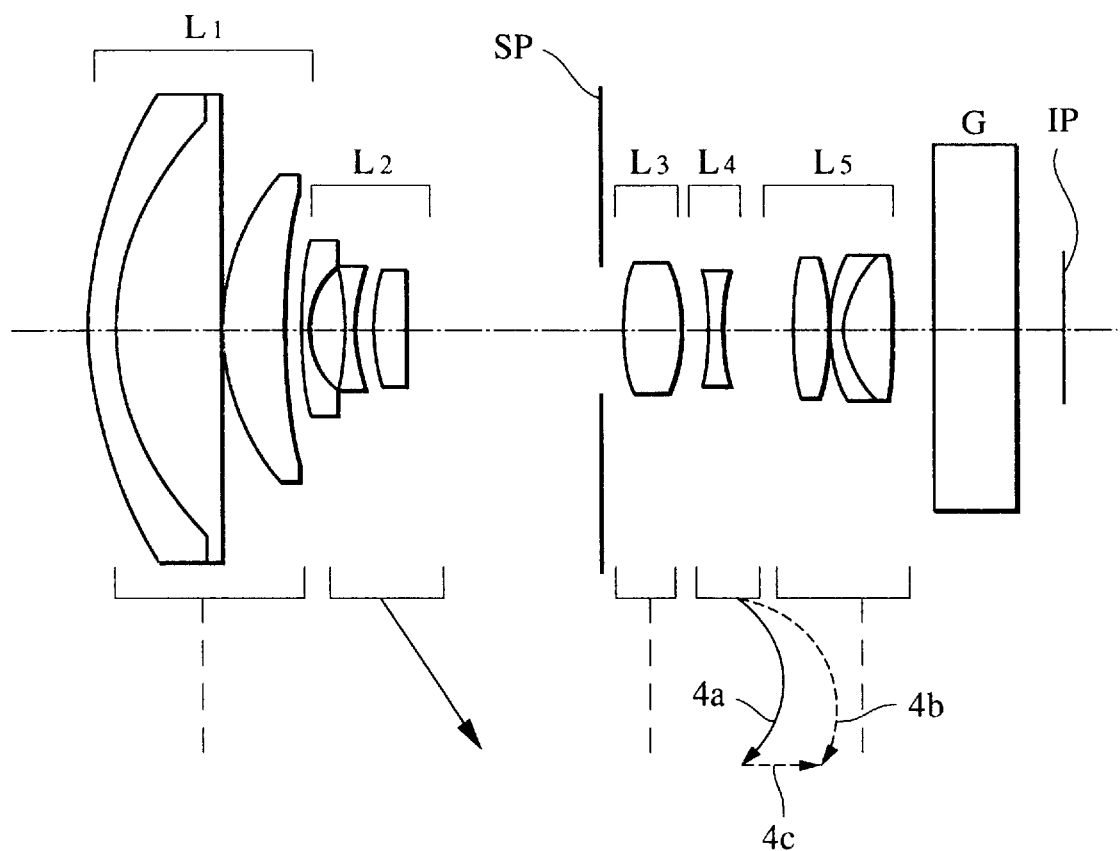
FIG. 29 is a cross sectional view of a lens according to Example 15 of the present invention.
Figure 30:
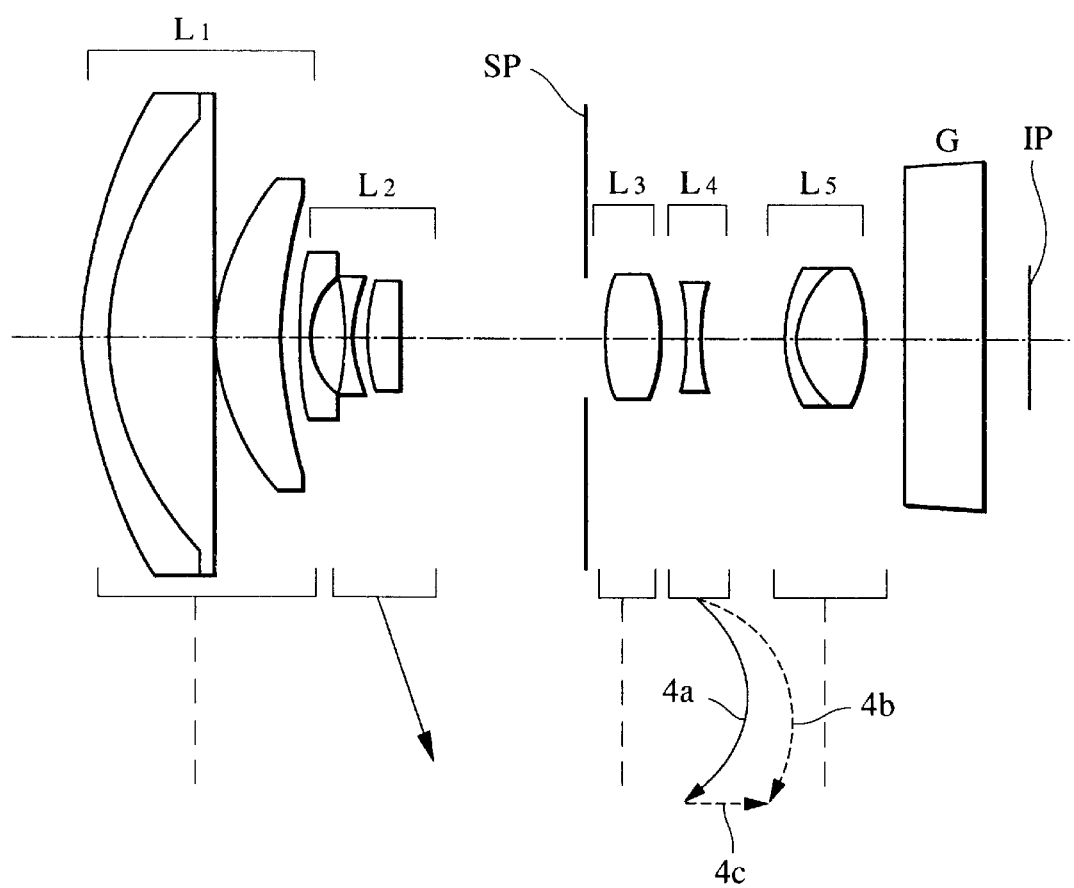
FIG. 30 is a cross sectional view of a lens according to Example 16 of the present invention.
Figure 31:
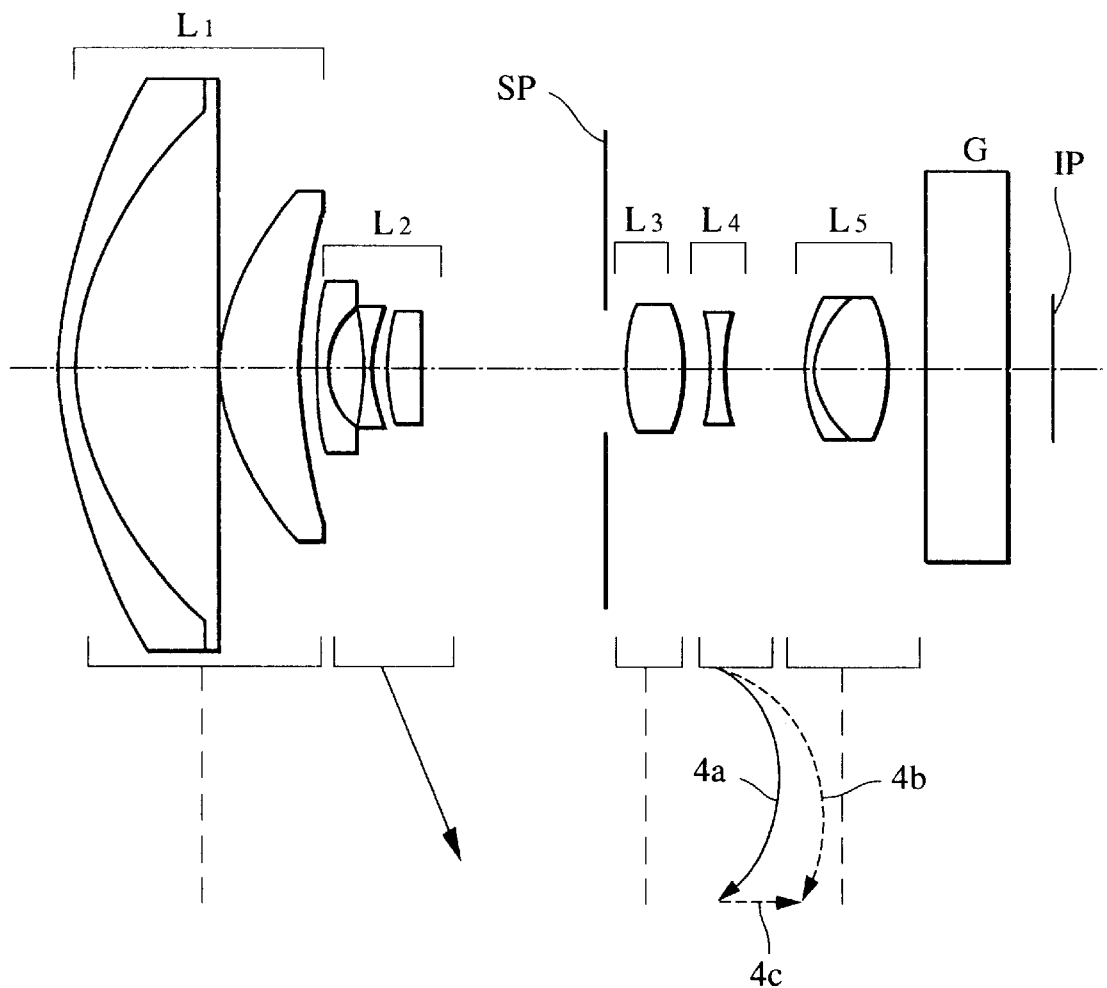
FIG. 31 is a cross sectional view of a lens according to Example 17 of the present invention.
Figure 32:
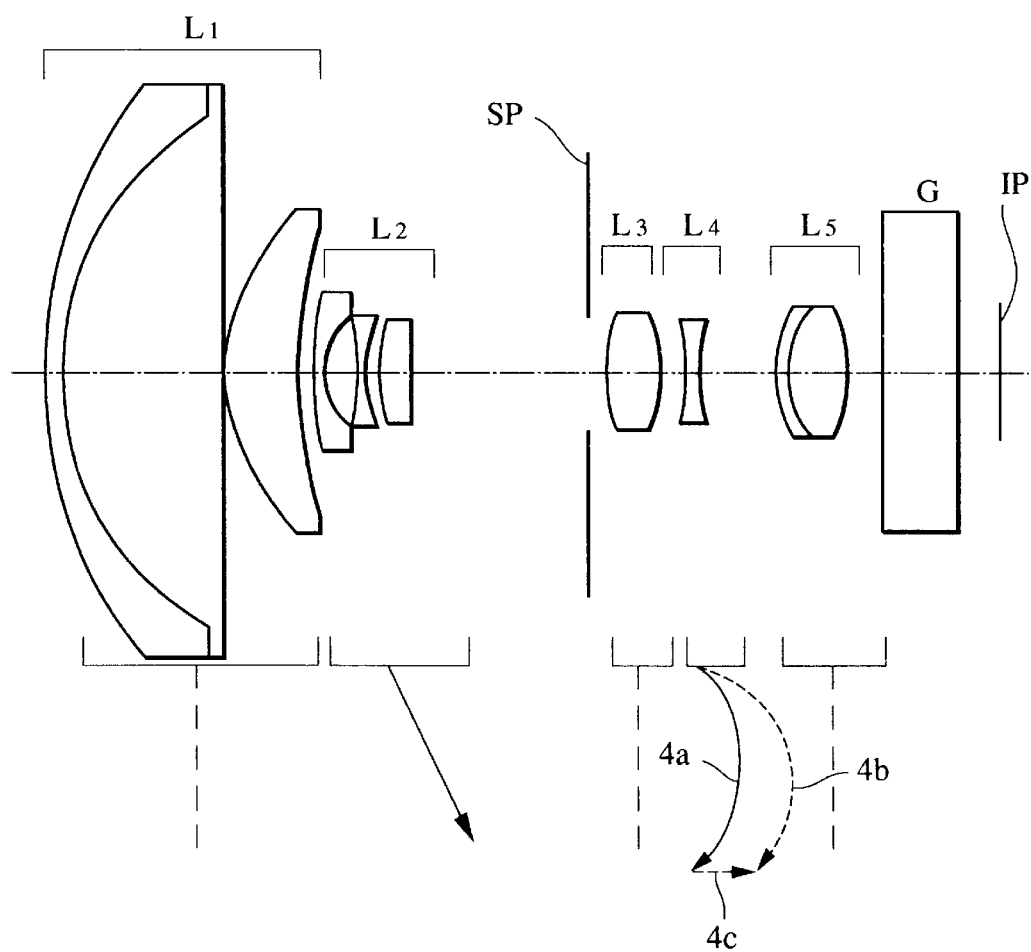
FIG. 32 is a cross sectional view of a lens according to Example 18 of the present invention.
Figure 33:
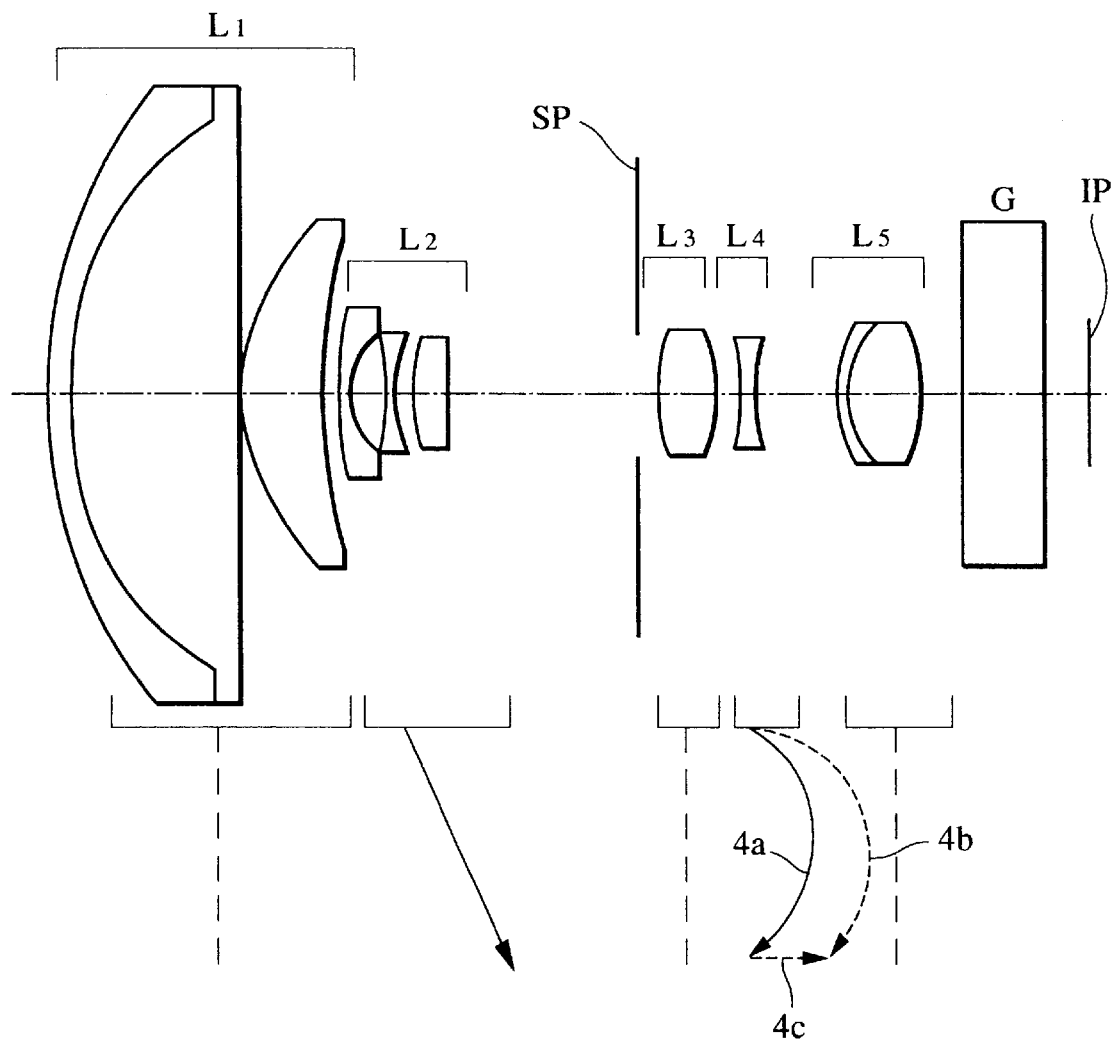
FIG. 33 is a cross sectional view of a lens according to Example 19 of the present invention.
Figure 40:
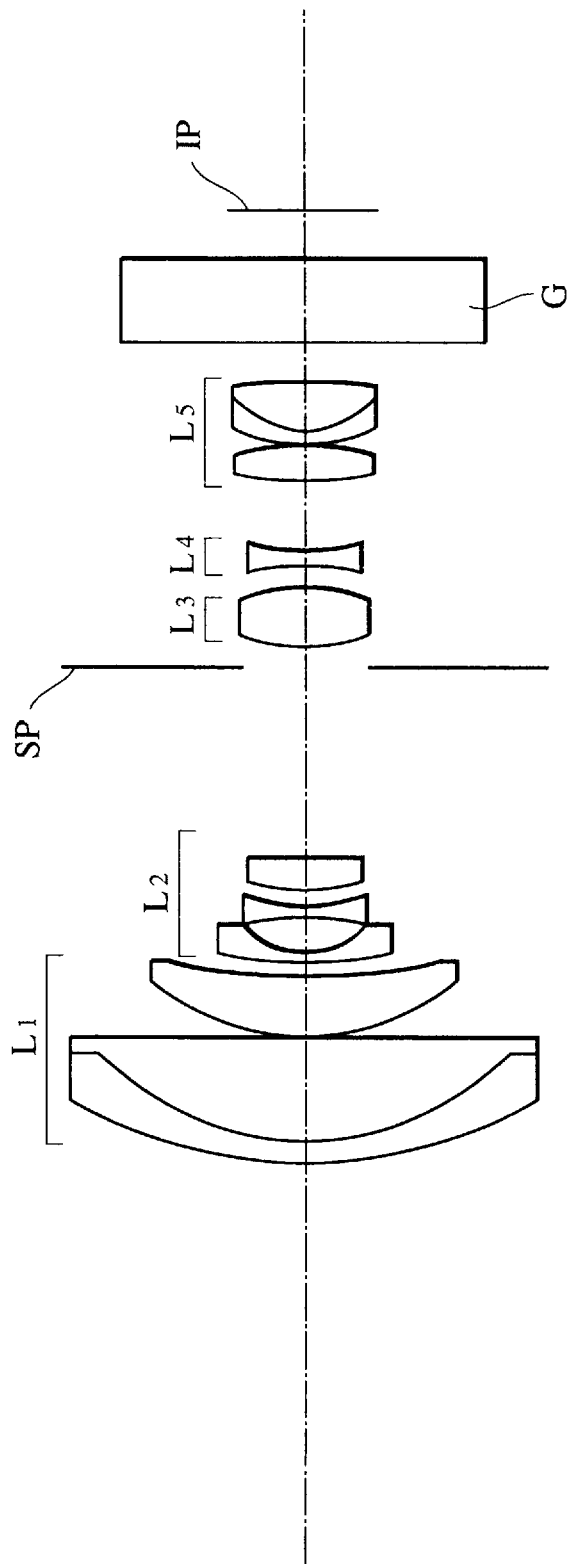
FIG. 40 is a cross sectional view of a lens according to Example 20 of the present invention at the wide angle end.
Figure 41:
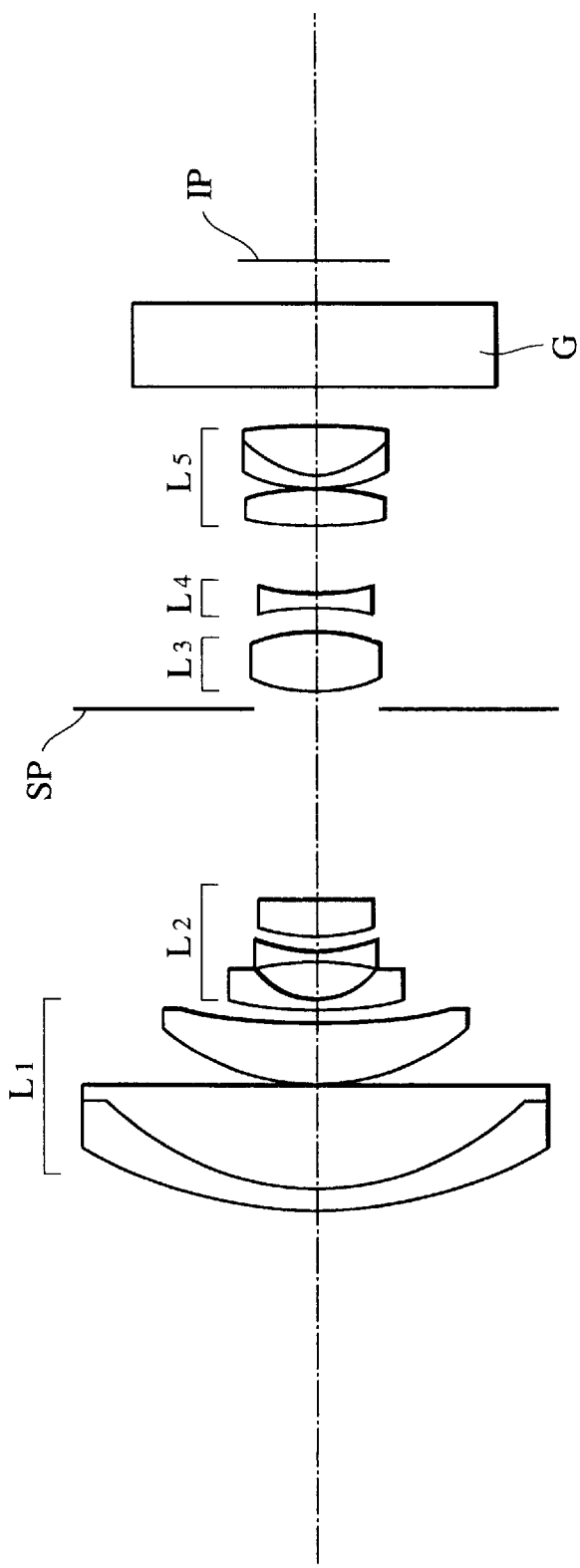
FIG. 41 is a cross sectional view of a lens according to Example 21 of the present invention at the wide angle end.
Figure 42:
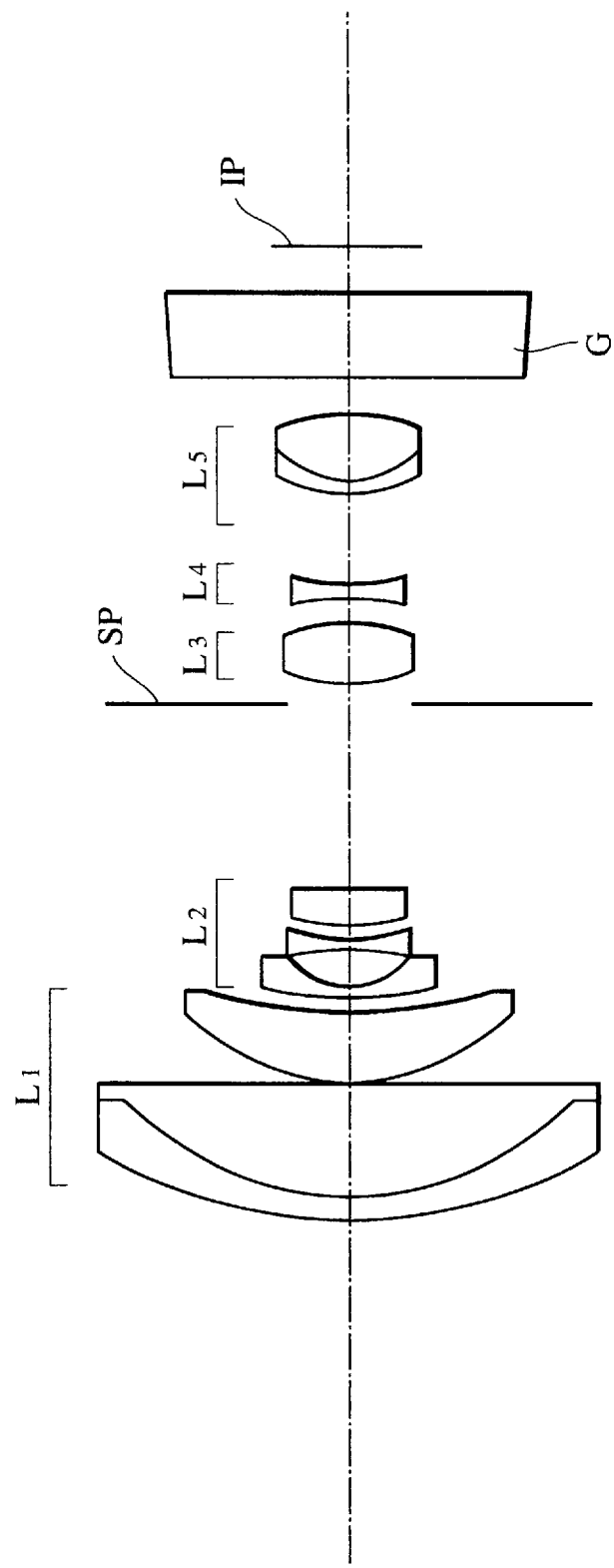
FIG. 42 is a cross sectional view of a lens according to Example 22 of the present invention at the wide angle end.
Figure 43:
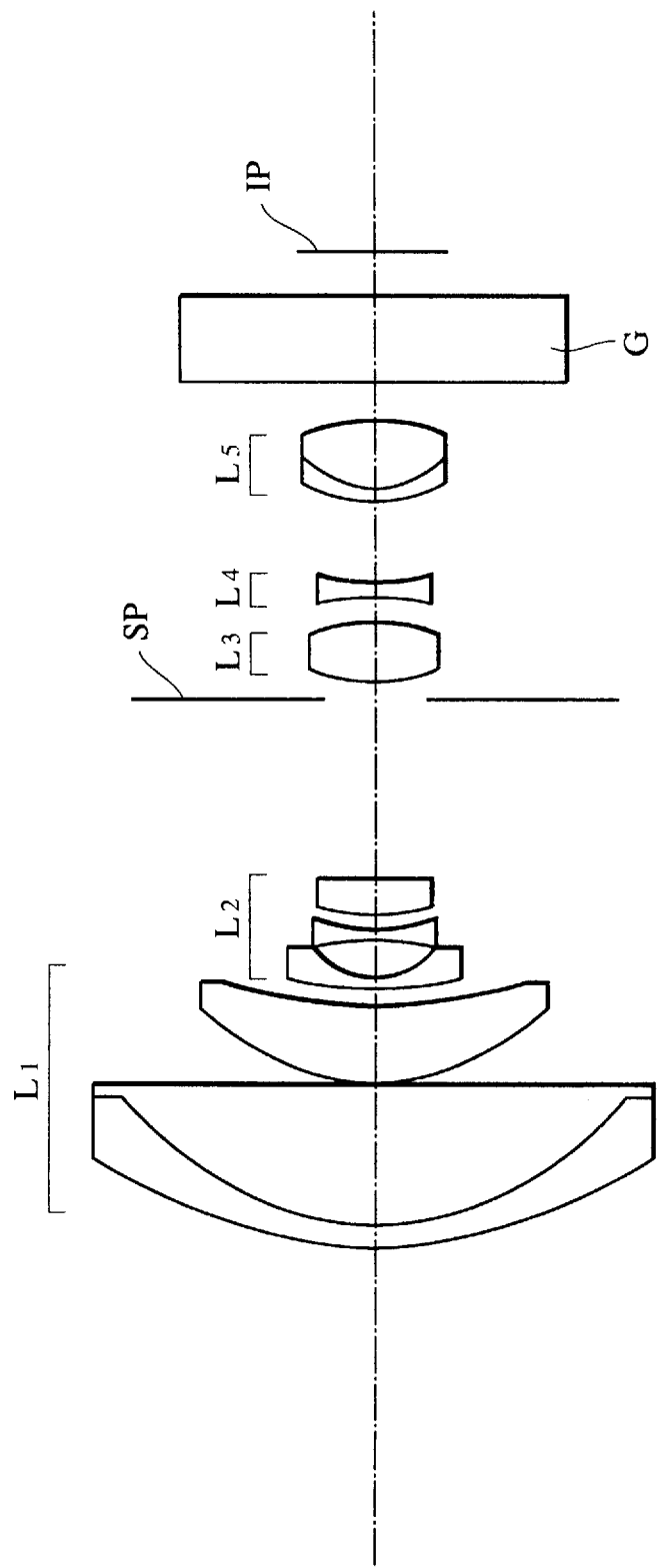
FIG. 43 is a cross sectional view of a lens according to Example 23 of the present invention at the wide angle end.
Figure 44:
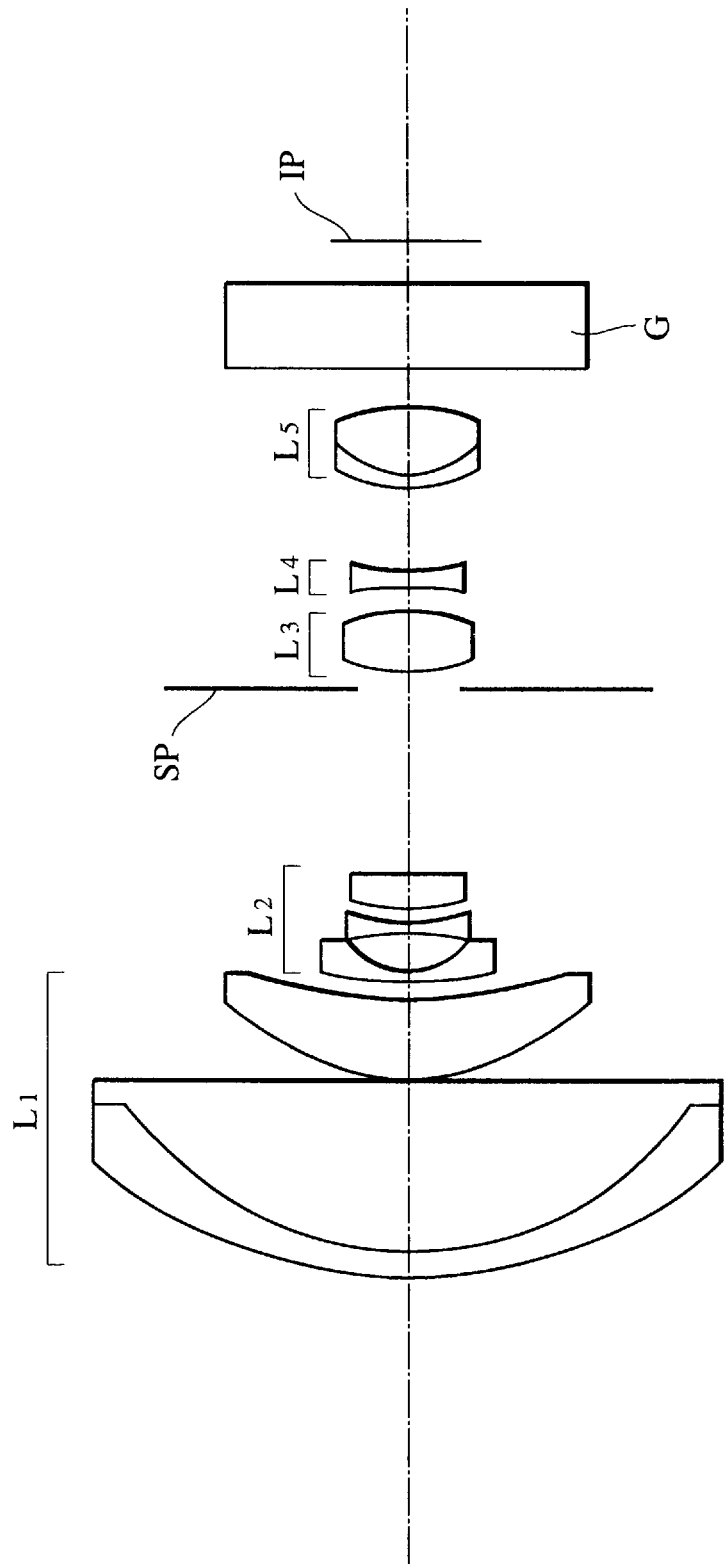
FIG. 44 is a cross sectional view of a lens according to Example 24 of the present invention at the wide angle end.
Figure 45:
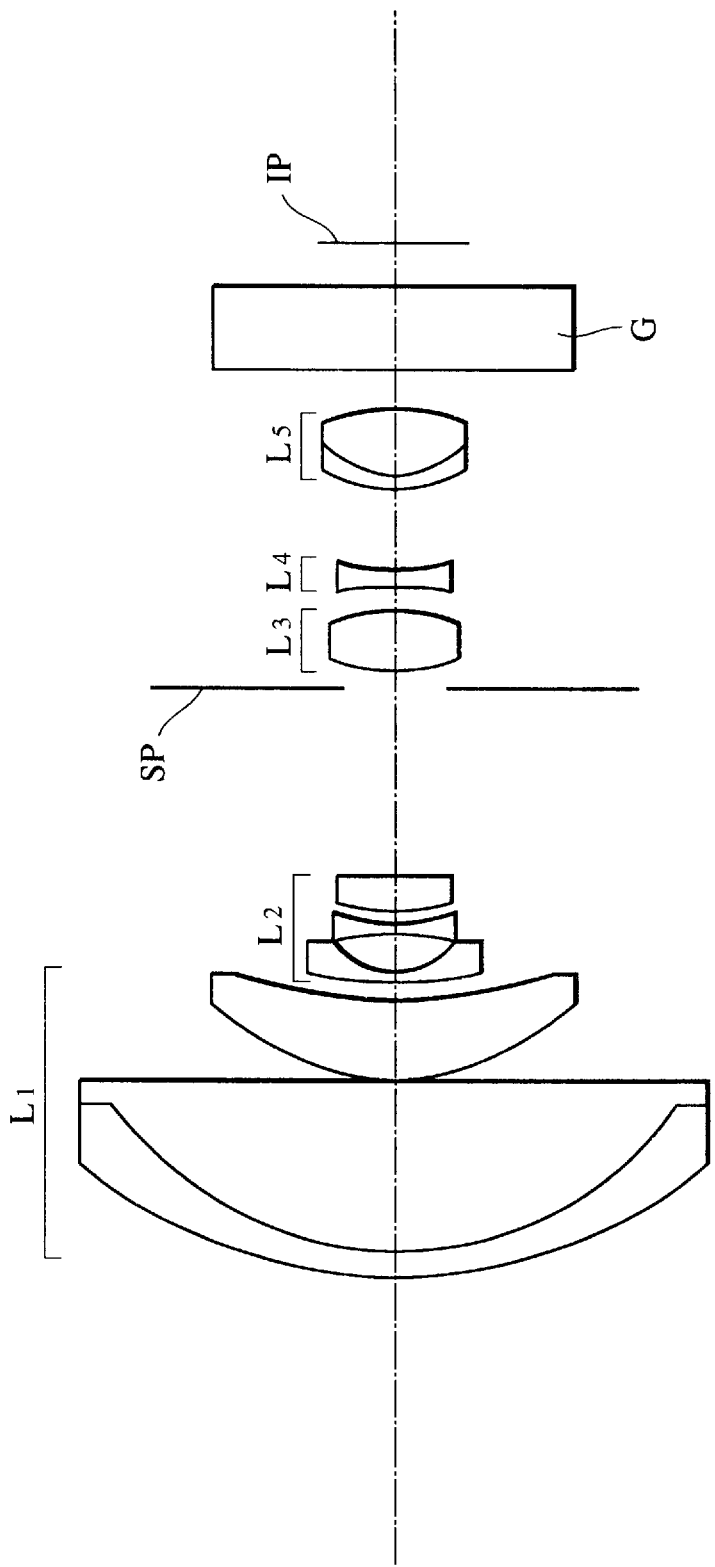
FIG. 45 is a cross sectional view of a lens according to Example 25 of the present invention at the wide angle end.
Figure 46:
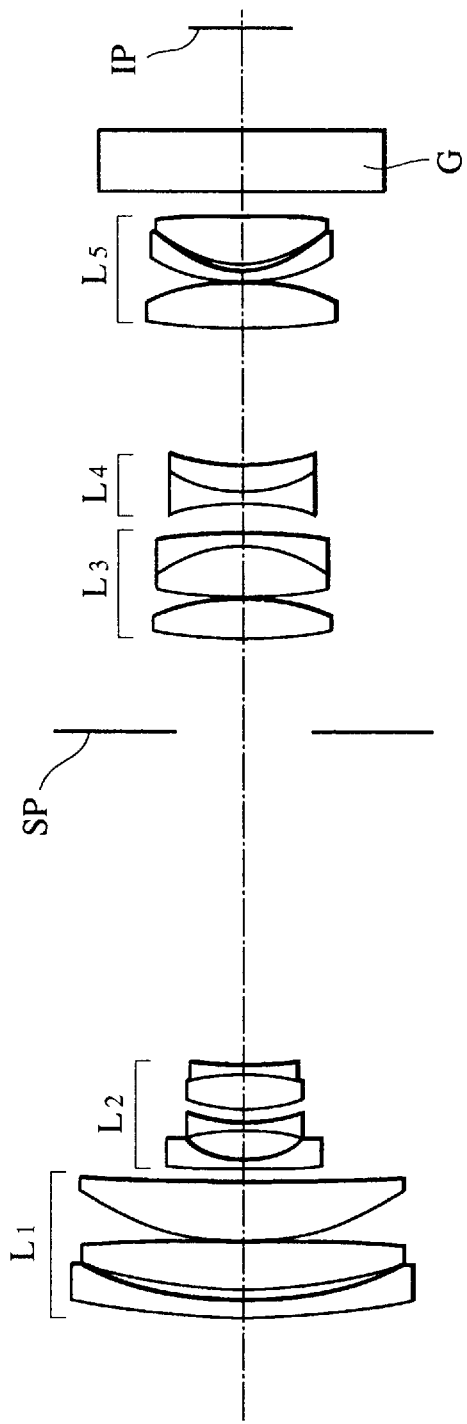
FIG. 46 is a cross sectional view of a lens according to Example 26 of the present invention at the wide angle end.
Figure 47:
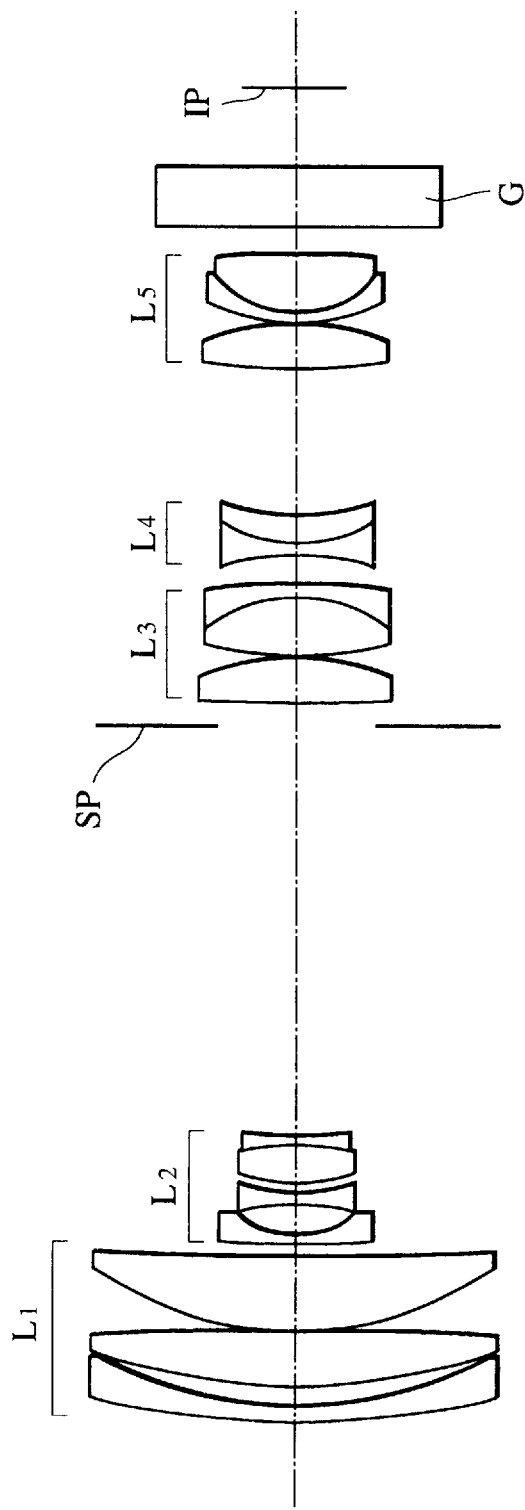
FIG. 47 is a cross sectional view of a lens according to Example 27 of the present invention at the wide angle end.

FIG. 1 is a diagram showing paraxial refracting power configuration of a zoom lens according to the present invention, which is the essential portion of the present invention. FIGS. 2 to 14 show the cross section of lenses according to this embodiment, and FIGS. 15(A)(1) to 27(B)(4) show the aberrations of each lens. In each aberration graph, graph (A) shows each wide angle end and (B) shows each telescopic end.

Referring to FIG. 1, reference numeral I represents a first lens unit having positive refracting power, II represents a second lens unit having negative refracting power, III represents a third lens unit having positive refracting power, IV represents a fourth lens unit having negative refracting power, and V represents a fifth lens unit having positive refracting power. Symbol IM represents an image surface at which a solid-image sensing device, such as a CCD, is disposed. Symbol SP represents an aperture. Zooming is performed from the wide angle end to the telescopic end in directions as indicated by arrows, that is, the second lens unit is moved toward the image surface and the fourth lens unit is moved toward the object to form a concave locus. Note that the continuous line indicates the locus of movement with respect to an infinite object and a dashed line indicates the locus with respect to a near object. Thus, focusing from an infinite object to a near object is performed by moving the fourth lens unit IV toward the image. Note that at least the first and fifth lens units always remain stationary during the zooming operation.

In place of the conventional focusing method in which the first lens unit is moved forwards, the fourth lens unit is moved to perform focusing so as to reduce the diameter of the front lens and to permit focusing of a near object to be performed.

Furthermore, the zoom lens according to this embodiment has a structure such that the second lens unit is moved in such a manner that the horizontal magnification $\beta_2$ crosses the equal magnification ($\beta_2=-1$) from the wide angle end to the telescopic end so as to obtain a high variable power ratio. Furthermore, change in the image surface occurring when the power is varied is, as described above, corrected by moving the fourth lens unit toward the object to form a concave locus facing the object. As a result, the space efficiency can be improved, and the diameter of the first lens unit can be shortened. Furthermore, a high zooming ratio (about 20 times in a major portions of examples) can be obtained.

Although it is preferable that the third lens unit be fixed to simplify the structure of the lens mount, the third lens unit may be moved to cause the third lens unit to share the equal magnification. Thus, the size reduction and high zooming ratio can simultaneously be realized.

As a result of employment of the foregoing structure, a zoom lens having a high zooming ratio and a small size can be provided. Furthermore, it is preferable that the following condition be satisfied.

Assuming that the focal length of the overall system at the wide angle end of the system and the distance from the fourth lens unit to the fifth lens unit with respect to an infinite object are $F_w$ and $D_{4w}$, respectively, the following relationship is held:

$$1.80 < D_{4w}/F_w < 3.9$$

The foregoing expression provides the range for correcting change in the image surface occurring due to the zooming, and the range, in which the fourth lens unit for performing focusing is moved. If the value is smaller than the lower limit, focusing of a sufficiently near object cannot easily be performed. If the value is larger than the upper limit, the overall size of the lens is enlarged excessively though the focusing can be performed easily.

The rear focusing zoom lens has a characteristic that the amount of the forward movement of the fourth lens unit, which is the focusing lens, is enlarged near the wide angle end than that near the telescopic end. The foregoing tendency becomes apparent in proportion to the zooming ratio. As contrasted with this, this embodiment has a structure as follows: assuming that the distance from the second lens unit to the third lens unit at the wide angle end of the system with respect to an infinite object is $D_{2w}$ and the distance from the fourth lens unit to the fifth lens unit at the wide angle end of the system with respect to an infinite object is $D_{4w}$, the following relationship is held:

$$1.5 < D_{2w}/D_{4w} < 3.5$$

Thus, a desired zooming ratio can be obtained and excellent focusing can be performed.

$D_{2w}$ is a range, in which the second lens unit serving as a main lens for varying the power is moved, and $D_{4w}$ is a range, in which the fourth lens unit for correcting change in the image surface and performing focusing operation is moved. By providing the range in which each lens unit is moved to satisfy the foregoing condition, appropriate zooming magnification and close distance can easily be realized. Although a zooming ratio can easily be increased if the value is larger than the upper limit, a difficulty arises in providing an amount in which the fourth lens unit is moved at the time of performing focusing. If the value is smaller than the lower limit, a desired zooming ratio cannot be maintained.

It is preferable that the following conditions be satisfied in relation to the optical power of the fourth lens unit:

$$0.4 < |D_{4w}/F_4| < 1.0$$

where $F_4$ is the focal length of the fourth lens unit. If the value is smaller than the lower limit, a difficulty arises in maintaining an amount of movement for the purpose of performing focusing. As a result, focusing of a near object cannot easily be performed. If the value is larger than the upper limit, the size of the overall lens system cannot be reduced though the focusing can be performed easily.

As described above, the amount of focusing at the short distance is large at the telescopic end. It is preferable that a zoom lens of a type capable of considerably varying the power meets the following range:

$$0.63 < |D_{4w}/F_4| < 1.0$$

Although a structure relative to the fourth lens unit has been described, satisfaction of the following condition will reduce the diameter of the front lens, realize a high zooming ratio and satisfactorily correct the aberration, in particular, the curvature of field.

That is, assuming that the focal lengths of the first lens unit and the second lens unit are $F_1$ and $F_2$, respectively, the following condition is required to be satisfied:

$$5.7 < |F_1/F_2| < 7$$

If the value is smaller than the lower limit, the considerable power variation raises a necessity of enlarging the amount of movement of the second lens unit. Thus, the size cannot be reduced and the diameter of the front lens is enlarged excessively. If the value is larger than the upper limit, the Petzval sum is enlarged excessively in a range of negative values. Thus, the image surface is excessively inclined toward the plus value portion.

In this embodiment, there is provided the zoom lens for use suitably in a video camera having a solid-image sensing device on the image surface thereof. To prevent change in the position of the exit pupil with respect to the solid-image sensing device while maintaining appropriate back focus, change of the sign of the magnification $\beta_4$ of the fourth lens unit with respect to an infinite object is prevented during zooming. If the magnification $\beta_4$ is changed undesirably simultaneously with the sign thereof, the angle of incident of light on the fixed fifth lens unit, which is the final lens unit, is undesirably changed. The foregoing structure, however, prevents the change in the position of the exit pupil.

It is further preferable that, assuming that the paraxial horizontal magnifications of the fourth lens unit at the wide angle end and the telescopic end with respect to an infinite object are $\beta 4_w$ and $\beta_{4T}$, respectively, setting be performed as follows:

$$\beta_{4w} \times \beta_{4T} > 0$$

To adequately maintaining the back focus of the lens while appropriately providing the exit pupil of the optical system, it is preferable that the following be always satisfied:

$$|\beta_5| < 0.25$$

or $$0 < \beta_5 < 0.25$$

If the value is out of the foregoing range, the back focus is lengthened, the lens system is enlarged and the exit pupil is shortened undesirably.

Furthermore, it is preferable that the following be satisfied assuming that the focal length of the i-th lens unit is Fi, the focal lengths of the overall system at the wide angle end and the telescopic end are $F_w$ and $F_t$, respectively:

$$0.25 < F_2/F_4 < 0.7$$

The foregoing expression provides an optimum power configuration of the movable lens units. If the value is larger than the upper limit, the amount of movement of the second lens unit for obtaining a desired variable power ratio is enlarged excessively. As a result, the diameter of the front lens and the size of the overall system are enlarged excessively. If the value is smaller than the lower limit, the amount of movement of the fourth lens unit, which is an image-surface correcting unit and is a focusing unit, is enlarged excessively. Thus, the size of the overall system is enlarged undesirably. The foregoing expression is required to provide an appropriate amount of movement of the movable lens units. Specifically, an appropriate amount of movement of the second lens unit is provided and the fourth lens unit is efficiently moved in order to vary the power. In particular, the foregoing expression is required to move the fourth lens unit from the wide angle end to the telescopic end to form a convex locus facing the image surface. More particularly, the expression is required to cause the same to substantially reciprocate.

Assuming that the ratio ($\beta_{2T}/\beta_{2w}$) of the magnifications of the second lens unit from the wide angle end to the telescopic end is Z2 and the ratio ($F_T/F_w$) of the focal lengths of the overall system is Z, it is preferable that the following be satisfied:

$$0.4 < Z2/Z < 1.3$$

The foregoing expression shows the ratio of the power variation ratio of the second lens unit with respect to that of the overall system. If the value is larger than the upper limit, any of the units in the lens system decreases the magnification during zooming. Thus, the power variation efficiency deteriorates and the size of the lens system is enlarged excessively. If the value is smaller than the lower limit, a plurality of lens units that contribute to the power variation exist. In this case, each lens unit cannot easily be controlled.

$$0.2 < |F2|/\sqrt{F_W \times F_1} < 0.7$$

The foregoing expression relates to the power of the second lens unit which is the main unit for changing the magnification. By appropriately selecting a value in the foregoing range, the significant power variation can be performed effectively. Specifically, if the value is smaller than the lower limit, the power of the second lens unit is strengthened excessively, the Petzval sum is enlarged in a range of negative values, and thus excess image surface (excess correction) takes place. What is worse, the sensitivity will be raised excessively, and out of focus and image shake easily take place. In this case, the mechanism and structure are complicated excessively. If the value is larger than the upper limit, the power of the second lens unit is weakened, causing the amount of movement of the second lens unit for realizing a desired variable power ratio to be enlarged. Thus, the size cannot be reduced.

It is preferable that F2 be included in the following range in order to enlarge the magnification:

$$0.2 < |F2|/\sqrt{F_W \times F_1} < 0.5$$

Furthermore, it is preferable that the following be satisfied:

$$1.5 < F_3/F_w < 4.5$$

$$1.9 \leq |F_4/F_w| < 5$$

$$1.6 < F_5/F_w < 5$$

The foregoing expressions relate to the power of the lens units disposed from the aperture to the image surface. Each range is set to prevent the position of the exit pupil of the zoom lens from being shortened so as to cause diagonal beams from the object to be made incident on the pupil at a small angle as described above in order to reduce the diameter of the front lens.

If each value is larger than the upper limit, the diagonal beams cannot be made incident at a small angle, and therefore the diameter of the front lens is undesirably enlarged. If the value is smaller than the lower limit, the exit pupil is shortened excessively toward the positive values, thus resulting in that telecentric beams with respect to the solid-image sensing device cannot be realized. What is worse, excessive aberration change takes place when zooming or focusing is performed. If the values are included in the foregoing ranges, a small size structure can be realized with which rangefinding (focusing) can be performed without the excessive change. If the values are out of the foregoing ranges, the diameter of the front lens and the size of the overall system are enlarged excessively. Furthermore, an appropriate emission angle with respect to the solid-image sensing device cannot be provided.

It is preferable that the position of the exit pupil satisfies the following:

$$-1.5 < F_4/F_5 < -0.75$$

If the value is larger than the upper limit, the refracting power of the fourth lens unit is strengthened, whereby the focusing distance is lengthened excessively. If the value is smaller than the lower limit, the amount of movement at the time of performing focusing is enlarged excessively. Thus, desired size reduction cannot be performed. What is worse, the refracting power of the fifth lens unit, which is the fixed imaging lens, is strengthened excessively. Thus, the exit pupil is excessively shortened.

To widen the field angle at the wide angle end, the distance e1 between the principal points of the positive first lens unit and the negative second lens unit at the wide angle end must be shortened to further shorten the focal length of the overall system to realize a wide angle. A certain air gap must be provided between the first lens unit and the second lens unit to prevent contact between the two lens units. Accordingly, it is preferable that the principal point of the first lens unit adjacent the image be located adjacent to the second lens unit, or the principal point of the second lens unit adjacent to the object be located adjacent to the first lens unit. In particular, it is preferable that the first lens unit satisfies the following conditional expression to as well as reduce the diameter of the front lens:

$$-0.25 < H_1'/F_1 < -0.05$$

where H1' is the distance from the vertex of the surface of the first lens unit nearest the image to the principal point of the first lens unit adjacent to the image (− indicates positions near the object, while + indicates positions near the image), and $F_1$ indicates the focal length of the first lens unit. The foregoing expression is required to shorten the distance from the principal point of the first lens unit to that of the second lens unit. If the value is smaller than the lower limit, the principal point of the first lens unit is moved excessively toward the object. Thus, e1 cannot be shortened. In the foregoing case, a desired wide angle cannot be realized. If the value is larger than the upper limit, the distance from the first lens unit to the second lens unit is lengthened excessively. As a result, the diameter of the front lens is enlarged excessively.

It is preferable that the following range be satisfied to reduce the diameter of the front lens:

$$-0.10 < H1'/F_1 < -0.05$$

To further reduce the size of the overall system, it is preferable that the following be satisfied:

$$1.5 < Bf_w/F_w < 4.0$$

where $Bf_w$ is the back focus at the wide angle end (except an element, such as a glass block or a filter, represented by G) when the distance from the object is infinite. The foregoing expression is required to reduce effectively the size of the overall system. If the value is smaller than the lower limit, a block, such as a filter, cannot be inserted, and the exit pupil is shortened. As a result, the forming of an image onto the image pickup device is undesirably out of the telecentric system. If the value is larger than the upper limit, desired size reduction cannot be performed.

To reduce the diameter of the front lens, it is preferable that the following be satisfied:

$$4.5 < F_1/F_w < 10$$

The foregoing expression relates to the object point with respect to the second lens unit, that is, to the magnification. To reduce the size of the overall system, it is preferable that the second lens unit perform the zooming while allowing the equal magnification to intervene. If the equal magnification is allowed to intervene, the locus of the zooming of the fourth lens unit is made to substantially reciprocate. Thus, significant power variation can be performed with the most effective space efficiency. Specifically, if the value is larger than the upper limit, the object point with respect to the second lens unit is made remote, the imaging magnification of the second lens unit is lowered, and desired size reduction cannot easily be performed. Furthermore, the distance from the first lens unit to the second lens unit is lengthened excessively, and the size reduction cannot easily be performed. If the value is smaller than the lower limit, the magnification of the second lens unit is enlarged and therefore large magnification cannot easily be realized.

To enlarge the magnification, it is preferable that the ratio be included in the following range:

$$7.5 < F_1/F_w < 10$$

As a specific lens structure, the first lens unit comprises a plurality of lenses including at least one negative lens, the second lens unit comprises a plurality of lenses including at least one positive lens, the third lens unit comprises at least one positive lens, the fourth lens unit comprises at least one negative lens, and the fifth lens unit comprises a plurality of lenses including at least one negative lens.

In particular, it is preferable that the first lens unit comprises three lenses consisting of, when viewed from the object, a negative meniscus lens having a convex facing the object, a positive lens having a convex facing the object, and a positive lens having a convex facing the object. It is preferable that the second lens unit comprises, when viewed from the object, a negative meniscus lens having a convex facing the object, a double-convex lens and a positive lens.

If an aspherical surface is provided for each surface of the third lens unit, advanced aberration correction can be performed. In a case where the third lens unit is composed of one lens, the aspherical surface may be provided for the surface facing the object or that facing the image surface. It is preferable that the aspherical surface be provided for the surface facing the object to relatively satisfactorily correct spherical aberration.

To prevent change in foe aberration occurring due to focusing, in particular, to prevent change in the chromatic aberration, it is preferable that the fourth lens unit be composed of a positive lens and a negative lens in such a manner that the positive lens and the negative lens are bonded to each other. It is preferable that the following be satisfied assuming that the Abbe's number of the positive lens and that of the negative lens are v4p and v4n:

$$v4p < v4n$$

If the foregoing relationship is not be held, the chromatic aberration is changed excessively due to the distance.

If the fourth lens unit comprises the positive lens and the negative lens that are bonded to each other as described above, the fourth lens unit, which is moved when zooming is performed and when focusing is performed, can be formed into one block. Thus, the structure can be simplified and the fourth lens unit can easily be supported.

Assuming that the Abbe's number of the positive lens and that of the negative lens of the fourth lens unit are v4p and v4n, it is preferable that the following be satisfied:

$$\nu 4n - \nu 4p > 15$$

To effectively change the chromatic aberration during zooming, it is preferable that the following expression be satisfied:

$$\nu 4n - \nu 4p > 30$$

If the lenses composing the fourth lens unit are formed into one block as described above, and particularly, if the positive lens and the negative lens are bonded to each other or if the fourth lens unit is composed of one negative lens, it is preferable that the image surface of the block facing the object has a concave facing the object and the surface facing the image has a concave facing the image.

The fifth lens unit is the positive lens unit, which is fixed during zooming, and, therefore, it easily encounters spherical aberration. To correct the spherical aberration, it is preferable that the fifth lens unit be composed of one or more positive lens and one or more negative lens. In a case where the fifth lens unit is composed of one positive lens and one negative lens, it is preferable that an aspherical surface be disposed on either of the surfaces. As a result, the spherical aberration can satisfactorily be corrected. To correct chromatic aberration, a bonded lens unit may be disposed. If focusing is performed by the fifth lens unit, it is preferable that the fifth lens unit be an integrated lens manufactured by bonding a negative lens and a positive lens because the weight of the lens can be reduced and its structure can be simplified. Thus, the fifth lens unit can be supported easily.

As described above, when the angle is widen, it is an important factor to shorten, at the wide angle end, the distance e1 between the principal point of the first lens unit and that of the second lens unit. To shorten e1, it is preferable that the shape of the first lens unit be as follows:

The first lens unit comprises a negative meniscus lens L11 having a convex facing the object, an air gap, a positive lens L12, and a positive lens L13 having a convex facing the object, the foregoing elements being disposed in the foregoing sequential order when viewed from the object. Furthermore, the air lens defined by the lenses L11 and L12 has negative refracting power.

To shorten e1 at the wide angle end, it is preferable that the second lens unit has a structure such that its principal point facing the object is disposed adjacent to the object.

Specifically, the second lens unit comprises a negative meniscus lens L21 having a convex facing the object, a double-concave negative lens L22, air gap, and a positive lens L23, the foregoing elements being disposed when viewed from the object. The foregoing air gap causes the principal point of the second lens unit facing the object to be moved toward the first lens unit to shorten e1 at the wide angle end. Thus, the angle can effectively be widened. A negative lens L24 may be disposed adjacent to the lens L23 on the side on which the lens L23 faces the image. The lens L24 causes the principal point of the second lens unit facing the object to be moved toward the first lens unit. Furthermore, change in the chromatic aberration occurring due to the zooming can be prevented.

A small size and wide angle zoom lens can be obtained by, in the foregoing structure, forming the structure to satisfy the following, assuming that the outer diameter of the lens nearest the object is $\phi 1$, and the focal length of the overall system at the wide angle end is $F_w$:

$$0.10 < F_w/\phi_1 < 0.20$$

Generally, when the focal length $F_w$ at the wide angle end is shortened, the diameter $\phi_1$ of the front lens is enlarged accordingly. On the contrary, if the focal length $F_w$ at the wide angle end is lengthened, the diameter $\phi_1$ of the front lens is reduced though the degree depends upon the brightness of the telescopic end of the lens. The foregoing expression indicates an appropriate relationship between the diameter of the front lens and the focal length at the wide angle end to realize a small size and wide angle zoom lens. If the foregoing ratio is out of the foregoing range, a small size and wide angle zoom lens cannot be provided. Specifically, if the value is larger than the upper limit, a zoom lens like a telescopic zoom lens is realized. If the value is smaller than the lower limit, a zoom lens having a large size is realized.

The diameter $\phi_1$ of the front lens is substantially the optically effective diameter of the first lens unit and is an actual outer diameter of the lens. The diameter $\phi_1$ of the front lens is larger than the optically effective diameter of the first lens unit by 0% to 6%.

Although the fifth lens unit is caused to remain stationary during zooming, it may be moved when focusing is performed.

Then, examples of the present invention will now be described.

In the examples, ri is the curvature radius of the i-th lens surface counted in a direction from an object, di is the thickness of the lens and the air gap counted in the direction from the object, and ni and vi are refracting power and Abbe's number of the i-th lens counted in the direction from the object.

Under conditions that X-axis stands for the direction of the optical axis, Y-axis stands for the direction perpendicular to the optical axis, a direction in which light travels is positive, the intersection between the vertex of the lens and the X-axis is made to be the original point, r is the paraxial curvature radius of the lens surface, and k, $A_2$, $A_3$, $A_4$ and $A_5$ are aspherical surface coefficients, the aspherical surface is expressed by the following equation:

$$X = \frac{(1/r)Y^2}{1 + \sqrt{1 - (1+k)(Y/r)^2}} + A_2 Y^4 + A_3 Y^6 + A_4 Y^8 + A_5 Y^{10}$$

Expression "D-0X" indicates "$10^{-X}$". Symbol G represents a force plate or the like.

EXAMPLE 1

| f = 1~19.57 Fno = 1.85~3.59 2ω = 67.5°~3.9° | | | | |
|---|---|---|---|---|
| R1 = | 13.101 | D1 = 0.33 | N1 = 1.846659 | ν1 = 23.8 |
| R2 = | 6.721 | D2 = 0.29 | | |
| R3 = | 9.490 | D3 = 0.95 | N2 = 1.603112 | ν2 = 60.7 |
| R4 = | −89.131 | D4 = 0.05 | | |
| R5 = | 5.414 | D5 = 1.06 | N3 = 1.603112 | ν3 = 60.7 |
| R6 = | 88.678 | D6 = VARIABLE | | |
| R7 = | 25.128 | D7 = 0.16 | N4 = 1.882997 | ν4 = 40.8 |

-continued

|   | R8 = | 1.503 | D8 = 0.51 | | |
|---|---|---|---|---|---|
|   | R9 = | -4.687 | D9 = 0.16 | N5 = 1.834807 | ν5 = 42.7 |
|   | R10 = | 2.719 | D10 = 0.27 | | |
|   | R11 = | 3.171 | D11 = 0.61 | N6 = 1.846659 | ν6 = 23.8 |
|   | R12 = | -7.254 | D12 = 0.02 | | |
|   | R13 = | -11.421 | D13 = 0.16 | N7 = 1.772499 | ν7 = 49.6 |
|   | R14 = | 16.005 | D14 = VARIABLE | | |
|   | R15 = | (DIAPHRAGM) | D15 = 0.46 | | |
|   | R16 = | 7.963 | D16 = 0.89 | N8 = 1.603112 | ν8 = 60.7 |
|   | R17 = | -4.826 | D17 = 0.05 | | |
|   | R18 = | 3.208 | D18 = 0.81 | N9 = 1.603112 | ν9 = 60.7 |
|   | R19 = | -11.955 | D19 = 0.07 | | |
|   | R20 = | 6.226 | D20 = 0.27 | N10 = 1.834000 | ν10 = 37.2 |
|   | R21 = | 2.723 | D21 = 0.06 | | |
|   | R22 = | 3.150 | D22 = 0.69 | N11 = 1.603112 | ν11 = 60.7 |
|   | R23 = | -5.406 | D23 = VARIABLE | | |
|   | R24 = | -5.280 | D24 = 0.19 | N12 = 1.772499 | ν12 = 49.6 |
|   | R25 = | 5.174 | D25 = VARIABLE | | |
|   | R26 = | 20.183 | D26 = 0.82 | N13 = 1.603112 | ν13 = 60.7 |
|   | R27 = | -4.420 | D27 = 0.05 | | |
|   | R28 = | 3.072 | D28 = 0.19 | N14 = 1.846659 | ν14 = 23.8 |
|   | R29 = | 2.090 | D29 = 0.15 | | |
|   | R30 = | 2.222 | D30 = 0.82 | N15 = 1.516330 | ν15 = 64.2 |
|   | R31 = | -29.049 | D31 = 0.55 | | |
| G | R32 = | ∞ | D32 = 1.18 | N16 = 1.516330 | ν16 = 64.2 |
|   | R33 = | ∞ | | | |

| VARIABLE | FOCAL LENGTH | | |
|---|---|---|---|
| DISTANCE | 1.00 | 7.74 | 19.57 |
| D6 | 0.25 | 4.74 | 6.01 |
| D14 | 6.23 | 1.74 | 0.47 |
| D23 | 0.32 | 2.31 | 1.06 |
| D25 | 2.75 | 0.76 | 2.01 |

EXAMPLE 2 f = 1~19.60 Fno = 1.85~3.59 2ω = 67.6°~3.9°

|   | R1 = | 12.800 | D1 = 0.33 | N1 = 1.846659 | ν1 = 23.8 |
|---|---|---|---|---|---|
|   | R2 = | 6.548 | D2 = 0.24 | | |
|   | R3 = | 8.744 | D3 = 0.93 | N2 = 1.603112 | ν2 = 60.7 |
|   | R4 = | -91.307 | D4 = 0.05 | | |
|   | R5 = | 5.318 | D5 = 1.05 | N3 = 1.603112 | ν3 = 60.7 |
|   | R6 = | 89.506 | D6 = VARIABLE | | |
|   | R7 = | 68.327 | D7 = 0.16 | N4 = 1.882997 | ν4 = 40.8 |
|   | R8 = | 1.718 | D8 = 0.51 | | |
|   | R9 = | -4.669 | D9 = 0.16 | N5 = 1.834807 | ν5 = 42.7 |
|   | R10 = | 2.903 | D10 = 0.27 | | |
|   | R11 = | 3.294 | D11 = 0.61 | N6 = 1.846659 | ν6 = 23.8 |
|   | R12 = | -6.563 | D12 = 0.02 | | |
|   | R13 = | -11.877 | D13 = 0.16 | N7 = 1.772499 | ν7 = 49.6 |
|   | R14 = | 9.429 | D14 = VARIABLE | | |
|   | R15 = | (DIAPHRAGM) | D15 = VARIABLE | | |
|   | R16 = | 8.067 | D16 = 0.80 | N8 = 1.603112 | ν8 = 60.7 |
|   | R17 = | -5.091 | D17 = 0.05 | | |
|   | R18 = | 3.527 | D18 = 0.82 | N9 = 1.603112 | ν9 = 60.7 |
|   | R19 = | -12.033 | D19 = 0.09 | | |
|   | R20 = | -6.103 | D20 = 0.27 | N10 = 1.834000 | ν10 = 37.2 |
|   | R21 = | 2.842 | D21 = 0.05 | | |
|   | R22 = | 3.131 | D22 = 0.72 | N11 = 1.603112 | ν11 = 60.7 |
|   | R23 = | -5.316 | D23 = VARIABLE | | |
|   | R24 = | -5.373 | D24 = 0.19 | N12 = 1.772499 | ν12 = 49.6 |
|   | R25 = | 5.527 | D25 = VARIABLE | | |
|   | R26 = | 8.977 | D26 = 0.82 | N13 = 1.603112 | ν13 = 60.7 |
|   | R27 = | -4.983 | D27 = 0.05 | | |
|   | R28 = | 3.004 | D28 = 0.19 | N14 = 1.846659 | ν14 = 23.8 |
|   | R29 = | 2.084 | D29 = 0.10 | | |
|   | R30 = | 2.367 | D30 = 0.90 | N15 = 1.516330 | ν15 = 64.2 |
|   | R31 = | 559.466 | D31 = 0.55 | | |
| G | R32 = | ∞ | D32 = 1.19 | N16 = 1.516330 | ν16 = 64.2 |
|   | R33 = | ∞ | | | |

-continued

| VARIABLE | FOCAL LENGTH | | |
|---|---|---|---|
| DISTANCE | 1.00 | 8.18 | 19.60 |
| D6 | 0.25 | 4.27 | 5.41 |
| D14 | 5.53 | 1.50 | 0.37 |
| D15 | 1.73 | 0.66 | 0.36 |
| D23 | 0.32 | 2.85 | 2.09 |
| D25 | 2.73 | 1.26 | 2.32 |

EXAMPLE 3 f = 1~20.05  Fno = 1.85~3.59  2ω = 62.9°~3.5°

| | | | | |
|---|---|---|---|---|
| R1 = | 15.447 | D1 = 0.30 | N1 = 1.846659 | ν1 = 23.8 |
| R2 = | 7.375 | D2 = 0.23 | | |
| R3 = | 10.645 | D3 = 0.84 | N2 = 1.603112 | ν2 = 60.7 |
| R4 = | −36.500 | D4 = 0.05 | | |
| R5 = | 5.434 | D5 = 1.05 | N3 = 1.603112 | ν3 = 60.7 |
| R6 = | 53.752 | D6 = VARIABLE | | |
| R7 = | 36.191 | D7 = 0.15 | N4 = 1.882997 | ν4 = 40.8 |
| R8 = | 1.718 | D8 = 0.50 | | |
| R9 = | −5.552 | D9 = 0.15 | N5 = 1.834000 | ν5 = 37.2 |
| R10 = | 3.669 | D10 = 0.27 | | |
| R11 = | 3.494 | D11 = 0.62 | N6 = 1.846659 | ν6 = 23.8 |
| R12 = | −3.680 | D12 = 0.04 | | |
| R13 = | −3.363 | D13 = 0.17 | N7 = 1.785896 | ν7 = 44.2 |
| R14 = | 15.751 | D14 = VARIABLE | | |
| R15 = | (DIAPHRAGM) | D15 = VARIABLE | | |
| R16 = | 14.991 | D16 = 0.68 | N8 = 1.583126 | ν8 = 59.4 |
| R17 = | −4.832 | D17 = 0.05 | | |
| R18 = | 7.603 | D18 = 0.93 | N9 = 1.719995 | ν9 = 50.3 |
| R19 = | −2.730 | D19 = 0.25 | N10 = 1.846659 | ν10 = 23.8 |
| R20 = | −10.068 | D20 = VARIABLE | | |
| R21 = | −4.381 | D21 = 0.17 | N11 = 1.603112 | ν11 = 60.7 |
| R22 = | 2.530 | D22 = 0.50 | N12 = 1.846659 | ν12 = 23.8 |
| R23 = | 3.871 | D23 = VARIABLE | | |
| R24 = | 12.568 | D24 = 0.82 | N13 = 1.583126 | ν13 = 59.4 |
| R25 = | −4.243 | D25 = 0.05 | | |
| R26 = | 3.627 | D26 = 0.17 | N14 = 1.846659 | ν14 = 23.8 |
| R27 = | 2.027 | D27 = 0.12 | | |
| R28 = | 2.151 | D28 = 0.87 | N15 = 1.515330 | ν15 = 64.2 |
| R29 = | −32.087 | D29 = 0.50 | | |
| G { R30 = | ∞ | D30 = 1.08 | N16 = 1.516330 | ν16 = 64.2 |
| R31 = | ∞ | | | |

| VARIABLE | FOCAL LENGTH | | |
|---|---|---|---|
| DISTANCE | 1.00 | 8.45 | 20.05 |
| D6 | 0.22 | 4.59 | 5.82 |
| D14 | 5.95 | 1.58 | 0.35 |
| D15 | 1.76 | 0.79 | 0.52 |
| D20 | 0.54 | 2.93 | 1.74 |
| D23 | 2.54 | 1.12 | 2.59 |

EXAMPLE 4 f = 1~19.70  Fno = 1.65~2.84  2ω = 62.1°~3.5°

| | | | | |
|---|---|---|---|---|
| R1 = | 15.257 | D1 = 0.30 | N1 = 1.846659 | ν1 = 23.8 |
| R2 = | 4.634 | D2 = 0.36 | | |
| R3 = | 10.870 | D3 = 0.99 | N2 = 1.603112 | ν2 = 60.7 |
| R4 = | −84.464 | D4 = 0.05 | | |
| R5 = | 6.156 | D5 = 1.33 | N3 = 1.603112 | ν3 = 60.7 |
| R6 = | 95.517 | D6 = VARIABLE | | |
| R7 = | 22.162 | D7 = 0.15 | N4 = 1.882997 | ν4 = 40.8 |
| R8 = | 1.597 | D8 = 0.50 | | |
| R9 = | −4.863 | D9 = 0.15 | N5 = 1.834807 | ν5 = 37.2 |
| R10 = | 4.907 | D10 = 0.27 | | |

-continued

|   | | | | | |
|---|---|---|---|---|---|
| | R11 = | 3.779 | D11 = 0.62 | N6 = 1.846659 | ν6 = 23.8 |
| | R12 = | −4.675 | D12 = 0.03 | | |
| | R13 = | −3.804 | D13 = 0.17 | | |
| | R14 = | 217.759 | D14 = VARIABLE | | |
| | R15 = | (DIAPHRAGM) | D15 = 0.42 | | |
| | R16 = | 53.443 | D16 = 0.85 | N7 = 1.785896 | ν7 = 44.2 |
| | R17 = | −4.258 | D17 = 0.05 | N8 = 1.583126 | ν8 = 59.8 |
| | R18 = | 5.595 | D18 = 1.05 | N9 = 1.719995 | ν9 = 50.3 |
| | R19 = | −2.961 | D19 = 0.25 | N10 = 1.846659 | ν10 = 23.8 |
| | R20 = | −12.916 | D20 = VARIABLE | | |
| | R21 = | −4.385 | D21 = 0.17 | N11 = 1.603112 | ν11 = 60.7 |
| | R22 = | 1.992 | D22 = 0.49 | N12 = 1.846659 | ν12 = 23.8 |
| | R23 = | 3.225 | D23 = VARIABLE | | |
| | R24 = | 9.664 | D24 = 0.75 | N13 = 1.583126 | ν13 = 59.4 |
| | R25 = | −4.531 | D25 = 0.05 | | |
| | R26 = | 3.530 | D26 = 0.17 | N14 = 1.846659 | ν14 = 23.8 |
| | R27 = | 1.790 | D27 = 0.03 | | |
| | R28 = | 1.812 | D28 = 1.06 | N15 = 1.516330 | ν15 = 64.2 |
| | R29 = | −18.764 | D29 = 0.49 | | |
| G | R30 = | ∞ | D30 = 1.07 | N16 = 1.516330 | ν16 = 64.2 |
| | R31 = | ∞ | | | |

| VARIABLE | FOCAL LENGTH | | |
|---|---|---|---|
| DISTANCE | 1.00 | 7.66 | 19.70 |
| D6 | 0.22 | 5.40 | 6.86 |
| D14 | 7.28 | 2.11 | 0.65 |
| D20 | 0.50 | 2.22 | 1.12 |
| D23 | 2.68 | 0.96 | 2.06 |

EXAMPLE 5

| f = 1~19.48 Fno = 1.65~3.65 2ω = 62.0°~3.5° | | | | | |
|---|---|---|---|---|---|
| | R1 = | 15.492 | D1 = 0.29 | N1 = 1.846659 | ν1 = 23.8 |
| | R2 = | 7.600 | D2 = 0.22 | | |
| | R3 = | 11.946 | D3 = 0.74 | N2 = 1.603112 | ν2 = 60.7 |
| | R4 = | −34.062 | D4 = 0.05 | | |
| | R5 = | 5.459 | D5 = 0.94 | N3 = 1.603112 | ν3 = 60.7 |
| | R6 = | 45.879 | D6 = VARIABLE | | |
| | R7 = | 18.340 | D7 = 0.15 | N4 = 1.882997 | ν4 = 40.8 |
| | R8 = | 1.431 | D8 = 0.50 | | |
| | R9 = | −2.391 | D9 = 0.15 | N5 = 1.804000 | ν5 = 46.6 |
| | R10 = | 8.122 | D16 = 0.21 | | |
| | R11 = | 5.326 | D11 = 0.39 | N6 = 1.846659 | ν6 = 23.8 |
| | R12 = | −6.425 | D12 = VARIABLE | | |
| | R13 = | (DIAPHRAGM) | D13 = 0.32 | | |
| | R14 = | 10.085 | D14 = 0.74 | N7 = 1.638539 | ν7 = 55.4 |
| | R15 = | −4.741 | D15 = 0.05 | | |
| | R16 = | 6.192 | D16 = 1.14 | N8 = 1.719995 | ν8 = 50.3 |
| | R17 = | −2.338 | D17 = 0.17 | N9 = 1.846659 | ν9 = 23.8 |
| | R18 = | −11.140 | D18 = VARIABLE | | |
| | R19 = | −3.115 | D19 = 0.52 | N10 = 1.846659 | ν10 = 23.8 |
| | R20 = | −1.961 | D29 = 0.17 | N11 = 1.603112 | ν11 = 60.7 |
| | R21 = | 3.973 | D21 = VARIABLE | | |
| | R22 = | 8.417 | D22 = 0.76 | N12 = 1.583126 | ν12 = 59.4 |
| | R23 = | −3.992 | D23 = 0.05 | | |
| | R24 = | 2.907 | D24 = 0.15 | N13 = 1.846659 | ν13 = 23.8 |
| | R25 = | 1.605 | D25 = 0.10 | | |
| | R26 = | 1.678 | D26 = 0.90 | N14 = 1.516330 | ν14 = 64.2 |
| | R27 = | 62.998 | D27 = 0.49 | | |
| G | R28 = | ∞ | D28 = 1.07 | N15 = 1.516330 | ν15 = 64.2 |
| | R29 = | ∞ | | | |

| VARIABLE | FOCAL LENGTH | | |
|---|---|---|---|
| DISTANCE | 1.00 | 8.08 | 19.48 |
| D6 | 0.22 | 5.20 | 6.60 |
| D12 | 6.66 | 1.68 | 0.28 |
| D18 | 0.55 | 1.94 | 0.01 |
| D21 | 2.12 | 0.73 | 2.67 |

EXAMPLE 6

| | | f = 1~19.89 Fno = 1.85~3.59 2ω = 62.9°~3.5° | | |
|---|---|---|---|---|
| | R1 = | 9.431 | D1 = 0.30 | N1 = 1.846659 | ν1 = 23.8 |
| | R2 = | 5.526 | D2 = 0.47 | | |
| | R3 = | 11.054 | D3 = 0.67 | N2 = 1.603112 | ν2 = 60.7 |
| | R4 = | 73.823 | D4 = 0.05 | | |
| | R5 = | 5.258 | D5 = 1.25 | N3 = 1.603112 | ν3 = 60.7 |
| | R6 = | −53.851 | D6 = VARIABLE | | |
| | R7 = | 313.377 | D7 = 0.15 | N4 = 1.882997 | ν4 = 40.8 |
| | R8 = | 1.345 | D8 = 0.51 | | |
| | R9 = | −3.226 | D9 = 0.15 | N5 = 1.834807 | ν5 = 42.7 |
| | R10 = | 8.593 | D10 = 0.15 | | |
| | R11 = | 3.561 | D11 = 0.62 | N6 = 1.846659 | ν6 = 23.8 |
| | R12 = | −5.519 | D12 = 0.17 | | |
| | R13 = | −21.441 | D13 = 0.17 | N7 = 1.834807 | ν7 = 42.7 |
| | R14 = | 11.42 | D14 = VARIABLE | | |
| | R15 = | (DIAPHRAGM) | D15 = 0.35 | | |
| | R16 = | 12.921 | D16 = 0.89 | N8 = 1.516330 | ν8 = 64.2 |
| | R17 = | −3.641 | D17 = 0.04 | | |
| | R18 = | 4.127 | D18 = 0.85 | N9 = 1.603112 | ν9 = 60.7 |
| | R19 = | −4.391 | D19 = 0.03 | | |
| | R20 = | −3.946 | D20 = 0.20 | N10 = 1.846659 | ν10 = 23.8 |
| | R21 = | −16.696 | D21 = VARIABLE | | |
| | R22 = | −6.000 | D22 = 0.50 | N11 = 1.805177 | ν11 = 25.4 |
| | R23 = | −2.018 | D23 = 0.11 | N12 = 1.834807 | ν12 = 42.7 |
| | R24 = | 8.444 | D24 = VARIABLE | | |
| | R25 = | 8.240 | D25 = 0.75 | N13 = 1.603112 | ν13 = 60.7 |
| | R26 = | −4.299 | D26 = 0.05 | | |
| | R27 = | 3.551 | D27 = 0.17 | N14 = 1.846659 | ν14 = 23.8 |
| | R28 = | 1.825 | D23 = 0.08 | | |
| | R29 = | 2.072 | D29 = 0.75 | N15 = 1.603112 | ν15 = 60.7 |
| | R30 = | 19.436 | D30 = 0.50 | | |
| G | R31 = | ∞ | D31 = 1.08 | N16 = 1.516330 | ν16 = 64.2 |
| | R32 = | ∞ | | | |

| VARIABLE DISTANCE | FOCAL LENGTH | | |
|---|---|---|---|
| | 1.00 | 7.75 | 19.89 |
| D6 | 0.22 | 5.05 | 6.41 |
| D14 | 6.54 | 1.72 | 0.36 |
| D21 | 0.50 | 2.41 | 0.84 |
| D24 | 2.56 | 0.64 | 2.22 |

EXAMPLE 7

| | f = 1~19.73 Fno = 1.85~3.59 2ω = 62.6°~3.5° | | | |
|---|---|---|---|---|
| R1 = | 13.356 | D1 = 0.30 | N1 = 1.846659 | ν1 = 23.8 |
| R2 = | 6.662 | D2 = 1.03 | N2 = 1.603112 | ν2 = 60.7 |
| R3 = | −54.071 | D3 = 0.05 | | |
| R4 = | 5.947 | D4 = 0.75 | N3 = 1.696797 | ν3 = 55.5 |
| R5 = | 16.445 | D5 = VARIABLE | | |
| R6 = | 50.069 | D6 = 0.15 | N4 = 1.882997 | ν4 = 40.8 |
| R7 = | 1.413 | D7 = 0.55 | | |
| R8 = | −3.031 | D8 = 0.15 | N5 = 1.804000 | ν5 = 46.6 |
| R9 = | 5.669 | D9 = 0.23 | | |
| R10 = | 4.087 | D10 = 0.50 | N6 = 1.846659 | ν6 = 23.8 |
| R11 = | −5.071 | D11 = 0.05 | | |
| R12 = | −6.109 | D12 = 0.20 | N7 = 1.772499 | ν7 = 49.6 |
| R13 = | 439.693 | D13 = VARIABLE | | |
| R14 = | (DIAPHRAGM) | D14 = 0.48 | | |
| R15 = | 33.345 | D15 = 0.72 | N8 = 1.583126 | ν8 = 59.4 |
| R16 = | −3.950 | D16 = 0.04 | | |
| R17 = | 4.765 | D17 = 0.99 | N9 = 1.696797 | ν9 = 55.5 |
| R18 = | −2.817 | D18 = 0.20 | N10 = 1.846659 | ν10 = 23.8 |
| R19 = | −12.811 | D19 = VARIABLE | | |
| R20 = | −4.773 | D20 = 0.17 | N11 = 1.712995 | ν11 = 53.8 |
| R21 = | 2.392 | D21 = 0.45 | N12 = 1.846659 | ν12 = 23.8 |
| R22 = | 4.652 | D22 = VARIABLE | | |
| R23 = | 16.777 | D23 = 0.74 | N13 = 1.583126 | ν13 = 59.4 |

-continued

|   | | | | |
|---|---|---|---|---|
|   | R24 = | −4.722 | D24 = 0.05 | | |
|   | R25 = | 10.243 | D25 = 0.17 | N14 = 1.805181 | ν14 = 25.4 |
|   | R26 = | 2.560 | D26 = 0.09 | | |
|   | R27 = | 3.559 | D27 = 0.74 | N15 = 1.696797 | ν15 = 55.5 |
|   | R28 = | −4.763 | D28 = 0.50 | | |
| G | R29 = | ∞ | D29 = 1.08 | N16 = 1.516330 | ν16 = 64.2 |
|   | R30 = | ∞ | | | |

| VARIABLE | FOCAL LENGTH | | |
|---|---|---|---|
| DISTANCE | 1.00 | 7.27 | 19.73 |
| D5 | 0.22 | 4.81 | 6.10 |
| D13 | 6.54 | 1.96 | 0.66 |
| D19 | 0.49 | 1.99 | 0.96 |
| D22 | 2.40 | 0.90 | 1.92 |

EXAMPLE 8

| f = 1~19.89 Fno = 1.65~3.69 2ω = 62.1°~3.5° | | | | |
|---|---|---|---|---|
| R1 = | 14.031 | D1 = 0.29 | N1 = 1.846659 | ν1 = 23.8 |
| R2 = | 7.255 | D2 = 0.17 | | |
| R3 = | 10.215 | D3 = 0.71 | N2 = 1.603112 | ν2 = 60.7 |
| R4 = | −73.155 | D4 = 0.05 | | |
| R5 = | 5.592 | D5 = 0.91 | N3 = 1.603112 | ν3 = 60.7 |
| R6 = | 56.632 | D6 = VARIABLE | | |
| R7 = | 12.094 | D7 = 0.15 | N4 = 1.882997 | ν4 = 40.8 |
| R8 = | 1.481 | D8 = 0.53 | | |
| R9 = | −2.118 | D9 = 0.15 | N5 = 1.804000 | ν5 = 46.6 |
| R10 = | 6.456 | D10 = 0.21 | | |
| R11 = | 5.707 | D11 = 0.44 | N6 = 1.846659 | ν6 = 23.8 |
| R12 = | −5.707 | D12 = VARIABLE | | |
| R13 = | (DIAPHRAGM) | D13 = 0.32 | | |
| R14 = | 25.382 | D14 = 0.64 | N7 = 1.719995 | ν7 = 50.3 |
| R15 = | −4.947 | D15 = 0.05 | | |
| R16 = | 6.790 | D16 = 1.18 | N8 = 1.719995 | ν8 = 50.3 |
| R17 = | −2.463 | D17 = 0.17 | N9 = 1.846659 | ν9 = 23.8 |
| R18 = | −9.436 | D18 = VARIABLE | | |
| R19 = | −3.313 | D19 = 0.49 | N10 = 1.846659 | ν10 = 23.8 |
| R20 = | −20.86 | D20 = 0.17 | N11 = 1.603112 | ν11 = 60.7 |
| R21 = | 5.636 | D21 = VARIABLE | | |
| R22 = | 9.117 | D22 = 0.74 | N12 = 1.583126 | ν12 = 59.4 |
| *R23 = | −3.865 | D23 = 0.05 | | |
| R24 = | 2.938 | D24 = 0.15 | N13 = 1.846659 | ν13 = 23.8 |
| R25 = | 1.509 | D25 = 0.02 | | |
| R26 = | 1.542 | D26 = 0.98 | N14 = 1.518229 | ν14 = 59.0 |
| R27 = | 24.557 | D27 = 0.49 | | |
| G { R28 = | ∞ | D28 = 0.91 | N15 = 1.516330 | ν15 = 64.2 |
| R29 = | ∞ | | | |

| VARIABLE | FOCAL LENGTH | | |
|---|---|---|---|
| DISTANCE | 1.00 | 8.01 | 19.89 |
| D6 | 0.22 | 5.20 | 6.61 |
| D12 | 6.68 | 1.70 | 0.29 |
| D18 | 0.52 | 2.39 | 0.52 |
| D21 | 2.87 | 1.00 | 2.87 |

ASPHERICAL COEFFICIENT

R23 K = −5.18006e−01 B = 2.88359e−04 C = 1.63206e−04 D = 8.64643e−05 E = −4.65602e−05

EXAMPLE 9 f = 1~19.87 Fno = 1.65~3.69 2ω = 62.1°~3.5°

|   | R | | D | | N | | ν | |
|---|---|---|---|---|---|---|---|---|
|   | R1 = | 17.601 | D1 = 0.29 | | N1 = 1.846659 | | ν1 = 23.8 | |
|   | R2 = | 8.134 | D2 = 0.10 | | | | | |
|   | R3 = | 9.961 | D3 = 0.81 | | N2 = 1.603112 | | ν2 = 60.7 | |
|   | R4 = | −30.879 | D4 = 0.05 | | | | | |
|   | R5 = | 5.593 | D5 = 0.81 | | N3 = 1.603112 | | ν3 = 60.7 | |
|   | R6 = | 24.342 | D6 = VARIABLE | | | | | |
|   | R7 = | 9.547 | D7 = 0.15 | | N4 = 1.882997 | | ν4 = 40.8 | |
|   | R8 = | 1.497 | D8 = 0.53 | | | | | |
|   | R9 = | −2.051 | D9 = 0.15 | | N5 = 1.804000 | | ν5 = 46.6 | |
|   | R10 = | 5.740 | D10 = 0.21 | | | | | |
|   | R11 = | 5.624 | D11 = 0.44 | | N6 = 1.846659 | | ν6 = 23.8 | |
|   | R12 = | −5.624 | D12 = VARIABLE | | | | | |
|   | R13 = | (DIAPHRAGM) | D13 = 0.32 | | | | | |
|   | R14 = | 400.612 | D14 = 0.64 | | N7 = 1.719995 | | ν7 = 50.3 | |
|   | R15 = | −4.836 | D15 = 0.05 | | | | | |
|   | R16 = | 6.637 | D16 = 1.18 | | N8 = 1.719995 | | ν8 = 50.3 | |
|   | R17 = | 2.477 | D17 = 0.17 | | N9 = 1.846659 | | ν9 = 23.8 | |
|   | R18 = | −8.179 | D18 = VARIABLE | | | | | |
|   | R19 = | −3.442 | D19 = 0.49 | | N10 = 1.846659 | | ν10 = 23.8 | |
|   | R20 = | −2.129 | D20 = 0.17 | | N11 = 1.603112 | | ν11 = 60.7 | |
|   | R21 = | 6.542 | D21 = VARIABLE | | | | | |
|   | R22 = | 8.308 | D22 = 0.69 | | N12 = 1.516330 | | ν12 = 64.2 | |
|   | R23 = | −4.310 | D23 = 0.05 | | | | | |
|   | R24 = | 2.950 | D24 = 0.15 | | N13 = 1.846659 | | ν13 = 23.8 | |
|   | R25 = | 1.460 | D25 = 1.08 | | N14 = 1.517417 | | ν14 = 52.4 | |
|   | R26 = | −35.689 | D26 = 0.49 | | | | | |
| G | R27 = | ∞ | D27 = 0.91 | | N15 = 1.516330 | | ν15 = 64.2 | |
|   | R28 = | ∞ | | | | | | |

| VARIABLE DISTANCE | FOCAL LENGTH | | |
|---|---|---|---|
|  | 1.00 | 7.94 | 19.87 |
| D6 | 0.22 | 5.20 | 6.61 |
| D12 | 6.68 | 1.70 | 0.29 |
| D18 | 0.52 | 2.49 | 0.50 |
| D21 | 2.99 | 1.02 | 3.01 |

EXAMPLE 10 f = 1~19.87 Fno = 1.65~3.69 2ω = 62.1°~3.5°

| R | | D | | N | | ν | |
|---|---|---|---|---|---|---|---|
| R1 = | 16.732 | D1 = 0.29 | | N1 = 1.846659 | | ν1 = 23.8 | |
| R2 = | 7.953 | D2 = 0.05 | | | | | |
| R3 = | 8.799 | D3 = 0.86 | | N2 = 1.603112 | | ν2 = 60.7 | |
| R4 = | −32.308 | D4 = 0.04 | | | | | |
| R5 = | 5.653 | D5 = 0.76 | | N3 = 1.603112 | | ν3 = 60.7 | |
| R6 = | 19.248 | D6 = VARIABLE | | | | | |
| R7 = | 9.166 | D7 = 0.15 | | N4 = 1.882997 | | ν4 = 40.8 | |
| R8 = | 1.503 | D8 = 0.53 | | | | | |
| R9 = | −2.044 | D9 = 0.15 | | N5 = 1.804000 | | ν5 = 46.6 | |
| R10 = | 5.523 | D10 = 0.21 | | | | | |
| R11 = | 5.616 | D11 = 0.44 | | N6 = 1.846659 | | ν6 = 23.8 | |
| R12 = | −5.616 | D12 = VARIABLE | | | | | |
| R13 = | (DIAPHRAGM) | D13 = 0.32 | | | | | |
| R14 = | 73.706 | D14 = 0.61 | | N7 = 1.719995 | | ν7 = 50.3 | |
| R15 = | −4.809 | D15 = 0.05 | | | | | |
| R16 = | 5.495 | D16 = 1.23 | | N8 = 1.719995 | | ν8 = 50.3 | |
| R17 = | −2.423 | D17 = 0.17 | | N9 = 1.846659 | | ν9 = 23.8 | |
| R18 = | −8.359 | D18 = VARIABLE | | | | | |
| R19 = | −3.083 | D19 = 0.49 | | N10 = 1.846659 | | ν10 = 23.8 | |
| R20 = | −1.899 | D20 = 0.17 | | N11 = 1.603112 | | ν11 = 60.7 | |
| R21 = | 3.989 | D21 = VARIABLE | | | | | |
| R22 = | 9.068 | D22 = 0.69 | | N12 = 1.516330 | | ν12 = 64.2 | |
| R23 = | −3.667 | D23 = 0.05 | | | | | |
| R24 = | 3.030 | D24 = 0.15 | | N13 = 1.846659 | | ν13 = 23.8 | |
| R25 = | 1.459 | D25 = 1.13 | | N14 = 1.517417 | | ν14 = 52.4 | |
| R26 = | −12.233 | D26 = 0.49 | | | | | |

-continued

| | | | | | |
|---|---|---|---|---|---|
| G | { R27 = | ∞ | D27 = 0.91 | N15 = 1.516330 | ν15 = 64.2 |
| | R28 = | ∞ | | | |

| VARIABLE | FOCAL LENGTH | | |
|---|---|---|---|
| DISTANCE | 1.00 | 7.91 | 19.87 |
| D6 | 0.22 | 5.20 | 6.61 |
| D12 | 6.68 | 1.70 | 0.29 |
| D18 | 0.58 | 2.08 | 0.61 |
| D21 | 2.45 | 0.95 | 2.42 |

EXAMPLE 11

| f = 1~19.89 Fno = 1.65~3.69 2ω = 62.2°~3.5° | | | | |
|---|---|---|---|---|
| R1 = | 15.881 | D1 = 0.30 | N1 = 1.846659 | ν1 = 23.8 |
| R2 = | 7.848 | D2 = 0.03 | | |
| R3 = | 8.343 | D3 = 0.91 | N2 = 1.603112 | ν2 = 60.7 |
| R4 = | −32.225 | D4 = 0.04 | | |
| R5 = | 5.734 | D5 = 0.71 | N3 = 1.603112 | ν3 = 60.7 |
| R6 = | 17.103 | D6 = VARIABLE | | |
| R7 = | 8.558 | D7 = 0.15 | N4 = 1.882997 | ν4 = 40.8 |
| R8 = | 1.523 | D8 = 0.53 | | |
| R9 = | −2.005 | D9 = 0.15 | N5 = 1.804000 | ν5 = 46.6 |
| R10 = | 5.668 | D10 = 0.21 | | |
| R11 = | 5.729 | D11 = 0.44 | N6 = 1.846659 | ν6 = 23.8 |
| R12 = | −5.729 | D12 = VARIABLE | | |
| R13 = | (DIAPHRAGM) | D13 = 0.32 | | |
| R14 = | 149.670 | D14 = 0.62 | N7 = 1.719995 | ν7 = 50.3 |
| R15 = | −4.474 | D15 = 0.05 | | |
| R16 = | 5.631 | D16 = 1.21 | N8 = 1.696797 | ν8 = 55.5 |
| R17 = | −2.540 | D17 = 0.17 | N9 = 1.846659 | ν9 = 23.8 |
| R18 = | −8.708 | D18 = VARIABLE | | |
| R19 = | −3.121 | D19 = 0.49 | N10 = 1.846659 | ν10 = 23.8 |
| R20 = | −1.891 | D20 = 0.15 | N11 = 1.603112 | ν11 = 60.7 |
| R21 = | 5.793 | D21 = VARIABLE | | |
| R22 = | 3.776 | D22 = 0.15 | N12 = 1.846659 | ν12 = 23.8 |
| R23 = | 1.791 | D23 = 1.33 | N13 = 1.583126 | ν13 = 59.4 |
| *R24 = | −2.525 | D24 = 0.49 | | |
| G { R25 = | ∞ | D25 = 0.91 | N14 = 1.516330 | ν14 = 64.2 |
| R26 = | ∞ | | | |

| VARIABLE | FOCAL LENGTH | | |
|---|---|---|---|
| DISTANCE | 1.00 | 7.73 | 19.89 |
| D6 | 0.22 | 5.22 | 6.63 |
| D12 | 6.70 | 1.70 | 0.30 |
| D18 | 0.55 | 2.27 | 0.58 |
| D21 | 3.05 | 1.34 | 3.03 |

ASPHERICAL COEFFICIENT

R24 K = −4.25591e-01 B = 1.61244e-02 C = −1.58627e-03 D = −1.44598e-03 E = 4.93025e-04

EXAMPLE 12

| f = 1~19.87 Fno = 1.65~3.69 2ω = 62.1°~3.5° | | | | |
|---|---|---|---|---|
| R1 = | 14.256 | D1 = 0.29 | N1 = 1.846659 | ν1 = 23.8 |
| R2 = | 7.250 | D2 = 0.17 | | |
| R3 = | 10.339 | D3 = 0.71 | N2 = 1.603112 | ν2 = 60.7 |
| R4 = | −66.464 | D4 = 0.05 | | |
| R5 = | 5.618 | D5 = 0.91 | N3 = 1.603112 | ν3 = 60.7 |
| R6 = | 65.684 | D6 = VARIABLE | | |
| R7 = | 11.097 | D7 = 0.15 | N4 = 1.882997 | ν4 = 40.8 |
| R8 = | 1.477 | D8 = 0.53 | | |
| R9 = | −2.082 | D9 = 0.15 | N5 = 1.804000 | ν5 = 46.6 |

-continued

|   | R10 = | 5.858 | D10 = 0.21 | | |
|---|---|---|---|---|---|
|   | R11 = | 5.487 | D11 = 0.44 | N6 = 1.846659 | ν6 = 23.8 |
|   | R12 = | −5.487 | D12 = VARIABLE | | |
|   | R13 = | (DIAPHRAGM) | D13 = 0.32 | | |
|   | R14 = | 20.695 | D14 = 0.64 | N7 = 1.719995 | ν7 = 50.3 |
|   | R15 = | −5.037 | D15 = 0.05 | | |
|   | R16 = | 6.705 | D16 = 1.15 | N8 = 1.719995 | ν8 = 50.3 |
|   | R17 = | −2.398 | D17 = 0.17 | N9 = 1.846659 | ν9 = 23.8 |
|   | R18 = | −9.338 | D18 = VARIABLE | | |
|   | R19 = | −3.291 | D19 = 0.49 | N10 = 1.846659 | ν10 = 23.8 |
|   | R20 = | −2.033 | D20 = 0.17 | N11 = 1.603112 | ν11 = 60.7 |
|   | R21 = | 5.637 | D21 = VARIABLE | | |
|   | R22 = | 8.844 | D22 = 0.74 | N12 = 1.583126 | ν12 = 59.4 |
|   | R23 = | −4.236 | D23 = 0.05 | | |
|   | R24 = | 2.977 | D24 = 0.15 | N13 = 1.846659 | ν13 = 23.8 |
|   | R25 = | 1.502 | D25 = 0.02 | | |
|   | R26 = | 1.540 | D26 = 0.98 | N14 = 1.518229 | ν14 = 59.0 |
|   | R27 = | 63.256 | D27 = 0.49 | | |
| G | R28 = | ∞ | D28 = 1.07 | N15 = 1.516330 | ν15 = 64.2 |
|   | R29 = | ∞ | | | |

| VARIABLE | FOCAL LENGTH | | |
|---|---|---|---|
| DISTANCE | 1.00 | 7.96 | 19.87 |
| D6 | 0.22 | 5.20 | 6.61 |
| D12 | 6.68 | 1.70 | 0.29 |
| D18 | 0.47 | 2.24 | 0.39 |
| D21 | 2.51 | 0.73 | 2.59 |

EXAMPLE 13

| f = 1~19.87 Fno = 1.65~3.69 2ω = 62.1°~3.5° | | | | | |
|---|---|---|---|---|---|
|   | R1 = | 14.160 | D1 = 0.29 | N1 = 1.846659 | ν1 = 23.8 |
|   | R2 = | 7.259 | D2 = 0.17 | | |
|   | R3 = | 10.317 | D3 = 0.71 | N2 = 1.603112 | ν2 = 60.7 |
|   | R4 = | −67.467 | D4 = 0.05 | | |
|   | R5 = | 5.595 | D5 = 0.91 | N3 = 1.603112 | ν3 = 60.7 |
|   | R6 = | 59.378 | D6 = VARIABLE | | |
|   | R7 = | 12.010 | D7 = 0.15 | N4 = 1.882997 | ν4 = 40.8 |
|   | R8 = | 1.485 | D8 = 0.53 | | |
|   | R9 = | −2.113 | D9 = 0.15 | N5 = 1.804000 | ν5 = 46.6 |
|   | R10 = | 6.321 | D10 = 0.21 | | |
|   | R11 = | 5.644 | D11 = 0.44 | N6 = 1.846659 | ν6 = 23.8 |
|   | R12 = | −5.644 | D12 = VARIABLE | | |
|   | R13 = | (DIAPHRAGM) | D13 = 0.32 | | |
|   | R14 = | 24.830 | D14 = 0.64 | N7 = 1.719995 | ν7 = 50.3 |
|   | R15 = | −5.022 | D15 = 0.05 | | |
|   | R16 = | 6.669 | D16 = 1.18 | N8 = 1.719995 | ν8 = 50.3 |
|   | R17 = | −2.456 | D17 = 0.17 | N9 = 1.846659 | ν9 = 23.8 |
|   | R18 = | −9.449 | D18 = VARIABLE | | |
|   | R19 = | −3.270 | D19 = 0.49 | N10 = 1.846659 | ν10 = 23.8 |
|   | R20 = | −2.059 | D20 = 0.17 | N11 = 1.603112 | ν11 = 60.7 |
|   | R21 = | 9.120 | D21 = VARIABLE | | |
|   | R22 = | 9.120 | D22 = 0.74 | N12 = 1.583126 | ν12 = 59.4 |
|   | *R23 = | −3.899 | D23 = 0.05 | | |
|   | R24 = | 2.953 | D24 = 0.15 | N13 = 1.846659 | ν13 = 23.8 |
|   | R25 = | 1.507 | D25 = 0.02 | | |
|   | R26 = | 1.544 | D26 = 0.98 | N14 = 1.518229 | ν14 = 59.0 |
|   | R27 = | 26.939 | D27 = 0.49 | | |
| G | R28 = | ∞ | D28 = 1.07 | N15 = 1.516330 | ν15 = 64.2 |
|   | R29 = | ∞ | | | |

| VARIABLE | FOCAL LENGTH | | |
|---|---|---|---|
| DISTANCE | 1.00 | 8.03 | 19.87 |
| D6 | 0.22 | 5.20 | 6.61 |
| D12 | 6.68 | 1.70 | 0.29 |

-continued

|     |      |      |      |
| --- | ---- | ---- | ---- |
| D18 | 0.53 | 2.34 | 0.38 |
| D21 | 2.54 | 0.73 | 2.69 |

ASPHERICAL COEFFICIENT

R23 K = −4.71958-01 B = −6.66698e-05 C = 1.53449e-04 D = 7.24360e-05 E = −5.52728e−05

|  | EXAMPLE 1 | EXAMPLE 2 | EXAMPLE 3 | EXAMPLE 4 |
| --- | --- | --- | --- | --- |
| $D_{4W}/F_W$ | 2.75 | 2.73 | 2.54 | 2.67 |
| $D_{2W}/D_{4W}$ | 2.43 | 2.66 | 3.03 | 2.87 |
| $D_{4W}/F_4$ | −0.82 | −0.78 | −0.67 | −0.75 |
| $F_1/F_2$ | −6.43 | −5.99 | −5.97 | −6.41 |
| $\beta_5$ | 0.06 | 0.03 | ≈0 | 0.05 |
| $F_2/F_4$ | 0.40 | 0.40 | 0.38 | 0.43 |
| $Z_2/Z$ | 6.70 | −0.49 | 0.58 | 0.71 |
| $F_2/\sqrt{F_W \times F_T}$ | −0.30 | −0.31 | −0.32 | −0.34 |
| $F_3/F_W$ | 3.35 | 3.50 | 3.58 | 3.44 |
| $F_4/F_W$ | −3.36 | −3.5 | −3.78 | −3.56 |
| $F_5/F_W$ | 3.52 | 3.57 | 3.95 | 3.80 |
| $F_4/F_5$ | −0.95 | −0.98 | −0.96 | −0.94 |
| $H_1/F_1$ | −0.078 | −0.085 | −0.077 | −0.080 |
| $\beta_{tw}/F_W$ | 2.53 | 2.51 | 3.11 | 2.66 |
| $F_1/F_W$ | 8.60 | 8.25 | 8.64 | 9.81 |
| $\nu_{4n}/\nu_{4p}$ | — | — | 36.92 | 36.92 |
| $F_W/\phi_1$ | 0.150 | 0.54 | 0.172 | 0.144 |

|  | EXAMPLE 5 | EXAMPLE 6 | EXAMPLE 7 | EXAMPLE 8 |
| --- | --- | --- | --- | --- |
| $D_{4W}/F_W$ | 2.12 | 2.56 | 2.40 | 2.87 |
| $D_{2W}/D_{4W}$ | 2.29 | 2.69 | 2.93 | 2.44 |
| $D_{4W}/F_4$ | −0.64 | −0.65 | −0.67 | −0.71 |
| $F_1/F_2$ | −5.76 | −6.15 | −6.54 | −6.06 |
| $\beta_5$ | 0.11 | 0.15 | 0.15 | 0.16 |
| $F_2/F_4$ | 0.47 | 0.36 | 0.38 | 0.37 |
| $Z_2/Z$ | 1.68 | 0.83 | 0.76 | 0.99 |
| $F_2/\sqrt{F_W \times F_T}$ | −0.35 | −0.32 | −0.30 | −0.34 |
| $F_3/F_W$ | 3.12 | 3.33 | 3.16 | 3.28 |
| $F_4/F_W$ | −3.29 | −3.95 | −3.55 | −4.05 |
| $F_5/F_W$ | 3.41 | 3.94 | 3.94 | 3.78 |
| $F_4/F_5$ | −0.97 | −1.00 | −0.90 | −1.07 |
| $H_1/F_1$ | −0.068 | −0.063 | −0.096 | −0.070 |
| $\beta_{tw}/F_W$ | 2.15 | 2.49 | 2.99 | 2.19 |
| $F_1/F_W$ | 8.97 | 8.85 | 8.81 | 9.14 |
| $\nu_{4n}/\nu_{4p}$ | 36.92 | 17.29 | 30.06 | 36.92 |
| $F_W/\phi_1$ | 0.175 | 0.171 | 0.171 | 0.179 |

|  | EXAMPLE 9 | EXAMPLE 10 | EXAMPLE 11 | EXAMPLE 12 |
| --- | --- | --- | --- | --- |
| $D_{4W}/F_W$ | 2.99 | 2.45 | 3.05 | 2.51 |
| $D_{2W}/D_{4W}$ | 2.34 | 2.86 | 2.30 | 2.79 |
| $D_{4W}/F_4$ | −0.67 | −0.74 | −0.75 | −061 |
| $F_1/F_2$ | −6.08 | −6.14 | −6.17 | −6.01 |
| $\beta_6$ | 0.19 | 0.13 | 0.24 | 0.18 |
| $F_2/F_4$ | 0.34 | 0.45 | 0.37 | 0.37 |
| $Z_2/2$ | 1.01 | 0.98 | 0.98 | 1.06 |
| $F_2/\sqrt{F_W \times F_T}$ | −0.34 | −0.34 | −0.34 | −0.34 |
| $F_3/F_W$ | 3.35 | 3.08 | 3.17 | 3.24 |
| $F_4/F_W$ | −4.47 | −3.32 | −4.06 | 4.08 |
| $F_5/F_W$ | 3.89 | 3.50 | 3.44 | 3.89 |
| $F_4/F_5$ | −1.15 | −0.95 | −1.18 | −1.05 |
| $H_1/F_1$ | −0.073 | −0.078 | −0.080 | −0.068 |
| $\beta_{tw}/F_W$ | 2.18 | 2.14 | 2.24 | 2.24 |
| $F_1/F_W$ | 9.18 | 9.26 | 9.31 | 9.11 |

-continued

|  | EXAMPLE 9 | EXAMPLE 10 | EXAMPLE 11 | EXAMPLE 12 |
|---|---|---|---|---|
| $\upsilon_{4n}/\upsilon_{4p}$ | 36.92 | 36.92 | 36.92 | 36.92 |
| $F_W/\phi_1$ | 0.175 | 0.175 | 0.174 | 0.177 |

|  | EXAMPLE 13 |
|---|---|
| $D_{4W}/F_W$ | 2.54 |
| $D_{2W}/D_{4W}$ | 2.75 |
| $D_{4W}/F_4$ | −0.63 |
| $F_1/F_2$ | −6.01 |
| $\beta_5$ | 0.16 |
| $F_2/F_4$ | 0.37 |
| $Z_2/2$ | 1.10 |
| $F_2/\sqrt{F_W \times F_T}$ | −0.34 |
| $F_3/F_W$ | 3.28 |
| $F_4/F_W$ | −4.05 |
| $F_5/F_W$ | 3.82 |
| $F_4/F_5$ | −1.06 |
| $H_1/F_1$ | −0.070 |
| $\beta_{tw}/F_W$ | 2.22 |
| $F_1/F_W$ | 9.11 |
| $\upsilon_{4n}/\upsilon_{4p}$ | 36.92 |
| $F_W/\phi_1$ | 0.177 |

As described above, by arranging the movement of the movable lenses when the zooming is performed, a rear focusing zoom lens having a small size and realizing significant power variation can be provided. By causing the fourth lens unit to be moved to form a concave locus facing the object when the negative fourth lens unit is moved from the wide angle end to the telescopic end, the space can efficiently be used and the diameter of the first lens unit can be reduced. Furthermore, by appropriately setting the specifications of the lenses, a zoom lens, which has a small size and in which the aberration can be corrected satisfactorily, can be provided.

Although the foregoing embodiment provides the zoom lenses having a high variable power ratio of 20 times, zoom lenses of a type which does not permit the foregoing high zooming ratio but which has smaller number of lenses to reduce the size thereof will now be described.

The rear focusing zoom lens according to this embodiment comprises a first lens unit L1 having positive refracting power, a second lens unit L2 having negative refracting power, a third lens unit L3 having positive refracting power, a fourth lens unit L4 having negative refracting power and a fifth lens unit L5 having positive refracting power, the foregoing lenses being disposed in the foregoing sequential order when viewed from the object. The second lens unit is moved toward the image surface to change the magnification from the wide angle end to the telescopic end. The change in the image surface occurring due to the magnification change is corrected by moving the fourth lens unit. Furthermore, the fourth lens unit is moved along the optical axis to perform focusing. In addition, the third lens unit is composed of a single positive lens. Note that the first, third and the fifth lens units are always caused to remain stationary.

FIGS. 34(A)(1) to 39(B)(4) are aberration graphs according to Examples 14 to 23 of the present invention to be described later. Referring to the aberration graphs, graphs (A) show wide angle ends, and graphs (B) show telescopic ends.

Also according to this embodiment, focusing is performed from an infinite object to a near object, the fourth lens unit is moved rearwards (toward the image surface) as indicated by a straight line 4c.

The rear focusing zoom lens according to the present invention can be realized by satisfying the foregoing conditions. To further reduce the size of the overall lens system, to prevent change in the aberration occurring due to magnification change performed when the magnification is enlarged and to obtain excellent optical performance over the power variation range, any of the following conditions must be satisfied:

(1—1) Assuming that the focal length of the i-th lens unit is Fi and the focal length of the overall system at the wide angle end is $F_w$, it is preferable that the following be satisfied:

$$4 < F1/F_w < 6.5 \quad (1)$$

The foregoing expression is required to provide a zoom lens, the magnification of which is about 6 times while reducing the size and simplifying the structure. The foregoing expression relates to the object point with respect to the second lens unit, that is, to the magnification. To reduce the size of the overall system, it is preferable that the second lens unit is disposed to cause the equal magnification to intervene when the zooming is performed. If the equal magnification is allowed to intervene, the locus of the zooming of the fourth lens unit is made to substantially reciprocate. Thus, significant power variation can be performed with the most effective space efficiency. Specifically, if the value is larger than the upper limit, the focal length of the first lens unit is lengthened, the object point with respect to the second lens unit which is the main lens unit for varying the power is made remote, the image forming magnification of the second lens unit is decreased, and thus effective size reduction cannot easily be performed. What is worse, the distance from the first lens unit to the second lens unit is excessively lengthened. Thus, the size reduction cannot be performed.

If the value is smaller than the lower limit, the focal length of the first lens unit is shortened. If the horizontal imaging magnification of the second lens unit is intended to be maintained as described above, the refracting power of the second lens unit is strengthened and excessive severe supporting accuracy is required.

(1–2) In the structure in which, from the object, a first lens unit fixed during zooming and having positive refracting power, a second lens unit movable during zooming and having negative refracting power, a third lens unit having positive refracting power, a fourth lens unit for correcting movement of the image point occurring when the zooming is performed and having negative refracting power and a fifth lens unit having positive refracting power, it is preferable that the rangefinding be performed by the fourth lens unit. The fourth lens unit is moved toward the image surface when rangefinding (focusing) of a near image is performed. If the rangefinding is performed by moving the fourth lens unit as described above, decrease in the variable power ratio in the near distance portion with respect to the paraxial variable power ratio as has been experienced with the conventional rear focusing method in which the positive lens unit performs the rangefinding can be prevented. Even if the variable power ratio is raised, a desired variable power ratio can be obtained in the short distance portion.

(1–3) It is preferable that the diaphragm SP relating to the reduction of the diameter of the front lens be located near the third lens unit at the telescopic end. If the position of the diaphragm SP at the wide angle end is shifted more adjacent to the object than the position at the telescopic end, the diameter of the front lens can effectively be reduced.

Generally, in the conventional zoom lens, the height of light, which is out of the axis and made incident upon the first lens unit, is highest at an intermediate zooming position adjacent to the wide angle end because the incident pupil is positioned deep (remote) from the first lens unit. If the position, at which the incident light is highest, can be set near the wide angle end by moving the incident pupil, that is, the diaphragm SP, the outer diameter of the first lens unit can be reduced most efficiently.

It is preferable that the diaphragm SP be fixed adjacent to the third lens unit during the zooming to constitute a desired mechanism. It is preferable that the diaphragm SP be located adjacent to the third lens unit at this time. To reduce the diameter of the front lens, it is preferable that the diaphragm SP be disposed in the third lens unit at a position relatively adjacent to the object, preferably at a position nearest the object.

(1–4) Assuming that the distance from the second lens unit to the third lens unit (in a case where the diaphragm is located at a position adjacent to the third lens unit facing the object, to the surface of the diaphragm) at the wide angle end when the distance from an object is infinite is $D2_w$, and the distance from the fourth lens unit to the fifth lens unit is $D4_w$, it is preferable that the following be satisfied:

$$1.5 < D2_w/D4_w < 2.9 \tag{2}$$

The foregoing expression provides the space for moving the fourth lens unit for performing focusing that is lengthened at the telescopic end in relation to the movable range for the second lens unit that is the main lens unit for the power variation.

In the zoom lens employing the foregoing rear focusing method, the amount of movement of the focusing lens, at the telescopic end when the distance from an object is short, is inevitably enlarged. In particular, the zooming ratio is raised in proportion to the zooming magnification if the distance $D2_w$, which enlarges both amount of movement of the fourth lens unit for correcting the image surface position of the same and that for performing focusing, is long, that is, if the movable range for the zooming is large. Therefore, the amount of the fourth lens unit for photographing a near image must be enlarged at the telescopic end. The foregoing expression indicates the foregoing correlation. If the value is larger than the upper limit, the close-up distance is made excessively remote at the telescopic end. If the value is smaller than the lower limit, the zoom lens having a poor zooming ratio is realized.

(1–5) It is preferable that the movement of the focusing lens satisfy the following expression:

$$0.3 < |D4_w/F4| < 0.5 \tag{3}$$

The foregoing expression provides appropriate refracting power of the fourth lens unit, which is the focusing lens, and the movable space for the fourth lens unit. If the value is larger than the upper limit, a space excessively longer than that required to perform a desired short distance photographing is undesirably set. Thus, the overall length cannot be shortened. If the value is smaller than the lower limit, a space required to perform focusing cannot be maintained.

(1–6) It is preferable that the fourth lens unit satisfy the following:

$$-2.6 < F4/F_w < -1.5 \tag{4}$$

If the value is larger than the upper limit, the refracting power of the fourth lens unit is strengthened, and the Petzval sum is enlarged in a range of negative values. Thus, the image surface is corrected excessively. If the value is smaller than the lower limit, the amount of movement of the fourth lens unit for providing a desired close-up photographing distance is enlarged excessively. In this case, the size of the overall system is enlarged excessively.

(1–7) It is preferable that the second lens unit, which is the main lens unit for performing zooming, satisfy the following:

$$-1.2 > F2/F_w < -0.8 \tag{5}$$

If the value is larger than the upper limit, the refracting power of the second lens unit is strengthened and the Petzval sum is enlarged in a range of negative values. Thus, the image surface is excessively corrected. If the value is smaller than the lower limit, the amount of movement of the second lens unit for obtaining a desired variable power ratio is enlarged excessively. As a result, the diameter of the front lens and the size of the overall system are enlarged excessively.

(1–8) It is preferable that light beams in a divergent system be made incident on the third lens unit to be formed into a converged system before it is introduced into the fourth lens unit. That is, it is preferable that the imaging magnification $\beta 3$ be always negative values over the zooming range to reduce the size of the system.

$$\beta 3 < 0 \tag{6}$$

If the foregoing condition is satisfied, the fourth lens unit can be moved efficiently, in particular, the fourth lens unit can be moved from the wide angle end to the telescopic end to form a convex locus facing the image surface. More particularly, the fourth lens unit can be caused to substantially reciprocate. Thus, the size reduction can effectively be performed.

To reduce the size of the overall system and to effectively provide the movable space, the fourth lens unit must be caused to substantially completely reciprocate or to form a convex locus facing the image surface, as described above.

It is preferable that the imaging magnification β3 of the third lens unit be a negative value and the absolute value of the same be increased from the wide angle end toward the telescopic end, followed by being decreased. Assuming that the paraxial horizontal magnifications of the third lens unit at the wide angle end and the telescopic end are β3w and β3T, the most excellent space efficiency can be realized if the following is satisfied:

$$\beta 3W = \beta 3T$$

Assuming that the maximum value of absolute value of the paraxial horizontal magnification of the third lens unit from the wide angle end to the telescopic end is β3MAX, it is preferable that the following be satisfied:

$$|\beta 3MAX| > 0.8$$

Further preferably, it is preferable that the value exceeds −1 to enlarge the magnification.

(1–9) Assuming that the ratio (β2T/β2w) of the imaging magnifications from the wide angle end to the telescopic end is Z2, the focal length of the overall system at the telescopic end is $F_t$ and the ratio $(F_t/F_w)$ of the focal lengths at the wide angle end and the telescopic end of the overall system is Z, it is preferable that the following be satisfied:

$$0.68 < Z2/Z < 1.0 \tag{8}$$

The foregoing expression indicates the ratio of the power variation of the second lens unit with respect to the overall power variation. If the value is larger than the upper limit, the magnification of any unit in the lens system is decreased. Thus, the efficiency in varying the power deteriorates, and the size is enlarged excessively.

If the value is smaller than the lower limit, a plurality of lens units that contribute to the power variation exit, thus arising a difficulty in controlling the lens units. Although excellent space efficiency is realized if the fourth lens unit is allowed to completely reciprocate at the time of performing zooming, the fourth lens unit is not sometimes completely be returned to obtain a desired zooming ratio. At this time, also the fourth lens unit somewhat contributes to the power variation (|β3w|<|β3T|). It is preferable that the following be satisfied:

$$0.68 < Z2/Z < 0.8$$

If the value is out of the foregoing range and thus the fourth lens unit considerably contributes to the power variation, the movable space for the fourth lens unit is enlarged. Thus, the size of the overall system is enlarged excessively.

(1–10) It is preferable that the third lens unit satisfy the following expression:

$$1.5 < F3/F_w < 2.0 \tag{9}$$

The foregoing expression permits the magnification of the foregoing third lens unit to be suitably provided. If the value is larger than the upper limit, the size reduction cannot be performed. If the value is smaller than the lower limit, the movable space required for the fourth lens unit to perform focusing cannot appropriately be provided.

If the value is out of the foregoing range, the fourth lens unit cannot efficiently be moved. In particular, the fourth lens unit cannot be moved from the wide angle end to the telescopic end to form a convex facing the image surface or cannot be allowed to reciprocate substantially completely.

By composing the third lens unit by a single lens, the size can be reduced. To reduce the spherical aberration, an aspherical surface may be provided for any surface of the third lens unit.

(1–11) It is preferable that the fourth lens unit, which is the focusing lens unit and is a lens unit for correcting the image point, has a small size and light weight in order to simplify the structure because the fourth lens unit is moved. To reduce the size and weight, it is preferable that the fourth lens unit be composed of a single negative lens. To prevent change in the chromatic aberration at the time of performing focusing and zooming, it is preferable that the following be satisfied:

$$20 < v4 < 50 \tag{10}$$

where v4 is the Abbe's number of the lens forming the fourth lens unit. It is preferable that the refraction of the single lens forming the fourth lens unit be within the following range:

$$1.65 < N4 \tag{11}$$

where N4 is the refractive index of the lens forming the fourth lens unit. If the value is out of the foregoing range, the curvature R is sharpened excessively to realize the focal length F4 in the foregoing range. In this case, the aberration deteriorates excessively.

When the fourth lens unit is composed of a single lens (or one block formed by bonding two lenses), it is preferable that the fourth lens unit be double-concave lens. Assuming that the curvature radius facing the object and that facing the image surface are R4a and R4b, it is preferable that the following be satisfied:

$$|R4a|/R4b > 1.1 \tag{12}$$

As a result of the foregoing structure, the second principal point of the fourth lens unit is moved toward the fifth lens unit so that the movable range for the fourth lens unit is effectively enlarged.

To prevent generation of aberration so as to enlarge the movable range, it is preferable that the following be satisfied:

$$1.4 < |R4a|/R4b < 3.0 \tag{12a}$$

(1–12) To cause the fifth lens unit, which is the final imaging lens, to have a satisfactory aberration with respect to the focal length of the overall system and to maintain appropriate back focus, it is preferable that the following be satisfied:

$$1.50 < F5/F_w < 2.50 \tag{13}$$

If the value is larger than the upper limit, the back focus is lengthened and the size reduction cannot be achieved. If the value is smaller than the lower limit, the refracting power of the fifth lens unit is strengthened. As a result, undesirable spherical aberration or comatic aberration are generated in, in particular, an intermediate zooming region. What is worse, the telecentric relationship is lost, causing the exit pupil to be shortened undesirably. Furthermore, a block, such as a filter, cannot be inserted.

The structure according to the present invention has the arrangement that the position of the exit pupil of the zoom lens is prevented from being set to be too short. Furthermore, diagonal beams from an object are made incident to make a small angle so that the diameter of the front lens is reduced.

If the range for the set power of the lens units from the diaphragm toward the image surface is larger than the upper limit, the angle made by the diagonal beams cannot be reduced. Thus, the diameter of the front lens is enlarged undesirably. If the value is smaller than the lower limit, the exit pupil is shortened in a range of positive values. As a result, telecentric beams with respect to the solid-image sensing device cannot be maintained. What is worse, excessive change in the aberration takes place when zooming or focusing is performed.

If the value is included in the foregoing range, the size can be reduced such that excess movement does not take place when rangefinding (the focusing) is performed. If the value is out of the foregoing range, the diameter of the front lens is enlarged and also the overall system is enlarged. As a result, an appropriate emission angle with respect to the solid-image sensing device cannot be provided.

In particular, it is preferable that the position of the exit pupil satisfy the following:

$$-1.2 < F4/F5 < -0.80 \tag{14}$$

If the value is larger than the upper limit, the refracting power of the fourth lens unit is strengthened and the focusing distance is changed excessively. If the value is smaller than the lower limit, the amount of movement required when focusing is performed is enlarged and the size reduction cannot be performed. Furthermore, the refracting power of the fifth lens unit, which is the fixed imaging lens, is strengthened and, therefore, the exit pupil is shortened excessively.

(1–13) To appropriately maintain the back focus of the lens while appropriately providing the exit pupil of the optical system, the following be satisfied assuming that the imaging magnification of the fifth lens unit is β5:

$$|\beta 5| < 0.25 \tag{15}$$

If the value is out of the foregoing range, the back focus is enlarged, the lens system is enlarged and the exit pupil is shortened excessively.

(1–14) To cause the fifth lens unit, which is the final imaging lens, to have an appropriate aberration with respect to the focal length of the overall system and to maintain an appropriate back focus, it is preferable that the following be satisfied:

$$0.68 < F5/\sqrt{Fw \times Ft} < 0.92 \tag{16}$$

If the value is larger than the upper limit, the back focus is lengthened and, therefore, the size is enlarged excessively. If the value is smaller than the lower limit, the refracting power of the fifth lens unit is strengthened to cause, in particular, spherical aberration and comatic aberration to be generated particularly in an intermediate zooming region. Furthermore, the telecentric relationship is lost and the exit pupil is shortened excessively.

(1–15) To prevent change in the position of the exit pupil with respect to the solid-image sensing device while maintaining an appropriate back focus, it is preferable that the imaging magnification β4 of the fourth lens unit always has the same sign during zooming. If the imaging magnification β4 is changed with its sign also changed during zooming, the incidental angle on the fixed fifth lens unit, which is the final imaging lens unit, is changed considerably. The incidental angle of the peripheral beams on the solid-image sensing device (a CCD or the like) is changed considerably when the zooming is performed. Thus, an excessive deviation from the telecentric formed image takes place, thus causing shading to be generated undesirably.

To prevent shading at the wide angle end and the telescopic end at which the exit pupil is shortened in a range of positive values and to maintain an appropriate back focus, it is preferable that the following be satisfied:

$$\beta 4W \times \beta 4T > 0 \tag{17}$$

where the paraxial horizontal magnification of the fourth lens unit at the wide angle end and that of the telescopic end when the distance from an object is infinite are β4W and β4T, respectively.

(1–16) To reduce the size of the overall system, it is preferable that the following be satisfied:

$$1.5 < Bf_w/F_w < 2.2 \tag{18}$$

where $Bf_w$ is the back focus (except an element, such as a glass block or a filter, represented by G in the embodiment) at the wide angle end when the distance from an object is infinite. The foregoing expression is required to reduce effectively the size of the overall system. If the value is smaller than the lower limit, a block, such as a filter, cannot be inserted, and the exit pupil is shortened. As a result, the forming of an image onto the image pickup device is undesirably out of the telecentric system. If the value is larger than the upper limit, desired size reduction cannot be performed.

(1–17) It is preferable that the first lens unit consists of a plurality of lenses including at least one negative lens; the second lens unit consists of a plurality of lenses including at least one positive lens; the third lens unit consists of one positive lens; the fourth lens unit consists of at least one negative lens; and the fifth lens unit consists of a plurality of lens including at least one negative lens.

In particular, it is preferable that the first lens unit comprises three lenses consisting of, when viewed from the object, a negative meniscus lens having a convex facing the object, a positive lens having a convex facing the object, and a positive lens having a convex facing the object. It is preferable that the second lens unit comprises, when viewed from the object, a negative meniscus lens having a convex facing the object, a double-convex lens and a positive lens.

An aspherical surface may be provided for any of the lens surfaces of the third lens unit. The aspherical surface may be disposed either on the object side or on the image surface side. In particular, it is preferable that the aspherical surface be disposed on the object side to correct the spherical aberration.

The fourth lens unit moves to correct change of the second lens unit occurring during zooming or correct change in the image point of the second lens unit occurring when the second lens unit is moved, as well as to perform focusing. In particular, the fourth lens unit may be, in place of being composed of the single lens, composed of two lenses consisting of a positive lens and a negative lens in order to prevent change in the chromatic aberration. The positive lens and the negative lens may be formed into a single block by bonding. Assuming that the Abbe's numbers of the positive lens and the negative lens are v4p and v4n respectively, it is preferable that the following be satisfied:

$$v4p < v4n$$

If the value is out of the foregoing range, the chromatic aberration is changed considerably dependently on the distance.

By composing the fourth lens unit by bonding the positive lens and the negative lens, the fourth lens unit, which is moved when zooming is performed and when focusing is performed, can be formed into a single block. Thus, the structure can be simplified and the fourth lens unit can easily be supported like the foregoing single lens structure.

Assuming that the Abbe's numbers of the positive lens and the negative lens constituting the fourth lens unit are v4p and v4n, it is preferable that the following be satisfied:

v4n–v4p>15

To effectively change the chromatic aberration during the zooming, it is preferable that the following be satisfied:

v4n–v4p>30

In a case where the lenses composing the fourth lens unit are unified into one block, in particular, in a case where the same is composed of the positive lens and the negative lens that are bonded to each other or in a case where the same is composed of one negative lens, it is preferable that the concave of the block faces the object and that the concave of the same facing the image surface faces the image.

The fifth lens unit is a positive lens unit that is fixed during zooming and that easily encounters spherical aberration. To prevent the spherical aberration, it is preferable that the fifth lens unit be composed of at least one positive lens and at least one negative lens. If the fifth lens unit is composed of one positive lens and one negative lens, it is preferable that an aspherical surface be provided for either lens surface to satisfactorily correct the spherical aberration. To correct the chromatic aberration, a bonded lens unit may be employed.

If the fifth lens unit is composed of one positive lens and one negative lens, it is preferable that a structure be employed in which a negative meniscus lens having a convex facing an object and a double-convex lens are disposed in this sequential order when viewed from the object. As a result, the second principal point is located at a position facing the image surface, and the back focus can effectively be maintained. The two lenses may be bonded to each other so as to be unified into one block. As a result, the lens unit can easily be supported and the structure can be simplified.

(1–18) To widen the angle, it is an important fact to shorten, at the wide angle end, the distance e1 between the principal point of the first lens unit and that of the second lens unit. To achieve this, it is preferable that the shape of the second lens unit be as follows;

To shorten, at the wide angle end, the distance e1 between the two principal points, it is preferable that the (first) principal point of the second lens unit facing the object be positioned adjacent to the object for the purpose of widen the angle. Specifically, it is preferable that configuration be arranged in such a manner that, when viewed from the object, there are disposed a negative meniscus lens L21 having a convex facing the object, a double-concave negative lens L21 and a positive lens L23 while causing an air gap to intervene. The foregoing air gap causes the principal point of the second lens unit facing the object to be shifted toward the first lens unit. Thus, the distance e1 between the two principal points can easily be shortened in the wide angle portion, and, therefore, the angle can effectively be widened. A negative lens L24 may be disposed adjacent to the positive lens L23 at a position adjacent to the image surface. The negative lens L24 causes the principal point of the second lens unit facing the object to be shifted toward the first lens unit. Furthermore, change in the chromatic aberration occurring due to the zooming can be prevented.

(1–19) A small size and wide angle zoom lens can be realized if the following is satisfied assuming that the outer diameter of the lens positioned nearest the object is $\phi 1$ and the focal length of the overall system at the wide angle end is $F_w$:

$$0.10 < F_w/\phi 1 < 0.20 \tag{19}$$

Generally, if the focal length $F_w$ at the wide angle end is shortened, the diameter $\phi 1$ of the front lens is enlarged. If the focal length $F_w$ at the wide angle end is lengthened on the contrary, the diameter $\phi 1$ of the front lens is reduced though it depends upon the brightness at the telescopic end of the lens. Expression (19) indicates an appropriate relationship between the diameter of the front lens and the focal length at the wide angle end to realize a small size and wide angle zoom lens. If the ratio is out of the foregoing range, the small size and wide angle zoom lens cannot be provided. Specifically, if the value is larger than the upper limit, a zoom lens of a telescopic type is realized. If the value is smaller than the lower limit, a zoom lens having a large size is realized.

The diameter $\phi_1$ of the front lens is substantially the optically effective diameter of the first lens unit and is an actual outer diameter of the lens. The diameter $\phi_1$ of the front lens is larger than the optically effective diameter of the first lens unit by 0% to 6%.

Then, examples of the present invention will now be described. In the examples, Ri is the curvature radius of the i-th lens surface counted in a direction from an object, Di is the thickness of the lens and the air gap counted in the direction from the object, and Ni and vi are refracting power and Abbe's number of the i-lens counted in the direction from the object.

In the examples, the second lens surface counted from the final lens is a glass member, such as a face plate. The relationships among each conditional expression and various values in the examples are shown in Table 2. The aspherical surface is expressed as follows when X-axis stands for the direction of the optical axis, H-axis stands for the direction perpendicular to the optical axis, a direction in which light travels is indicated by positive value, R is paraxial curvature radius and K, A, B, C, D and E are aspherical surface coefficients:

$$X = \frac{(1/R)H^2}{1 + \sqrt{1 - (1+k)(H/R)^2}} + AH^2 + BH^4 + CH^6 + DH^8 + EH^{10}$$

Expression "e–0X" indicates "$10^{-x}$".

EXAMPLE 14

| f = 1 ~ 5.98 | Fno = 1.85 ~ 2.11 | 2ω = 61.7 ~ 11.4° | |
|---|---|---|---|
| R1 = 5.858 | D1 = 0.2286 | N1 = 1.846659 | υ1 = 23.8 |
| R2 = 3.628 | D2 = 0.26 | N2 = 1.603112 | υ2 = 60.7 |
| R3 = –478.413 | D3 = 0.04 | | |
| R4 = 2.985 | D4 = 0.73 | N3 = 1.603112 | υ3 = 60.7 |
| R5 = 7.503 | D5 = VARIABLE | | |
| R6 = 7.219 | D6 = 0.12 | N4 = 1.806098 | υ4 = 41.0 |
| R7 = 0.994 | D7 = 0.44 | | |
| R8 = –2.897 | D8 = 0.12 | N5 = 1.806098 | υ5 = 41.0 |
| R9 = 2.028 | D9 = 0.21 | | |
| R10 = 2.279 | D10 = 0.44 | N6 = 1.846659 | υ6 = 23.8 |
| R11 = 36.548 | D11 = VARIABLE | | |
| R12 = DIAPHRAGM | D12 = 0.27 | | |
| R13 = 2.069 | D13 = 0.73 | N7 = 1.583126 | υ7 = 59.4 |
| R14 = –1.988 | D14 = | | |

-continued

| f = 1 ~ 5.98 | Fno = 1.85 ~ 2.11 | 2ω = 61.7 ~ 11.4° | |
|---|---|---|---|
| R15 = −4.254 | D15 = 0.20 | N8 = 1.806098 | υ8 = 41.0 |
| R16 = 2.642 | D16 = VARIABLE | | |
| R17 = 3.390 | D17 = 0.49 | N9 = 1.516330 | υ9 = 64.2 |
| R18 = −2.961 | D18 = 0.04 | | |
| R19 = 2.046 | D19 = 0.15 | N10 = 1.846659 | υ10 = 23.8 |
| R20 = 1.158 | D20 = 0.61 | N11 = 1.487490 | υ11 = 70.2 |
| R21 = −6.436 | D21 = 0.49 | | |
| R22 = ∞ | D22 = 1.05 | N12 = 1.516330 | υ12 = 64.2 |
| R23 = ∞ | | | |

| | FOCAL LENGTH | | |
|---|---|---|---|
| VARIABLE DISTANCE | 1.00 | 3.84 | 5.98 |
| D5 | 0.20 | 1.79 | 2.24 |
| D11 | 2.35 | 0.76 | 0.30 |
| D14 | 0.29 | 0.78 | 0.61 |
| D16 | 0.86 | 0.37 | 0.54 |

| ASPHERICAL COEFFICIENT | | | | | |
|---|---|---|---|---|---|
| | K | B | C | D | E |
| 13-TH SIDE | −1.659 e + 00 | −4.121 e − 02 | −1.083 e − 02 | 1.125 e − 02 | −1.238 e − 02 |

EXAMPLE 15

| f = 1 ~ 6.00 | Fno = 1.85 ~ 2.08 | 2ω = 61.7 ~ 11.4° | |
|---|---|---|---|
| R1 = 5.850 | D1 = 0.28 | N1 = 1.846659 | υ1 = 23.8 |
| R2 = 3.656 | D2 = 1.36 | N2 = 1.603112 | υ2 = 60.7 |
| R3 = −165.992 | D3 = 0.04 | | |
| R4 = 3.005 | D4 = 0.74 | N3 = 1.603112 | υ3 = 60.7 |
| R5 = 7.300 | D5 = VARIABLE | | |
| R6 = 7.031 | D6 = 0.12 | N4 = 1.806098 | υ4 = 41.0 |
| R7 = 0.994 | D7 = 0.46 | | |
| R8 = −2.861 | D8 = 0.12 | N5 = 1.806098 | υ5 = 41.0 |
| R9 = 2.026 | D9 = 0.21 | | |
| R10 = 2.259 | D10 = 0.44 | N6 = 1.846659 | υ6 = 23.8 |
| R11 = 38.408 | D11 = VARIABLE | | |
| R12 = DIAPHRAGM | D12 = 0.27 | | |
| R13 = 2.089 | D13 = 0.73 | N7 = 1.583126 | υ7 = 59.4 |
| R14 = −1.995 | D14 = VARIABLE | | |
| R15 = −4.166 | D15 = 0.20 | N8 = 1.806098 | υ8 = 41.0 |
| R16 = 2.611 | D16 = VARIABLE | | |
| R17 = 3.368 | D17 = 0.49 | N9 = 1.516330 | υ9 = 64.2 |
| R18 = −2.981 | D18 = 0.04 | | |
| R19 = 2.034 | D19 = 0.15 | N10 = 1.846659 | υ10 = 23.8 |
| R20 = 1.160 | D20 = 0.61 | N11 = 1.487490 | υ11 = 70.2 |
| R21 = −5.416 | D21 = 0.49 | | |
| R22 = ∞ | D22 = 1.05 | N12 = 1.516330 | υ12 = 64.2 |
| R23 = ∞ | | | |

| | FOCAL LENGTH | | |
|---|---|---|---|
| VARIABLE DISTANCE | 1.00 | 3.87 | 6.00 |
| D5 | 0.20 | 1.79 | 2.24 |
| D11 | 2.35 | 0.76 | 0.30 |
| D14 | 0.33 | 0.80 | 0.59 |
| D16 | 0.84 | 0.37 | 0.57 |

-continued

| f = 1 ~ 6.00 | Fno = 1.85 ~ 2.08 | 2ω = 61.7 ~ 11.4° | |
|---|---|---|---|

| ASPHERICAL COEFFICIENT | | | | | |
|---|---|---|---|---|---|
| | K | B | C | D | E |
| 13-TH SIDE | −1.659 e + 00 | −4.141 e − 02 | −1.082 e − 02 | 1.125 e − 02 | −1.238 e − 02 |

EXAMPLE 16

| f = 1 ~ 6.00 | Fno = 1.85 ~ 2.04 | 2ω = 61.7 ~ 11.4° | |
|---|---|---|---|
| R1 = 6.215 | D1 = 0.28 | N1 = 1.846659 | υ1 = 23.8 |
| R2 = 3.900 | D2 = 1.42 | N2 = 1.603112 | υ2 = 60.7 |
| R3 = −111.124 | D3 = 0.04 | | |
| R4 = 2.879 | D4 = 0.84 | N3 = 1.603112 | υ3 = 60.7 |
| R5 = 6.193 | D5 = VARIABLE | | |
| R6 = 5.998 | D6 = 0.12 | N4 = 1.806098 | υ4 = 41.0 |
| R7 = 0.991 | D7 = 0.46 | | |
| R8 = −2.633 | D8 = 0.12 | N5 = 1.806098 | υ5 = 41.0 |
| R9 = 2.041 | D9 = 0.21 | | |
| R10 = 2.343 | D10 = 0.44 | N6 = 1.846659 | υ6 = 23.8 |
| R11 = 42.205 | D11 = VARIABLE | | |
| R12 = DIAPHRAGM | D12 = 0.27 | | |
| R13 = 2.270 | D13 = 0.73 | N7 = 1.583126 | υ7 = 59.4 |
| R14 = −1.862 | D14 = VARIABLE | | |
| R15 = −6.532 | D15 = 0.20 | N8 = 1.806098 | υ8 = 41.0 |
| R16 = 2.829 | D16 = VARIABLE | | |
| R17 = 1.873 | D17 = 0.15 | N9 = 1.846659 | υ9 = 23.8 |
| R18 = 1.085 | D18 = 0.85 | | |
| R19 = −2.044 | D19 = 0.49 | N10 = 1.583126 | υ10 = 59.4 |
| R20 = ∞ | D20 = 1.05 | N11 = 1.516330 | υ11 = 64.2 |
| R21 = ∞ | | | |

| | FOCAL LENGTH | | |
|---|---|---|---|
| VARIABLE DISTANCE | 1.00 | 3.76 | 6.00 |
| D5 | 0.20 | 1.79 | 2.24 |
| D11 | 2.35 | 0.76 | 0.30 |
| D14 | 0.31 | 0.81 | 0.63 |
| D16 | 1.14 | 0.64 | 0.82 |

| ASPHERICAL COEFFICIENT | | | | | |
|---|---|---|---|---|---|
| | K | B | C | D | E |
| 13-TH SIDE | −1.654 e + 00 | −5.235 e − 02 | −1.093 e − 02 | 1.205 e − 02 | −1.465 e − 02 |
| 19-TH SIDE | −5.996 e − 01 | 2.686 e − 02 | −6.032 e − 03 | −1.379 e − 02 | −1.860 e − 03 |

EXAMPLE 17

| f = 1 ~ 5.98 | Fno = 1.85 ~ 2.10 | 2ω = 61.7 ~ 11.4° | |
|---|---|---|---|
| R1 = 6.182 | D1 = 0.28 | N1 = 1.846659 | υ1 = 23.8 |
| R2 = 4.042 | D2 = 1.72 | N2 = 1.603112 | υ2 = 60.7 |
| R3 = −391.245 | D3 = 0.04 | | |
| R4 = 2.986 | D4 = 0.98 | N3 = 1.603112 | υ3 = 60.7 |
| R5 = 6.235 | D5 = VARIABLE | | |
| R6 = 6.112 | D6 = 0.12 | N4 = 1.806098 | υ4 = 41.0 |
| R7 = 0.975 | D7 = 0.46 | | |
| R8 = −2.510 | D8 = 0.12 | N5 = 1.806098 | υ5 = 41.0 |
| R9 = 2.066 | D9 = 0.21 | | |

-continued

| f = 1 ~5.98 | Fno = 1.85 ~ 2.10 | 2ω= 61.7 ~ 11.4° |
|---|---|---|

| | | | |
|---|---|---|---|
| R10 = 2.259 | D10 = 0.44 | N6 = 1.846659 | ν6 = 23.8 |
| R11 = 26.760 | D11 = VARIABLE | | |
| R12 = DIAPHRAGM | D12 = 0.27 | | |
| R13 = 2.257 | D13 = 0.73 | N7 = 1.583126 | ν7 = 59.4 |
| R14 = −1.874 | D14 = VARIABLE | | |
| R15 = −6.651 | D15 = 0.20 | N8 = 1.806098 | ν8 = 41.0 |
| R16 = 2.890 | D16 = VARIABLE | | |
| R17 = 1.825 | D17 = 0.15 | N9 = 1.846659 | ν9 = 23.8 |
| R18 = 1.057 | D18 = 0.85 | | |
| R19 = −1.989 | D19 = 0.49 | N10 = 1.583126 | ν10 = 59.4 |
| R20 = ∞ | D20 = 1.05 | N11 = 1.516330 | ν11 = 64.2 |
| R21 = ∞ | | | |

FOCAL LENGTH

| VARIABLE DISTANCE | 1.00 | 3.74 | 5.98 |
|---|---|---|---|
| D5 | 0.20 | 1.76 | 2.20 |
| D11 | 2.31 | 0.75 | 0.30 |
| D14 | 0.30 | 0.86 | 0.72 |
| D16 | 1.02 | 0.46 | 0.60 |

ASPHERICAL COEFFICIENT

| | K | B | C | D | E |
|---|---|---|---|---|---|
| 13-TH SIDE | −1.654 e + 00 | −5.302 e − 02 | −1.100 e − 02 | 1.205 e − 02 | −1.465 e − 02 |
| 19-TH SIDE | −5.996 e − 01 | 2.852 e − 02 | −5.979 e − 03 | −1.379 e − 02 | −1.860 e − 03 |

EXAMPLE 18

| f = 1 ~ 5.97 | Fno = 1.85 ~ 2.13 | 2ω= 61.7 ~ 11.4° |
|---|---|---|

| | | | |
|---|---|---|---|
| R1 = 6.454 | D1 = 0.28 | N1 = 1.846659 | ν1 = 23.8 |
| R2 = 4.213 | D2 = 2.16 | N2 = 1.603112 | ν2 = 60.7 |
| R3 = 273.515 | D3 = 0.04 | | |
| R4 = 2.979 | D4 = 1.01 | N3 = 1.603112 | ν3 = 60.7 |
| R5 = 6.298 | D5 = VARIABLE | | |
| R6 = 5.324 | D6 = 0.12 | N4 = 1.772499 | ν4 = 49.6 |
| R7 = 0.927 | D7 = 0.46 | | |
| R8 = −2.452 | D8 = 0.12 | N5 = 1.806098 | ν5 = 41.0 |
| R9 = 2.041 | D9 = 0.21 | | |
| R10 = 2.255 | D10 = 0.44 | N6 = 1.846659 | ν6 = 23.8 |
| R11 = 33.368 | D11 = VARIABLE | | |
| R12 = DIAPHRAGM | D12 = 0.27 | | |
| R13 = 2.269 | D13 = 0.73 | N7 = 1.583126 | ν7 = 59.4 |
| R14 = −1.858 | D14 = VARIABLE | | |
| R15 = −7.346 | D15 = 0.20 | N8 = 1.846659 | ν8 = 23.8 |
| R16 = 3.047 | D16 = VARIABLE | | |
| R17 = 1.894 | D17 = 0.15 | N9 = 1.846659 | ν9 = 23.8 |
| R18 = 1.273 | D18 = 0.02 | | |
| R19 = −1.353 | D19 = 0.85 | N10 = 1.583126 | ν10 = 59.4 |
| R20 = −1.990 | D20 = 0.49 | N11 = 1.516330 | ν11 = 64.2 |
| R21 = ∞ | D21 = 1.05 | | |
| R22 = ∞ | | | |

FOCAL LENGTH

| VARIABLE DISTANCE | 1.00 | 3.71 | 5.97 |
|---|---|---|---|
| D5 | 0.20 | 1.79 | 2.23 |
| D11 | 2.34 | 0.75 | 0.30 |
| D14 | 0.29 | 0.86 | 0.76 |
| D16 | 1.06 | 0.49 | 0.59 |

ASPHERICAL COEFFICIENT

| | K | B | C | D | E |
|---|---|---|---|---|---|
| 13-TH SIDE | −1.654 e + 00 | −5.606 e − 02 | −1.108 e − 02 | 1.205 e − 02 | −1.465 e − 02 |
| 20-TH SIDE | −5.997 e − 01 | 3.118 e − 02 | −5.914 e − 03 | −1.378 e − 02 | −1.860 e − 03 |

EXAMPLE 19

| f = 1 ~ 5.97 | Fno = 1.85 ~ 2.15 | 2ω= 61.7 ~ 11.4° |
|---|---|---|

| | | | |
|---|---|---|---|
| R1 = 6.447 | D1 = 0.28 | N1 = 1.846659 | ν1 = 23.8 |
| R2 = 4.213 | D2 = 2.16 | N2 = 1.603112 | ν2 = 60.7 |
| R3 = 283.391 | D3 = 0.04 | | |
| R4 = 3.153 | D4 = 1.01 | N3 = 1.638539 | ν3 = 55.4 |
| R5 = 6.691 | D5 = VARIABLE | | |
| R6 = 5.555 | D6 = 0.12 | N4 = 1.806098 | ν4 = 41.0 |
| R7 = 0.968 | D7 = 0.46 | | |
| R8 = −2.452 | D8 = 0.12 | N5 = 1.806098 | ν5 = 41.0 |
| R9 = 2.041 | D9 = 0.21 | | |
| R10 = 2.255 | D10 = 0.44 | N6 = 1.846659 | ν6 = 23.8 |
| R11 = 33.376 | D11 = VARIABLE | | |
| R12 = DIAPHRAGM | D12 = 0.27 | | |
| R13 = 2.269 | D13 = 0.73 | N7 = 1.583126 | ν7 = 59.4 |
| R14 = −1.858 | D14 = VARIABLE | | |
| R15 = −7.346 | D15 = 0.20 | N8 = 1.846659 | ν8 = 23.8 |
| R16 = 3.046 | D16 = VARIABLE | | |
| R17 = 1.894 | D17 = 0.15 | N9 = 1.846659 | ν9 = 23.8 |
| R18 = 1.273 | D18 = 0.02 | | |
| R19 = 1.353 | D19 = 0.85 | N10 = 1.583126 | ν10 = 59.4 |
| R20 = −2.013 | D20 = 0.49 | N11 = 1.516330 | ν11 = 64.2 |
| R21 = ∞ | D21 = 1.05 | | |
| R22 = ∞ | | | |

FOCAL LENGTH

| VARIABLE DISTANCE | 1.00 | 3.71 | 5.97 |
|---|---|---|---|
| D5 | 0.20 | 1.79 | 2.24 |
| D11 | 2.35 | 0.75 | 0.30 |
| D14 | 0.29 | 0.87 | 0.78 |
| D16 | 1.06 | 0.48 | 0.57 |

ASPHERICAL COEFFICIENT

| | K | B | C | D | E |
|---|---|---|---|---|---|
| 13-TH SIDE | −1.654 e + 00 | −5.606 e − 02 | −1.108 e − 02 | 1.205 e − 02 | −1.465 e − 02 |
| 20-TH SIDE | −5.997 e − 01 | 3.118 e − 02 | −5.914 e − 03 | −1.378 e − 02 | −1.860 e − 03 |

TABLE 2

| CONDITIONAL EXPRESSION | EXAMPLES | | | | | |
|---|---|---|---|---|---|---|
| | 14 | 15 | 16 | 17 | 18 | 19 |
| (1) F1/Fw | 4.98 | 5.00 | 5.11 | 5.30. | 5.52 | 5.51 |
| (2) D2w/D4w | 2.74 | 2.80 | 2.07 | 2.27 | 2.21 | 2.21 |
| (3) \|D4w/F4\| | 0.43 | 0.43 | 0.47 | 0.41 | 0.42 | 0.42 |
| (4) F4/Fw | −2.00 | −1.97 | −2.43 | −2.48 | −2.52 | −2.52 |
| (5) F2/Fw | −0.99 | −0.99 | −0.97 | −0.94 | −0.95 | −0.95 |
| (6) β3W | −0.57 | −0.57 | −0.58 | −0.59 | −0.59 | −0.58 |
| β3T | −0.73 | −0.71 | −0.75 | −0.81 | −0.84 | −0.84 |
| (7) \|β3MAX\| | 0.82 | 0.81 | 0.84 | 0.90 | 0.90 | 0.89 |
| (8) Z2/Z | 0.75 | 0.79 | 0.78 | 0.73 | 0.70 | 0.70 |
| (9) F3/Fw | 1.86 | 1.87 | 1.88 | 1.88 | 1.87 | 1.87 |
| (10) ν4 | 41 | 41 | 41 | 41 | 23.8 | 23.8 |
| (11) N4 | 1.806 | 1.806 | 1.806 | 1.806 | 1.847 | 1.847 |
| (12) \|R4a\|/R4b | 1.61 | 1.60 | 2.31 | 2.30 | 2.41 | 2.41 |
| (13) F5/Fw | 2.06 | 2.00 | 2.18 | 2.12 | 2.11 | 2.13 |
| (14) F4/F5 | −0.97 | −0.98 | −1.11 | −1.17 | −1.19 | 1.18 |
| (15) \|β5\| | −0.15 | −0.16 | 0.03 | 0.03 | 0.05 | 0.05 |
| (16) $\sqrt{Fw \times Ft}$ | 0.84 | 0.82 | 0.89 | 0.87 | −0.87 | 0.87 |
| (17) β4W | −6.27 | −5.85 | 33.09 | 30.98 | 18.97 | 18.22 |
| β4T | −6.42 | −5.99 | 32.96 | 30.81 | 18.78 | 18.02 |
| (18) Bfw/Fw | 1.76 | 1.73 | 1.78 | 1.73 | 1.7 | 1.71 |
| (19) Fw/φ1 | 0.18 | 0.18 | 0.17 | 0.15 | 0.13 | 0.13 |

In the foregoing embodiments, the zoom lens has been described in such a manner that a great importance is placed on the third lens unit. In the description below, the zoom lens according to the present invention will now be described in such a manner that a great importance is placed on the fourth lens unit.

FIGS. 40 to 47 are cross sectional views showing lenses according to Examples 20 to 27 according to the present invention to be described later. FIGS. 48(A)(1) to 55(B)(4) are graphs showing various aberrations of the examples 20 to 27. In each graph showing the aberration, graph (A) shows the wide angle end and (B) shows the telescopic end.

Referring to the drawings, symbol L1 represents a first unit (a first lens unit) having positive refracting power, L2 represents a second unit (a second lens unit) having negative refracting power, L3 represents a third unit (a third lens unit) having positive refracting power, L4 represents a fourth unit (a fourth lens unit) having negative refracting power, and L5 represents a fifth unit (a fifth lens unit) having positive refracting power. Symbol SP represents a diaphragm that is located in front of the third unit L3. Symbol IP represents an image surface.

When the power is varied from the wide angle end to the telescopic end, the second unit L2 is moved toward the image surface as indicated by an arrow. Furthermore, change in the image surface occurring when the power is varied is corrected by moving the fourth unit in such a manner that a convex locus facing the image surface is formed. The zoom lens according to this embodiment employs a rear focusing method in which focusing is performed by moving the fourth unit along the optical axis.

Continuous line curve 4a and dashed line curve 4b indicate loci of movements for correcting change in the image surface occurring when the power is changed from the wide angle end to the telescopic end in a case where an infinite object and a near object are focused. The first, third, and the fifth units are fixed when the power is varied and when focusing is performed.

In this embodiment, the fourth unit is moved to correct the change in the image surface occurring when the power is varied. Furthermore, the fourth unit is moved to perform focusing. As indicated by the curves 4a and 4b, the fourth unit is moved to form a convex locus facing the image surface when the power is varied from the wide angle end to the telescopic end. As a result, air between the fourth unit and the fifth unit can be used effectively and the overall length of the lens can be shortened effectively.

In this embodiment, when focusing is performed at the telescopic end from an infinite object to a near object, the fourth unit is moved rearwards as indicated by a straight line 4c.

In this embodiment, the fourth unit is composed of a single lens block, such as a single lens or bonded lens block, as employed in Examples 20 to 27 to reduce the size and the weight of the fourth unit. As a result, the fourth unit is permitted to perform power variation and focusing at high speed.

The rear focusing zoom lens according to the present invention is characterized as described above. Moreover, it is preferable that at least one of the following conditions be satisfied to satisfactorily form the structure.

(2–1) The fourth lens unit is composed of a negative lens having two lens surfaces each of which is concave. Assuming that the curvature radii of the surfaces of the negative lens facing the object and the image surface are R4a and R4b, the following must be satisfied:

$$1.1 < |R4a|/R4b$$

As a result, the second principal point of the fourth lens unit is shifted toward the fifth lens unit, and, therefore, the movable range for the fourth lens unit can be enlarged. Thus, the size reduction can be performed effectively.

(2–2) Generally, a so-called front lens focusing method for the zoom lens has been known in which rangefinding (focusing) is performed by moving the first lens unit along the optical axis. The foregoing method, however, encounters a fact that the diameter of the front lens is inevitably enlarged because light beams are, at the wide angle portion, maintained in the peripheral image surface when close-up photographing operation is performed. Accordingly, the foregoing focusing method encounters a difficulty in reducing the size that is one of the objects of the present invention.

It is preferable that the first lens unit, having the largest diameter in the system, be fixed during zooming to simplify the structure. As a result, it is preferable that lens units disposed to follow the third lens unit, in particular, the fourth lens unit performs focusing in a case where size reduction is the object. Furthermore, it is preferable that also the third lens unit having a diaphragm unit be fixed to simplify the mechanism. If the third lens unit having the diaphragm unit is composed of a single lens, the mechanism in the vicinity of the diaphragm unit, can be reduced in size and assembling can be performed simply. Furthermore, the movable space for the fourth lens unit can easily be maintained.

It is preferable that the fourth lens unit be moved from the wide angle end to the intermediate zooming region toward the image surface. When a zoom lens capable of considerably varying the power is constituted, the fourth lens unit is moved from the wide angle end to the telescopic end to form a locus having convex facing the image surface, and more particularly, the fourth lens unit is caused to substantially reciprocate. In this case, a significant space saving efficiency can be obtained and, therefore, a zoom lens having a small size and capable of significantly varying the power can be realized. It is preferable that the horizontal magnification of the second lens unit be changed during zooming in such a manner that equal magnification (−1) is allowed to intervene.

The physical meaning of reduction in the diameter of the front lens permitted in the foregoing structure will now be described.

Hitherto, when the angle is intended to be widened, the height of light beams positioned outside the axis and made incident upon the first lens unit is increased at the intermediate zooming position adjacent to the wide angle end. As a result, the effective diameter of the first lens unit is enlarged. To prevent the enlargement of the diameter of the front lens, it is preferable that angle θ of light beams positioned outside the axis and made incident upon the pupil (the diaphragm) from the object at the foregoing intermediate zooming position be set to a small angle. In order to achieve this, it is preferable that the fourth lens unit be moved from the wide angle end to the intermediate zooming region toward the image surface.

As a result, the focal length that determines the diameter of the front lens is considerably shifted toward the telescopic portion. Thus, the diameter can be reduced. It is effective that the exit pupil of the lens be located in a range of positive values (in a range from the image surface opposing the object) over the entire zooming region.

It is preferable for the present invention that the exit pupil be located from the image surface in the region of positive values (opposing the object). It is further preferable that the exit pupil be in a positive values at least at the wide angle end that contributes to determining the diameter of the front lens.

(2–3) Assuming that the focal length of each of the i-th lens unit is Fi and the focal lengths of the overall system at the wide angle end and the telescopic end are $F_w$ and $F_t$, it is preferable that the following be satisfied:

$$4.0 < F1/F_w < 12$$

The foregoing conditions are required to provide a zoom lens having a small size and simple structure and capable of varying the power by 6 times or more according to the present invention.

The foregoing expression relates to the object point with respect to the second lens unit, that is, to the magnification. To reduce the size of the overall system, it is preferable that the second lens unit performs zooming to allow equal magnification to intervene. If the equal magnification is allowed to intervene, the zooming locus of the fourth lens unit is made to be allowed to substantially reciprocate. Thus, significant variation of the power can be performed in such a manner that a most effective space saving effect can be obtained. Specifically, if the value is larger than the upper limit, the focal length of the first lens unit is lengthened, the object point with respect to the second lens unit, that is the main unit for varying the power, is made remote, the imaging magnification of the second lens unit is lowered, and thus effective size reduction cannot be performed. Furthermore, the distance from the first lens unit to the second lens unit is lengthened and, therefore, size reduction cannot be performed.

If the value is smaller than the lower limit, the focal length of the first lens unit is shortened. If the imaging horizontal magnification of the second lens unit is intended to be maintained as described above, the refracting power of the second lens unit is strengthened excessively. Thus, a severe accuracy is required to support the lens.

(2–4) It is preferable that the fourth lens unit be moved rearwards toward the image surface when rangefinding (focusing) of a near object is performed. If the rangefinding is performed by moving rearwards the fourth lens unit having negative refracting power, the focal length of the overall system at the time of performing the foregoing operation is somewhat lengthened. As a result, the problem that the effective variable power ratio is reduced in the short distance portion with respect to the paraxial variable power ratio as has been experienced with the rear focusing method in which the positive lens unit performs rangefinding can be prevented. Even if the power is varied considerably, a desired variable power ratio can be obtained in the short distance portion.

(2–5) It is preferable that the diaphragm relating to the reduction in the diameter of the front lens be located near the third lens unit at the telescopic end. At this time, the movement may be performed in such a manner that the diaphragm is, at the wide angle portion, located at a position nearer the object than the position at the telescopic end to effectively reduce the diameter of the front lens.

Generally, light beams out of the axis that are made incident on the first lens unit are made highest at an intermediate zooming position adjacent to the wide angle end because the incident pupil is located at a position deepest (most remote position) from the first lens unit. If the position, at which the light beams are made highest, can be set near the wide angle end by moving the incident pupil, that is, the diaphragm, the outer diameter of the first lens unit can be reduced most efficiently.

In particular, it is preferable that the diaphragm be fixed at a position near the third lens unit during the zooming to constitute a desired structure. It is preferable that the diaphragm be located in the third lens unit at a position relatively adjacent to the object, more preferably located nearest the object in order to reduce the diameter of the front lens.

(2–6) Assuming that the distance from the second lens unit to the third lens unit (to the surface of the diaphragm in a case where the diaphragm is located in the third lens unit adjacent to the object) at the wide angle end when the distance from the object is infinite is $D2_w$, and the distance from the fourth lens unit to the fifth lens unit is $D4_w$, it is preferable that the following be satisfied:

$$1.5 < D2_w/D4_w < 3.5$$

The foregoing expression provides the space for moving the fourth lens unit for performing focusing, which is enlarged near the telescopic end, in relation to the movable range for the second lens unit, which is the main lens unit for varying the power. In a case of a zoom lens employing the foregoing rear focusing method, the amount of movement of the focusing lens at the telescopic end is inevitably enlarged if the distance from an object is short. In particular, the amount of movement for correcting the image surface position of the fourth lens unit and that for performing focusing are enlarged in proportion to the zooming magnification. If $D2_w$ is large, that is, if the movable range for performing zooming is large, the zooming ratio is raised. Thus, the amount of movement for the fourth lens unit for performing a desired close-up photographing operation must be enlarged at the telescopic end. The foregoing expression indicates the foregoing correlation. If the value is larger than the upper limit, the shortest distance is made excessively remote at the telescopic end. If the value is smaller than the lower limit, an undesired zoom lens having a small zooming ratio will be realized.

(2–7) It is preferable that the movement of the focusing lens satisfies the following:

$$0.3<|D4_w/F4|<1.0$$

The foregoing expression provides an appropriate relationship between the refracting power of the fourth lens unit, which is the focusing lens, and the movable space with respect to the fifth lens unit. If the value is larger than the upper limit, an excessively large gap for performing a desired shortest distance is undesirably provided. Thus, the overall length is lengthened excessively. If the value is smaller than the lower limit, a space required to perform focusing cannot be maintained.

In particular, the amount of rearward movement is enlarged at the telescopic end. To perform power variation exceeding 10 times, it is preferable that the foregoing ratio be included in the following range:

$$0.6<|D4_w/F4|<1.0$$

It is preferable that the fourth lens unit satisfy the following relationship:

$$-5.0<F4/F_w<-1.5$$

If the value is larger than the upper limit, the refracting power of the fourth lens unit is strengthened and the Petzval sum is enlarged in a negative value range. Thus, the image surface is corrected excessively. If the value is smaller than the lower limit, the amount of movement of the fourth lens unit is enlarged. As a result, a desired close-up photography distance cannot be provided. Thus, the overall system is enlarged excessively.

(2–8) It is preferable that the second lens unit, which is the main lens unit for varying the power for performing zooming, satisfies the following:

$$-2.0<F2/F_w<-0.8$$

If the value is larger than the upper limit, the refracting power of the second lens unit is strengthened and the Petzval sum is enlarged in a negative value range. Thus, the image surface is corrected excessively. If the value is smaller than the lower limit, the amount of movement of the second lens unit for obtaining a desired variable power ratio is enlarged. Thus, the diameter of the front lens and the overall system are excessively enlarged.

(2–9) It is preferable that light beams be formed into a divergent system when they are made incident upon the third lens unit so as to be formed into converged system when they are introduced into the fourth lens unit. That is, it is suitable that the imaging magnification β3 always has a negative value over the all zooming region to reduce the size.

$$\beta 3<0$$

If the foregoing expression is satisfied, the fourth lens unit can efficiently be moved. In particular, the fourth lens unit can be moved to form a locus having convex facing the image surface from the wide angle end to the telescopic end. In particular, the fourth lens unit can be allowed to substantially completely reciprocate. Thus, the size can be reduced as desired.

To further reduce the size of the overall system and to effectively provide the moving space, it is preferable that the fourth lens unit be allowed to reciprocate substantially completely or form a locus having convex facing the image surface, as described above. To achieve this, it is preferable that the imaging magnification of the third lens unit be a negative value, the absolute value of the same be enlarged from the wide angle end toward the telescopic end, and the absolute value be then reduced. Assuming that the paraxial horizontal magnifications of the third lens unit at the wide angle end and that at the telescopic end are β3W and β3T, the most excellent space efficiency can be obtained in the following case:

$$\beta 3w \approx \beta 3T$$

Assuming that the maximum value of the absolute value of the paraxial horizontal magnification of the third lens unit from the wide angle end to the telescopic end is β3MAX (a value existing during zooming), it is preferable that the following be satisfied:

$$|\beta 3MAX|>0.8$$

To further enlarge the power, it is preferable that the following be satisfied:

$$|\beta 3MAX|>0.9$$

Furthermore, it is preferable that the foregoing value crosses −1 to enlarge the power.

(2–10) Assuming that the ratio (β2T/β2w) of the magnifications of the second lens unit from the wide angle end to the telescopic end is Z2 and the ratio ($F_t/F_w$) of the focal lengths of the overall system is Z, it is preferable that the following be satisfied:

$$0.40<Z2/Z<1.30$$

The foregoing expression indicates the variable power ratio of the second lens unit with respect to the variable power ratio of the overall system. If the value is larger than the upper limit, the power of any unit in the lens system is decreased during zooming. Therefore, the power variation efficiency deteriorates and the size is undesirably enlarged. If the value is smaller than the lower limit, a plurality of lens units exist that contribute to the power variation. Thus, each lens unit cannot easily be controlled. If the fourth lens unit is allowed to completely reciprocate during zooming, the most excellent space saving efficiency can be performed. To obtain a desired zooming ratio, the fourth lens unit cannot be completely returned sometimes. Also the fourth lens unit contributes to somewhat power variation at the foregoing time ($|\beta 4W|<|\beta 4T|$). It is preferable that the following be satisfied in the foregoing case:

$$0.68<Z2/Z<0.8$$

If the value is out of the foregoing range and, thus, the fourth lens unit considerably contributes to the power variation, the movable space for the fourth lens unit is enlarged. Thus, the size of the overall system is enlarged excessively. As a matter of course, if the third lens unit can be moved during zooming and contributes to power variation, the foregoing problems does not arise.

(2–11) It is preferable that the third lens unit satisfy the following:

$$1.5<F3/F_w<4.5$$

The foregoing expression is effective to appropriately provide the magnification of the third lens unit. If the value is larger than the upper limit, the size is enlarged excessively. If the value is smaller than the lower limit, the movable space for the fourth lens unit for performing focusing cannot properly be provided. If the value is out of the foregoing range, the fourth lens unit cannot be moved efficiently. In particular, the fourth lens unit cannot be moved from the wide angle end to the telescopic end to form a locus having convex facing the image surface or cannot be allowed to substantially completely reciprocate. The third lens unit is composed of a single lens to achieve the size reduction. To prevent spherical aberration, an aspherical surface may be provided for any surface of the third lens unit.

(2–12) It is preferable that the size and weight of the fourth lens unit, which is a focusing lens unit and which is a lens unit for correcting the image point, is moved, be reduced in order to reduce the size and to simplify the mechanism because the fourth lens unit is moved. To achieve this, the fourth lens unit may be composed of a negative single lens. To prevent change in the chromatic aberration occurring when focusing or zooming is performed, it is preferable that the following be satisfied:

$$20<v4<50$$

where v4 is the Abbe's number of the material of the lens composing the fourth lens unit.

(2–13) It is preferable that the refractive index of the single lens composing the fourth lens unit be included in the following range:

$$1.65<N4$$

where N4 is the refractive index of the lens composing the fourth lens unit. If the value is out of the foregoing range, the curvature ratio of the lens surface is sharpened. Thus, the focal length F4 in the foregoing range cannot be provided. Thus, the aberration deteriorates excessively.

(2–14) To prevent generation of the aberration and to enlarge the movable range, it is preferable that the curvature radius of the lens surface of the single lens composing the fourth lens unit be included in the following range:

$$1.4<|R4a|/R4b<3.0$$

(2–15) To cause the fifth lens unit, which is the final imaging lens, to have an excellent aberration with respect to the focal length of the overall system and to maintain an appropriate back focus, it is preferable that the following be satisfied:

$$1.50<F5/F_w<5.0$$

If the value is larger than the upper limit, the back focus is lengthened and, thus, the size is enlarged. If the value is smaller than the lower limit, the refracting power of the fifth lens unit is strengthened. Thus, undesirable spherical aberration and comatic aberration will easily be generated in, particularly, in the intermediate zooming region. What is worse, the telecentric relationship is lost, causing the exit pupil to be shortened undesirably. What is worse, a desired block, such as a filter, cannot be inserted.

(2–16) The structure of the lens according to the present invention has an arrangement to prevent the distance to the position of the exit pupil of the zoom lens from being excessively short. Furthermore, diagonal light beams from the object are made incident at a small angle as described above so that the diameter of the front lens is reduced.

If the range of the power of the lens unit from the diaphragm toward the image surface is set to a moderate range, the diagonal light beams cannot be set at a small angle. Thus, the diameter of the front lens is enlarged undesirably. If the value is smaller than the lower limit, the exit pupil is shortened excessively in the positive value range. As a result, telecentric light beams with respect to the solid-image sensing device cannot be maintained. Furthermore, excessive change in the aberration during zooming and focusing takes place. If the value is included in the foregoing range, excessive movement can be prevented even if rangefinding (focusing) is performed. Thus, the size can be reduced. If the value is out of the foregoing range, the diameter of the front lens is enlarged, causing the size of the overall system to be enlarged. Furthermore, an appropriate emission angle with respect to the image sensing device cannot be provided. It is preferable that the position of the exit pupil satisfy the following:

$$-1.5<F4/F5<-0.75$$

If the value is larger than the upper limit, the refracting power of the fourth lens unit is strengthened, and, thus, excessive change in the distance for performing focusing occurs. If the value is smaller than the lower limit, the amount of movement required when focusing is performed is enlarged. Thus, the size is enlarged excessively. What is worse, the refracting power of the fifth lens unit, which is a fixed imaging lens, is strengthened, causing the exit pupil to be shortened excessively.

(2–17) To appropriate maintain the back focus of the lens while appropriate providing the exit pupil of the overall lens system, it is preferable that the following be satisfied assuming that the imaging magnification of the fifth lens unit is $\beta 5$:

$$|\beta 5|<0.25$$

If the value is out of the foregoing range, the back focus is enlarged and, thus, the lens system is enlarged. What is worse, the exit pupil is shortened undesirably.

(2–18) To cause the fifth lens unit, which is the final imaging lens, to have an excellent aberration with respect to the focal length of the overall system and to maintain appropriate back focus, it is preferable that the following be satisfied:

$$0.68 < F5/\sqrt{Fw \times Ft} < 0.92$$

If the value is larger than the upper limit, the back focus is lengthened, and, therefore, the size is enlarged undesirably. If the value is smaller than the lower limit, the refracting power of the fifth lens unit is strengthened, thus causing spherical aberration and comatic aberration to be generated in, particularly, in an intermediate zooming region. What is worse, the telecentric relationship is lost, and, therefore, the exit pupil is shortened undesirably.

(2–19) To prevent change in the position of the exit pupil with respect to the solid-image sensing device while maintaining an appropriate back focus, it is preferable that the magnification β4 of the fourth lens unit always has the same sign during zooming. If β4 is changed with the sign being changed during zooming, the incidental angle on the fixed fifth lens unit, which is the final imaging lens unit, is changed excessively. Thus, the incidental angle of peripheral light beams on the solid-image sensing device (a CCD or the like) is changed excessively when the zooming is performed. As a result, excess deviation from telecentric imaging takes place, thus causing shading to be generated undesirably.

(2–20) To prevent shading at the wide angle end and the telescopic end at which the exit pupil is shortened in a range of positive values and to main an appropriate back focus, it is preferable that the following be satisfied:

$$\beta 4W \times \beta 4T > 0$$

where the paraxial horizontal magnifications of the fourth lens unit at the wide angle end and that at the telescopic end when the distance from an object is infinite are β4W and β4T, respectively.

(2–21) To reduce the size of the overall system, it is preferable that the following be satisfied:

$$1.5 < Bf_w/F_w < 4.2$$

where $Bf_w$ is the back focus (element "G", such as a glass block or a filter, in the embodiment is excluded) at the wide angle end when the distance from an object is infinite. The foregoing expression is required to effectively reduce the size of the overall system. If the value is smaller than the lower limit, a block, such as a filter, cannot be inserted. Furthermore, the exit pupil is shortened to undesirably deviate the image forming on the imaging device from the telecentric system. If the value is larger than the upper limit, the size is enlarged undesirably.

(2–22) It is preferable that the specific lens structure of each lens unit be as follows:

The first lens unit is composed of a plurality of lenses including at least one negative lens.

The second lens unit is composed of a plurality of lenses including at least one positive lens.

The third lens unit is composed of at least one positive lens.

The fourth lens unit is composed of at least one negative lens.

The fifth lens unit is composed of a plurality of lenses including at least one negative lens.

In particular, it is preferable that the first lens unit be composed of a negative meniscus lens having convex facing the object, a positive lens having a convex facing the object and a positive lens having a convex facing the object, the foregoing lenses being disposed in the foregoing sequential order when viewed from the object.

It is preferable that the second lens unit be composed of a negative meniscus lens having a convex facing the object, a double-concave lens and a positive lens, the foregoing lenses being disposed in the foregoing sequential order when viewed from the object.

An aspherical surface may be provided for any lens surface of the third lens unit. If the third lens unit is composed of a single lens, the aspherical surface may be provided for its surface facing the object or for its surface facing the image surface. To satisfactorily correct the spherical aberration, it is preferable that the aspherical surface be provided on the lens surface facing the object.

The fourth lens unit corrects change in the image point of the second lens unit occurring during zooming, or that occurring when the second lens unit is moved, and as well as performs focusing. To prevent change in the aberration occurring during focusing, and to prevent change in the chromatic aberration, the fourth lens unit may be composed of two lenses consisting of a positive lens and a negative lens, in place of being composed of a single lens.

The positive lens and the negative lens may be bonded so as to be formed into one block. In this case, it is preferable that the following be satisfied assuming that the Abbe's number of the material of the positive lens and that of the negative lens are v4p and v4n, respectively:

$$v4p < v4n$$

If the value is out of the foregoing range, the chromatic aberration and the distance are changed excessively. By composing the fourth lens unit by bonding a positive lens and a negative lens to each other, the fourth lens unit, which is moved when zooming is performed and also moved when focusing is performed, is formed into a single block. Thus, the structure of the fourth lens unit can be simplified and supported easily similarly to the case where the fourth lens unit is composed of a single lens.

Assuming that the Abbe's numbers of the positive lens and the negative lens composing the fourth lens unit are v4p and v4n, it is preferable that the following be satisfied:

$$v4n - v4p > 15$$

To effectively change the chromatic aberration during zooming, it is preferable that the following be satisfied:

$$v4n - v4p > 30$$

In a case where the lenses for composing the fourth lens unit are unified into one block, in particular, in a case where the same is composed by bonding a positive lens and a negative lens or composed of one negative lens, it is preferable that the lens surface of the block facing an object has the concave facing the object and the lens surface facing the image has the concave facing the image.

The fifth lens unit is the positive lens unit that is fixed during zooming. Thus, spherical aberration can easily be generated. To correct the spherical aberration, it is preferable that the fifth lens unit be composed of at least one positive lens and at least one negative lens. If the fifth lens unit is composed of one positive lens and one negative lens, it is preferable that an aspherical surface be provided for either lens surface. In this case, the spherical aberration can satisfactorily be corrected. To correct the chromatic aberration, a bonded lens unit may be employed.

If the fifth lens unit is composed of one positive lens and one negative lens, it is preferable that the structure be employed in which a negative meniscus lens having a convex surface facing the object and a double-convex lens are disposed in this sequential order when viewed from the object. As a result, the second principal point is located in a portion adjacent to the image surface. Thus, the back focus can effectively be maintained. In this case, the two lenses may be bonded to each other so as to be formed into one block. Thus, the lens unit can easily be supported and thus the structure can be simplified.

(2–23) To satisfactorily shorten the distance e1 between the principal points of the first lens unit and that of the second lens unit for the purpose of widen the angle is one of important points. To achieve this, it is preferable that the second lens unit has the following structure.

To shorten e1 at the wide angle end, it is preferable that the (second) principal point of the first lens unit facing the image surface be located at a position facing the image surface for the purpose of widen the angle. Specifically, a negative meniscus lens L11 having a convex surface facing an object, an air gap, a positive lens L12 having a convex surface facing the object, and a positive lens L13 having a convex surface facing the object are disposed in the foregoing sequential order when viewed from a position adjacent to the first lens unit facing the object. It is preferable that an air lens formed by the lenses L11 and L12 has negative refracting power. Thus, the principal point of the first lens unit facing the image surface is shifted toward the second lens unit. As a result, e1 can be shortened at the wide angle portion so that angle is widened effectively. To further shorten e1 at the wide angle end, it is preferable that the (first) principal point of the second lens unit facing the object be located in a portion adjacent to the object in order to widen the angle.

Specifically, it is preferable that a negative meniscus lens L21 having a convex surface facing an object, a double-concave negative lens L21, an air gap, and a positive lens L23 be disposed in the foregoing sequential order when viewed from a portion of the second lens unit facing the object. The air gap shifts the principal point of the second lens unit facing the object toward the first lens unit. Thus, e1 can be shortened in the wide angle portion so that angle is widened effectively. A negative lens L24 may be disposed in a portion adjacent to the lens L23 facing the image surface. The lens L24 shifts the principal point of the second lens unit facing the object toward the first lens unit. Furthermore, change in the chromatic aberration occurring during zooming can be prevented effectively.

(2–24) To realize a small size and wide angle zoom lens, it is preferable that the following be satisfied assuming that the outer diameter of the lens nearest the object is $\phi1$ and the focal length of the overall system at the wide angle end is $F_w$:

$$0.10 < F_w/\phi1 < 0.20$$

Generally, if the focal length $F_w$ at the wide angle end is shortened, the diameter $\phi1$ of the front lens is enlarged. If the focal length $F_w$ at the wide angle end is somewhat lengthened, the diameter $\phi1$ of the front lens is reduced though the reduction depends upon the brightness of the lens system at the telescopic end. The foregoing expression indicates an appropriate relationship between the diameter of the front lens and the focal length at the wide angle end for the purpose of realizing a small size and wide angle zoom lens. If the value is out of the foregoing range, a small size and wide angle zoom lens cannot be provided. Specifically, if the value is larger than the upper limit, a zoom lens of a telescopic type is realized. If the value is smaller than the lower limit, a large size zoom lens will be realized undesirably.

The diameter $\phi1$ of the front lens is like the optically effective diameter of the first lens unit and is an actual outer diameter of the lens. The diameter $\phi1$ of the front lens is larger than the optically effective diameter of the first lens unit by about 0% to 6%.

According to the present invention, at least any of the foregoing conditions (2–1) to (2–24) is satisfied so that the diameter of the front lens is reduced. Furthermore, a rear focusing zoom lens can be provided which exhibits: the diameter of the front lens can be reduced; the angle can be widened at variable power ratios of about 6 times to about 20 times; the structure including the mechanism can be simplified; the size and weight can be reduced; the actual variable power ratio cannot easily be changed when the distance from an object is an effective distance (short distance); excellent performance can be obtained over all zooming regions over the distance from the object, in particular, distortion can be prevented; the size can be reduced and the angle can be widened; the lens structure can be simplified; and the manufacturing cost can be reduced.

Examples of the present invention will now be described. In the examples, Ri is the curvature radius of the lens system of the i-th lens counted from the object, Di is the thickness of the i-th lens and that of an air gap, and Ni and vi are the refractive index of the glass of the i-th lens counted from the object and the Abbe's number of the same. In the examples, the final two lens surfaces are glass blocks, such as a face plate and a filter. The relationship among the foregoing conditional expressions and the specifications of the examples are shown in Table 3. Under conditions that X-axis stands for the direction of the optical axis, H-axis stands for the direction perpendicular to the optical axis, the direction of travel of light is expressed by positive values, R represents the paraxial curvature radius, and K, B, C, D, and E are aspherical surface coefficients, the aspherical surface is expressed by the following equation:

$$X = \frac{(1/R)H^2}{1 + \sqrt{1 - (1+k)(H/R)^2}} + BH^4 + CH^6 + DH^8 + EH^{10}$$

Expression "e–0X" indicates "$10^{-x}$".

EXAMPLE 20

| f = 1~5.98 | Fno = 1.85~2.17 | 2ω = 61.7°~11.4° | |
|---|---|---|---|
| R1 = 5.858 | D1 = 0.28 | N1 = 1.846659 | v1 = 23.8 |
| R2 = 3.628 | D2 = 1.26 | N2 = 1.603112 | v2 = 60.7 |
| R3 = −478.413 | D3 = 0.04 | | |
| R4 = 2.985 | D4 = 0.73 | N3 = 1.603112 | v3 = 60.7 |
| R5 = 7.503 | D5 = VARIABLE | | |
| R6 = 7.219 | D6 = 0.12 | N4 = 1.806098 | v4 = 41.0 |
| R7 = 0.994 | D7 = 0.44 | | |
| R8 = −2.897 | D8 = 0.12 | N5 = 1.806098 | v5 = 41.0 |
| R9 = 2.028 | D9 = 0.21 | | |
| R10 = 2.219 | D10 = 0.44 | N6 = 1.846659 | v6 = 23.8 |
| R11 = 36.548 | D11 = VARIABLE | | |
| R12 = DIAPHRAGM | D12 = 0.27 | | |
| R13 = 2.069 | D13 = 0.73 | N7 = 1.583126 | v7 = 59.4 |

-continued

| | | | |
|---|---|---|---|
| R14 = −1.988 | D14 = VARIABLE | | |
| R15 = −4.254 | D15 = 0.20 | N8 = 1.806098 | ν8 = 41.0 |
| R16 = 2.642 | D16 = VARIABLE | | |
| R17 = 3.390 | D17 = 0.49 | N9 = 1.516330 | ν9 = 64.2 |
| R18 = −2.961 | D18 = 0.04 | | |
| R19 = 2.046 | D19 = 0.15 | N10 = 1.846659 | ν10 = 23.8 |
| R20 = 1.158 | D20 = 0.61 | N11 = 1.487490 | ν11 = 10.2 |
| R21 = −6.436 | D21 = 0.49 | | |
| R22 = ∞ | D22 = 1.05 | N12 = 1.516330 | ν12 = 64.2 |
| R23 = ∞ | | | |

G = R22, R23

| | FOCAL LENGTH | | |
|---|---|---|---|
| VARIABLE DISTANCE | 1.00 | 3.84 | 5.93 |
| D5 | 0.20 | 1.19 | 2.24 |
| D11 | 2.35 | 0.76 | 0.30 |
| D14 | 0.29 | 0.18 | 0.61 |
| D16 | 0.86 | 0.37 | 0.54 |

ASPHERICAL COEFFICIENT
R13  K = −1.659 e+00  B = 4.121 e−02  C = =1.083 e−02
     D = 1.125 e−02   E = −1.238 e−02

EXAMPLE 21

| | | | |
|---|---|---|---|
| f = 1~6.00 | Fno = 1.85~2.08 | 2ω = 61.7°~11.4° | |
| R1 = 5.850 | D1 = 0.28 | N1 = 1.846659 | ν1 = 23.8 |
| R2 = 3.656 | D2 = 1.36 | N2 = 1.603112 | ν2 = 60.7 |
| R3 = −165.992 | D3 = 0.04 | | |
| R4 = 3.005 | D4 = 0.74 | N3 = 1.603112 | ν3 = 60.7 |
| R5 = 7.300 | D5 = VARIABLE | | |
| R6 = 1.031 | D6 = 0.12 | N4 = 1.806098 | ν4 = 41.0 |
| R7 = 0.994 | D7 = 0.46 | | |
| R8 = −2.861 | D8 = 0.12 | N5 = 1.806098 | ν5 = 41.0 |
| R9 = 2.026 | D9 = 0.21 | | |
| R10 = 2.259 | D10 = 0.44 | N6 = 1.8(6659 | ν6 = 23.8 |
| R11 = 38.408 | D11 = VARIABLE | | |
| R12 = DIAPHRAGM | D12 = 0.27 | | |
| R13 = 2.089 | D13 = 0.73 | N7 = 1.583126 | ν7 = 59.4 |
| R14 = −1.995 | D14 = VARIABLE | | |
| R15 = −4.166 | D15 = 0.20 | N8 = 1.806098 | ν8 = 41.0 |
| R16 = 2.611 | D16 = VARIABLE | | |
| R17 = 3.368 | D17 = 0.49 | N9 = 1.516330 | ν9 = 64.2 |
| R18 = −2.981 | D18 = 0.04 | | |
| R19 = 2.034 | D19 = 0.15 | N10 = 1.846659 | ν10 '2 23.8 |
| R20 = 1.160 | D20 = 0.61 | N11 = 1.481490 | ν11 = 70.2 |
| R21 = 5.416 | D21 = 0.49 | | |
| R22 = ∞ | D22 = 1.05 | N12 = 1.516330 | ν12 = 64.2 |
| R23 = ∞ | | | |

G = R22, R23

| | FOCAL LENGTH | | |
|---|---|---|---|
| VARIABLE DISTANCE | 1.00 | 3.87 | 6.00 |
| D5 | 0.20 | 1.79 | 2.24 |
| D11 | 2.35 | 0.76 | 0.30 |
| D14 | 0.33 | 0.80 | 0.59 |
| D16 | 0.84 | 0.37 | 0.51 |

ASPHERICAL COEFFICENT
R13  K = 1.659 e+00  B = −4.141 e−02  C = −1.082 e−02
     D = 1.125 e−02  E = −1.238 e−02

EXAMPLE 22

| | | | |
|---|---|---|---|
| f = 1~6.00 | Fno = 1.85~2.04 | 2ω = 61.7°~11.4° | |
| R1 = 6.215 | D1 = 0.28 | N1 = 1.846659 | ν1 = 23.8 |
| R2 = 3.900 | D2 = 1.42 | N2 = 1.603112 | ν2 = 60.7 |
| R3 = −111.124 | D3 = 0.04 | | |

-continued

| | | | |
|---|---|---|---|
| R4 = 2.879 | D4 = 0.84 | N3 = 1.603112 | ν3 = 60.7 |
| R5 = 6.193 | D5 = VARIABLE | | |
| R6 = 5.998 | D6 = 0.12 | N4 = 1.806098 | ν4 = 41.0 |
| R7 = 0.991 | D7 = 0.46 | | |
| R8 = −2.633 | D8 = 0.12 | N5 = 1.806098 | ν5 = 41.0 |
| R9 = 2.041 | D9 = 0.21 | | |
| R10 = 2.343 | D10 = 0.44 | N6 = 1.846659 | ν6 = 23.8 |
| R11 = 42.205 | D11 = VARIABLE | | |
| R12 = DIAPHRAM | D12 = 0.27 | | |
| R13 = 2.270 | D13 = 0.73 | N7 = 1.583126 | ν7 = 59.4 |
| R14 = −1.862 | D14 = VARIABLE | | |
| R15 = −6.532 | D15 = 0.20 | N8 = 1.806098 | ν8 = 41.0 |
| R16 = 2.829 | D16 = VARIABLE | | |
| R17 = 1.873 | D17 = 0.15 | N9 = 1.846659 | ν9 = 23.8 |
| R18 = 1.085 | D18 = 0.85 | N10 = 1.583126 | ν10 = 59.4 |
| R19 = −2.044 | D19 = 0.49 | | |
| R20 = ∞ | D20 = 1.05 | N11 = 1.516330 | ν11 = 64.2 |
| R21 = ∞ | | | |
| G = R20, R21 | | | |

| | FOCAL LENGTH | | |
|---|---|---|---|
| VARIABLE DISTANCE | 1.00 | 3.76 | 6.00 |
| D5 | 0.20 | 1.79 | 2.24 |
| D11 | 2.35 | C.76 | 0.30 |
| D14 | 0.31 | 0.81 | 0.63 |
| D16 | 1.14 | 0.&4 | 0.82 |

ASPHERICAL COEFFICIENT
R13  K = −1.654 e+00  B = −5.235 e-02  C = '11.093 e-02
     D = 1.205 e-02   E = −1.465 e-02
R19  K = −5.996 e-01  B = 2.686 e-02   C = −6.032 e-03
     D = −1.379 e-02  E = −1.860 e-03

EXAMPLE 23

| f = 1~5.98 | Fno = 1.85~2.10 | 2ω = 61.7°~11.4° | |
|---|---|---|---|
| R1 = 6.182 | D1 = 0.28 | N1 = 1.846659 | ν1 = 25.8 |
| R2 = 4.042 | D2 = 1.72 | N2 = 1.603112 | ν2 = 60.1 |
| R3 = −391.245 | D3 = 0.04 | | |
| R4 = 2.986 | D4 = 0.98 | N3 = 1.603112 | ν3 = 60.7 |
| R5 = 6.235 | D5 = VARIABLE | | |
| R6 = 6.112 | D6 = 0.12 | N4 = 1.806098 | ν4 = 41.0 |
| R7 = 0.975 | D7 = 0.46 | | |
| R8 = −2.510 | D8 = 0.12 | N5 = 1.806098 | ν5 = 41.0 |
| R9 = 2.066 | D9 = 0.21 | | |
| R10 = 2.259 | D10 = 0.44 | N6 = 1.846659 | ν6 = 23.8 |
| R11 = 26.760 | D11 = VARIABLE | | |
| R12 = DIAPHRAGM | D12 = 0.27 | | |
| R13 = 2.257 | D13 = 0.73 | N7 = 1.583126 | ν7= 59.4 |
| R14 = −1.874 | D14 = VARIABLE | | |
| R15 = −6.651 | D15 = 0.26 | N8 = 1.806098 | ν8 = 41.0 |
| R16 = 2.890 | D16 = VARIABLE | | |
| R17 = 1.825 | D17 = 0.15 | N9 = 1.846659 | ν9 = 23.8 |
| R18 = 1.057 | D18 = 0.85 | N10 = 1.585126 | ν10 = 59.4 |
| R19 = -1.989 | D19 = 0.49 | | |
| R20 = ∞ | D20 = 1.05 | N11 = 1.516330 | ν11 = 64.2 |
| R21 = ∞ | | | |
| G = R20, R21 | | | |

| | FOCAL LENGTH | | |
|---|---|---|---|
| VARIABLE DISTANCE | 1.00 | 3.74 | 6.00 |
| D5 | 0.20 | 1.76 | 2.20 |
| D11 | 2.31 | 0.75 | 0.30 |
| D14 | 0.30 | 0.86 | 0.72 |
| D16 | 1.02 | 0.46 | 0.60 |

ASPHERICAL COEFFICIENT
R13  K = −1.654 e+00  B = −5.302 e-02  C = −1.1 00 e-02
     D = 1.205 e-02   F = −1.465 e-02
R19  K = −5.996 e-01  B = 2.852 e-02   C = −5.979 e-03
     D = −1.379 e-02  E = −1.860 e-03

EXAMPLE 24

| | | | |
|---|---|---|---|
| f = 1~5.97 | Fno = 1.85~2.13 | 2ω = 61.7°~11.4° | |
| R1 = 6.454 | D1 = 0.28 | N1 = 1.846659 | ν1 = 23.8 |
| R2 = 4.213 | D2 = 2.16 | N2 = 1.603112 | ν2 = 60.7 |
| R3 = 273.515 | D3 = 0.04 | | |
| R4 = 2.979 | D4 = 1.01 | N3 = 1.603112 | ν3 = 60.7 |
| R5 = 6.298 | D5 = VARIABLE | | |
| R6 = 5.324 | D6 = 0.12 | N4 = 1.772499 | ν4 = 49.6 |
| R7 = 0.927 | D7 = 0.46 | | |
| R8 = −2.452 | D8 = 0.12 | N5 = 1.806098 | ν5 = 41.0 |
| R9 = 2.041 | D9 = 0.21 | | |
| R10 = 2.255 | D10 = 0.44 | N6 = 1.846659 | ν6 = 23.8 |
| R11 = 33.368 | D11 = VARIABLE | | |
| R12 = DIAPHRAGM | D12 = 0.27 | | |
| R13 = 2.269 | D13 = 0.73 | N7 = 1.583126 | ν7 = 59.4 |
| R14 = −1.858 | D14 = VARIABLE | | |
| R15 = −7.346 | D15 = 0.20 | N8 = 1.846659 | ν8 = 23.8 |
| R16 = 3.047 | D16 = VARIABLE | | |
| R17 = 1.894 | D17 = 0.15 | N9 = 1.846659 | ν9 = 23.8 |
| R18 = 1.273 | D18 = 0.02 | | |
| R19 = 1.353 | D19 = 0.85 | N10 = 1.583126 | ν10 = 59.4 |
| R20 = −1.990 | D20 = 0.49 | | |
| R21 = ∞ | D21 = 1.05 | N11 = 1.516330 | ν11 = 64.2 |
| R22 = ∞ | | | |
| G= R21, R22 | | | |

FOCAL LENGTH

| VARIABLE DISTANCE | 1.00 | 3.71 | 6.00 |
|---|---|---|---|
| D5 | 0.20 | 1.79 | 2.23 |
| D11 | 2.34 | 0.75 | 0.30 |
| D14 | 0.29 | 0.8[00fa] | 0.76 |
| D16 | 1.06 | 0.49 | 0.59 |

ASPHERICAL COEFFICIENT
R13  K = −1.654 e+00   B = −5.606 e-02   C = −1.108 e-02
     D = 1.205 e-02    E = −1.465 e-02
R20  K = −5.997 e-01   B = 3.118 e-02    C = −5.914 e-03
     D = −1.378 e-02   E = −1.860 e-03

EXAMPLE 25

| | | | |
|---|---|---|---|
| f = 1~5.91 | Fno = 1.85~2.15 | 2ω = 61.7°~11.4° | |
| R1 = 6.447 | D1 = 0.28 | N1 = 1.846659 | ν1 = 23.8 |
| R2 = 4.213 | D2 = 2.16 | N2 = 1.603112 | ν2 = 60.7 |
| R3 = 283.391 | D3 = 0.04 | | |
| R4 = 3.153 | D4 = 1.01 | N3 = 1.638539 | =3 = 55.4 |
| R5 = 6.691 | D5 = VARIABLE | | |
| R6 = 5.555 | D6 = 0.12 | N4 = 1.806098 | ν4 = 41.0 |
| R7 = 0.968 | D7 = 0.46 | | |
| R8 = −2.452 | D8 = 0.12 | N5 = 1.806098 | ν5 = 41.0 |
| R9 = 2.041 | D9 = 0.21 | | |
| R10 = 2.255 | D10 = 0.44 | N6 = 1.846659 | ν6 = 23.8 |
| R11 = 33.376 | D11 = VARIABLE | | |
| R12 = DIAPHRAGM | D12 = 0.21 | | |
| R13 = 2.262 | D13 = 0.73 | N7 = 1.583126 | ν7 = 59.4 |
| R14 = −1.858 | D14 = VARIABLE | | |
| R15 = −7.346 | D15 = 0.20 | N8 = 1.846659 | ν8 = 23.8 |
| R16 = 3.046 | D16 = VARIABLE | | |
| R17 = 1.894 | D17 = 0.15 | N9 = 1.846659 | ν9 = 23.8 |
| R18 = 1.273 | D18 = 0.02 | | |
| R19 = 1.353 | D19 = 0.85 | N10 = 1.583126 | ν10 = 59.4 |
| R20 = −2.013 | D20 = 0.49 | | |
| R21 = ∞ | D21 = 1.05 | N11 = 1.516330 | ν11 = 64.2 |
| R22 = ∞ | | | |
| G= R21, R22 | | | |

FOCAL LENGTH

| VARIABLE DISTANCE | 1.00 | 3.71 | 5.97 |
|---|---|---|---|
| D5 | 0.20 | 1.72 | 2.24 |
| D11 | 2.35 | 0.75 | 0.30 |
| D14 | 0.29 | 0.87 | 0.78 |
| D16 | 1.06 | 0.48 | 0.57 |

ASPHERICAL COEFFICIENT
R13   K = 1.654 e+00   B = −5.606 e-02   C = −1.108 e-02

-continued

|  |  |  |  |
|---|---|---|---|
|  | D = 1.205 e-02 | E = -1.465 e-02 |  |
| R20 | K = -5.997 e-01 | B = 3.118 e-02 | C = -5.914 e-03 |
|  | D = -1.378 e-02 | E = 1.860 e-03 |  |

EXAMPLE 26 f = 1~20.05  Fno = 1.85~3.59  2ω = 62.9°~3.5°

| R 1 = 15.447 | D 1 = 0.30 | N 1 = 1.846659 | ν 1 = 23.8 |
| R 2 = 7.375 | D 2 = 0.23 | | |
| R 3 = 10.645 | D 3 = 0.84 | N 2 = 1.603112 | ν 2 = 60.7 |
| R 4 = -36.500 | D 4 = 0.05 | | |
| R 5 = 5.434 | D 5 = 1.05 | N 3 = 1.603112 | ν 3 = 60.7 |
| R 6 = 53.752 | D 6 = VARIABLE | | |
| R 7 = 36.191 | D 7 = 0.15 | N 4 = 1.882997 | ν 4 = 40.8 |
| R 8 = 1.718 | D 8 = 0.50 | | |
| R 9 = -5.552 | D 9 = 0.15 | N 5 = 1.834000 | ν 5 = 37.2 |
| R10 = 3.669 | D10 = 0.27 | | |
| R11 = 3.494 | D11 = 0.62 | N 6 = 1.846659 | ν 6 = 23.8 |
| R12 = -3.680 | D12 = 0.04 | | |
| R13 = -3.363 | D13 = 0.17 | N 7 = 1.785896 | ν 7 = 44.2 |
| R14 = 15.751 | D14 = VARIABLE | | |
| R15 = DIAPHRAGM | D15 = VARIABLE | | |
| R16 = 14.991 | D16 = 0.68 | N 8 = 1.583126 | ν 8 = 59.4 |
| R17 = -4.832 | D17 = 0.05 | | |
| R18 = 7.603 | D18 = 0.93 | N 9 = 1.719995 | ν 9 = 50.3 |
| R19 = -2.730 | D19 = 0.25 | N10 = 1.846659 | ν10 = 23.8 |
| R20 = -10.068 | D20 = | | |
| R21 = -4.381 | D21 = 0.17 | N11 = 1.603112 | ν11 = 60.7 |
| R22 = 2.530 | D22 = 0.50 | N12 = 1.846659 | ν12 = 23.8 |
| R23 = 3.871 | D23 = | | |
| R24 = 12.568 | D24 = 0.82 | N13 = 1.583126 | ν13 = 59.4 |
| R25 = -4.243 | D25 = 0.05 | | |
| R26 = 3.627 | D26 = 0.17 | N14 = 1.846659 | ν14 = 23.8 |
| R27 = 2.027 | D27 = 0.12 | | |
| R28 = 2.151 | D28 = 0.87 | N15 = 1.516330 | ν15 = 64.2 |
| R29 = -32.087 | D29 = 0.50 | | |
| R30 = ∞ | D30 = 1.08 | N16 = 1.516330 | ν16 = 64.2 |
| R31 = ∞ | | | |
| G = R30, R31 | | | |

| VARIABLE DISTANCE | FOCAL LENGTH | | |
|---|---|---|---|
| | 1.00 | 8.45 | 20.05 |
| D 6 | 0.22 | 4.59 | 5.82 |
| D14 | 5.95 | 1.58 | 0.35 |
| D15 | 1.76 | 0.79 | 0.52 |
| D20 | 0.54 | 2.93 | 1.74 |
| D23 | 2.54 | 1.12 | 2.59 |

EXAMPLE 27 f = 1~19.70  Fno = 1.65~2.84  2ω = 62.1°~3.5°

| R 1 = 15.257 | D 1 = 0.30 | N 1 = 1.846659 | ν 1 = 23.8 |
| R 2 = 7.634 | D 2 = 0.36 | | |
| R 3 = 10.870 | D 3 = 0.99 | N 2 = 1.603112 | ν 2 = 60.7 |
| R 4 = -84.464 | D 4 = 0.05 | | |
| R 5 = 6.156 | D 5 = 1.33 | N 3 = 1.603112 | ν 3 = 60.7 |
| R 6 = 95.517 | D 6 = VARIABLE | | |
| R 7 = 22.162 | D 7 = 0.15 | N 4 = 1.882997 | ν 4 = 40.8 |
| R 8 = 1.597 | D 8 = 0.50 | | |
| R 9 = -4.863 | D 9 = 0.15 | N 5 = 1.834000 | ν 5 = 37.2 |
| R10 = 4.907 | D10 = 0.27 | | |
| R11 = 3.799 | D11 = 0.62 | N 6 = 1.846659 | ν 6 = 23.8 |
| R12 = -4.675 | D12 = 0.03 | | |
| R13 = -3.804 | D13 = 0.17 | N 7 = 1.785896 | ν 7 = 44.2 |
| R14 = 217.759 | D14 = VARIABLE | | |
| R15 = DIAPHRAGM | D15 = 0.42 | | |
| R16 = 53.443 | D16 = 0.85 | N 8 = 1.583126 | ν 8 = 59.4 |
| R17 = -4.258 | D17 = 0.05 | | |
| R18 = 5.595 | D18 = 1.05 | N 9 = 1.719995 | ν 9 = 50.3 |
| R19 = -2.961 | D19 = 0.25 | N10 = 1.846659 | ν10 = 23.8 |
| R20 = -12.916 | D20 = VARIABLE | | |
| R21 = -4.385 | D21 = 0.17 | N11 = 1.603112 | ν11 = 60.7 |
| R22 = 1.992 | D22 = 0.49 | N12 = 1.846659 | ν12 = 23.8 |
| R23 = 3.225 | D23 = VARIABLE | | |
| R24 = 9.664 | D24 = 0.75 | N13 = 1.583126 | ν13 = 59.4 |
| R25 = -4.531 | D25 = 0.05 | | |
| R26 = 3.530 | D26 = 0.17 | N14 = 1.846659 | ν14 = 23.8 |
| R27 = 1.790 | D27 = 0.03 | | |
| R28 = 1.812 | D28 = 1.06 | N15 = 1.516330 | ν15 = 64.2 |
| R29 = -18.764 | D29 = 0.49 | | |
| R30 = ∞ | D30 = 1.07 | N16 = 1.516330 | ν16 = 64.2 |
| R31 = ∞ | | | |
| G = R30, R31 | | | |

| VARIABLE DISTANCE | FOCAL LENGTH | | |
|---|---|---|---|
| | 1.00 | 7.66 | 19.70 |
| D 6 | 0.22 | 5.40 | 6.86 |
| D14 | 7.28 | 2.11 | 0.65 |
| D20 | 0.50 | 2.22 | 1.12 |
| D23 | 2.68 | 0.96 | 2.06 |

TABLE 3

| CONDITIONAL EXPRESSIONS | EXAMPLES | | | | | | | |
|---|---|---|---|---|---|---|---|---|
|  | 20 | 21 | 22 | 23 | 24 | 25 | 26 | 27 |
| |R4a|/R4b | 1.61 | 1.60 | 2.31 | 2.30 | 2.41 | 2.41 | 1.13 | 1.36 |
| F1/Fw | 4.98 | 5.00 | 5.11 | 5.30 | 5.52 | 5.51 | 8.64 | 9.81 |
| D2w/D4w | 2.74 | 2.80 | 2.07 | 2.27 | 2.21 | 2.21 | 2.34 | 2.72 |
| |D4w/F4| | 0.43 | 0.43 | 0.47 | 0.41 | 0.42 | 0.42 | 0.67 | 0.75 |
| F4/Fw | -2.00 | -1.97 | -2.43 | -2.48 | -2.52 | -2.52 | -3.78 | -3.56 |
| F2/Fw | -0.99 | -0.99 | -0.97 | -0.94 | -0.95 | -0.95 | -1.45 | -1.53 |
| β3 | | | | | | | | |
| β3W | -0.57 | -0.57 | -0.58 | -0.59 | -0.59 | -0.58 | -0.47 | -0.43 |
| β3T | -0.73 | -0.71 | -0.75 | -0.81 | -0.84 | -0.84 | -0.81 | -0.61 |
| Z2/Z | 0.75 | 0.79 | 0.78 | 0.73 | 0.70 | 0.70 | 0.58 | 0.71 |
| F3/Fw | 1.86 | 1.87 | 1.88 | 1.88 | 1.87 | 1.87 | 3.58 | 3.44 |

TABLE 3-continued

| CONDITIONAL EXPRESSIONS | 20 | 21 | 22 | 23 | 24 | 25 | 26 | 27 |
|---|---|---|---|---|---|---|---|---|
| $\nu 4$ | 41.0 | 41.0 | 41.0 | 41.0 | 23.8 | 23.8 | — | — |
| N4 | 1.81 | 1.81 | 1.81 | 1.81 | 1.85 | 1.85 | — | — |
| F5/Fw | 2.06 | 2.00 | 2.18 | 2.13 | 2.12 | 2.13 | 3.95 | 3.80 |
| F4/F5 | −0.97 | −0.98 | −1.11 | −1.17 | −1.19 | −1.18 | −0.96 | −0.94 |
| $|\beta 5|$ | 0.15 | 0.16 | 0.03 | 0.03 | 0.05 | 0.05 | 0.001 | 0.05 |
| $F5/\sqrt{Fw \times Ft}$ | 0.84 | 0.82 | 0.89 | 0.87 | 0.87 | 0.87 | 0.88 | 0.86 |
| $\beta 4$ | | | | | | | | |
| $\beta 4W$ | −6.3 | −5.9 | 33.1 | 31.0 | 19.0 | 18.2 | 1444 | 20.6 |
| $\beta 4T$ | −6.4 | −6.0 | 33.0 | 31.0 | 18.8 | 18.0 | 1444 | 20.6 |
| $FW/\phi 1$ | 0.18 | 0.18 | 0.17 | 0.15 | 0.13 | 0.13 | 0.17 | 0.14 |

As described above, according to the present invention, there is provided a rear focusing zoom lens that is characterized in that: the rear focusing method is employed, a large aperture ratio is realized such that the F-number at the wide angle end is about 1.8; a wide angle is realized such that the photographing image angle at the wide angle end is 60 degrees or more; a significant power variation is realized such that the variable power ratio is 6 times to 20 times; the diameter of the front lens can be reduced; enlargement of the size of the overall system can be prevented; excellent optical performance are realized over the power variation range from the wide angle end to the telescopic end and over the distance from the object in a range from infinite distance to a near distance, and in particular, distortion can be prevented; and the structure can be simplified.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A rear focusing zoom lens system, comprising:
   a first lens unit remaining stationary and having positive refracting power;
   a second lens unit having negative refracting power;
   a third lens unit having positive refracting power;
   a fourth lens unit having negative refracting power; and
   a fifth lens unit remaining stationary and having positive refracting power, which are disposed in this sequential order when viewed from an object,
   wherein at least said second lens unit and said fourth lens unit are moved to perform zooming, and said fourth lens unit is moved toward an image surface to perform focusing from an infinite object to a nearest object.

2. A rear focusing zoom lens system according to claim 1, wherein said fourth lens unit describes a concave locus facing the object when zooming is performed from the wide angle end to the telescopic end.

3. A rear focusing zoom lens system according to claim 1, wherein, assuming that the focal length of the overall system at the wide angle end and the distance from said fourth lens unit to said fifth lens unit at the wide angle end with respect to an infinite object are $F_w$ and $D_{4w}$ respectively, the following conditional expression is satisfied:

$$1.80 < D_{4w}/F_w < 3.90.$$

4. A rear focusing zoom lens system according to claim 1, wherein, assuming that the distance from said second lens unit to said third lens unit with respect to an infinite object, measured at the wide angle end, and the distance from said fourth lens unit to said fifth lens unit at the wide angle end with respect to the infinite object are $D_{2w}$ and $D_{4w}$, respectively, the following conditional expression is satisfied:

$$1.5 < D_{2w}/D_{4w} < 3.5.$$

5. A rear focusing zoom lens system according to claim 1, wherein, assuming that the distance from said fourth lens unit to said fifth lens unit with respect to an infinite object, measured at the wide angle end, is $D_{4w}$ and the focal length of said fourth lens unit is $F_4$, the following conditional expression is satisfied:

$$0.4 < |D_{4w}/F_4| < 1.0.$$

6. A rear focusing zoom lens system according to claim 1, wherein, assuming that the focal lengths of said first lens unit and said second lens unit are $F_1$ and $F_2$, respectively, the following conditional expression is satisfied:

$$5.7 < |F_1/F_2| < 7.$$

7. A rear focusing lens system according to claim 1, wherein said fourth lens unit comprises a positive lens and a negative lens, and, assuming that the Abbe's numbers of said positive lens and said negative lens are $\nu_{4p}$ and $\nu_{4N}$, the following conditional expression is satisfied:

$$\nu_{4N} - \nu_{4p} > 15.$$

8. A rear focusing zoom lens system according to claim 1, wherein said third lens unit consists of a single lens.

9. A rear focusing zoom lens system according to claim 1, wherein said fourth lens unit consists of a single lens.

10. A rear focusing zoom lens system according to claim 1, wherein the most image side surface of said fourth lens unit is a concave surface.

11. A rear focusing zoom lens system according to claim 10, wherein the most object side surface of said fourth lens unit is a concave surface.

12. A rear focusing zoom lens system according to claim 11, wherein said fourth lens unit consists of a biconcave negative lens.

13. A rear focusing zoom lens system according to claim 12, wherein assuming that the curvature radius of the surface of said biconcave negative lens facing the object and that of the surface of said negative lens facing the image surface are R4a and R4b, respectively, the following conditional expression is satisfied:

$$1.1 < |R4a|/R4b.$$

14. A rear focusing zoom lens system according to claim 11, wherein said fourth lens unit consists of a positive lens and a negative lens bonded together.

15. A rear focusing zoom lens system according to claim 14, wherein assuming that the curvature radius of the most object side surface of said fourth lens unit and that of the most image side surface of said fourth lens unit are R4a and R4b, respectively, the following conditional expression is satisfied:

$$1.1 < |R4a|/R4b.$$

16. A rear focusing zoom lens system, comprising:
    a first lens unit remaining stationary and having positive refracting power;
    a second lens unit having negative refracting power;
    a third lens unit remaining stationary and having positive refracting power;
    a fourth lens unit having negative refracting power; and
    a fifth lens unit remaining stationary and having positive refracting power, which are disposed in this sequential order when viewed from an object,
    wherein at least said second lens unit and said fourth lens unit are moved to perform zooming, and said fourth lens unit is moved to perform focusing, and
    wherein said fourth lens unit is moved toward an image surface to perform focusing from an infinite object to a nearest object.

17. A rear focusing zoom lens system according to claim 16, wherein said fourth lens unit describes a concave locus facing the object when zooming is performed from the wide angle end to the telescopic end.

18. A rear focusing zoom lens system according to claim 16, wherein, assuming that the focal length of the overall system at the wide angle end and the distance from said fourth lens unit to said fifth lens unit at the wide angle end with respect to an infinite object are $F_w$ and $D_{4w}$, respectively, the following conditional expression is satisfied:

$$1.80 < D_{4w}/F_w < 3.90.$$

19. A rear focusing zoom lens system according to claim 16, wherein, assuming that the distance from said second lens unit to said third lens unit with respect to an infinite object, measured at the wide angle end, and the distance from said fourth lens unit to said fifth lens unit at the wide angle end with respect to the infinite object are $D_{2w}$ and $D_{4w}$, respectively, the following conditional expression is satisfied:

$$1.5 < D_{2w}/D_{4w} < 3.5.$$

20. A rear focusing zoom lens system according to claim 16, wherein, assuming that the distance from said fourth lens unit to said fifth lens unit with respect to an infinite object, measured at the wide angle end, is $D_{4w}$ and the focal length of said fourth lens unit is $F_4$, the following conditional expression is satisfied:

$$0.4 < |D_{4w}/F_4| < 1.0.$$

21. A rear focusing zoom lens system according to claim 16, wherein, assuming that the focal lengths of said first lens unit and said second lens unit are $F_1$ and $F_2$, respectively, the following conditional expression is satisfied:

$$5.7 < |F_1/F_2| < 7.$$

22. A rear focusing zoom lens system according to claim 16, wherein said fourth lens unit comprises a positive lens and a negative lens, and, assuming that the Abbe's numbers of said positive lens and said negative lens are $\nu_{4P}$ and $\nu_{4N}$, the following conditional expression is satisfied:

$$\nu_{4N} - \nu_{4P} > 15.$$

23. A rear focusing zoom lens system according to claim 16, wherein said third lens unit consists of a single lens.

24. A rear focusing zoom lens system according to claim 16, wherein said fourth lens unit consists of a single lens.

25. A rear focusing zoom lens system according to claim 16, wherein the most image side surface of said fourth lens unit is a concave surface.

26. A rear focusing zoom lens system according to claim 25, wherein the most object side surface of said fourth lens unit is a concave surface.

27. A rear focusing zoom lens system according to claim 26, wherein said fourth lens unit consists of a biconcave negative lens.

28. A rear focusing zoom lens system according to claim 27, wherein assuming that the curvature radius of the surface of said biconcave negative lens facing the object and that of the surface of said negative lens facing the image surface are R4a and R4b, respectively, the following conditional expression is satisfied:

$$1.1 < |R4a|/R4b.$$

29. A rear focusing zoom lens system according to claim 26, wherein said fourth lens unit consists of a positive lens and a negative lens bonded together.

30. A rear focusing zoom lens system according to claim 29, wherein assuming that the curvature radius of the most object side surface of said fourth lens unit and that of the most image side surface of said fourth lens unit are R4a and R4b, respectively, the following conditional expression is satisfied:

$$1.1 < |R4a|/R4b.$$

31. A rear focusing zoom lens system, comprising:
    a first unit having positive refracting power;
    a second unit having negative refracting power;
    a third unit having positive refracting power;
    a fourth unit having negative refracting power;
    a fifth unit remaining stationary and having positive refracting power, which are disposed in this sequential order when viewed from an object,
    wherein said fourth unit is moved toward an image surface to perform focusing from an infinite object to a nearest object, and said third unit consists of a single lens, and
    wherein zooming is performed by moving said second unit and said fourth unit.

32. A rear focusing zoom lens system according to claim 31, wherein said fourth unit is moved to have a convex locus facing the image surface when power is varied from the wide angle end to the telescopic end.

33. A rear focusing zoom lens system according to claim 31, wherein, assuming that the focal length of said first unit is F1 and the focal length of the overall system at the wide angle end is $F_w$, the following conditional expression is satisfied:

$$4 < F1/F_w < 6.5.$$

34. A rear focusing zoom lens system, comprising:
a first unit having positive refracting power;
a second unit having negative refracting power;
a third unit having positive refracting power;
a fourth unit consisting of one of (i) a single lens and (ii) a plurality of lenses bonded together, and having negative refracting power; and
a fifth unit remaining stationary and having positive refracting power, which are disposed in this sequential order when viewed from an object,
wherein said second unit and said fourth unit are moved to perform zooming, and said fourth unit is moved along an optical axis toward an image surface to perform focusing from an infinite object to a nearest object, and
wherein said fourth unit is moved to have a convex locus facing the image surface when power is varied from the wide angle end to the telescopic end.

35. A rear focusing zoom lens system according to claim 34, wherein said fourth unit consists of a bi-concave negative lens, and, assuming that the curvature radius of the surface of said negative lens facing the object and that of the surface of said negative lens facing the image surface are R4a and R4b, respectively, the following conditional expression is satisfied:

$$1.1 < |R4\ a|/R4b.$$

* * * * *

UNITED STATES PATENT AND TRADEMARK OFFICE
CERTIFICATE OF CORRECTION

PATENT NO. : 5,847,882

DATED : December 8, 1998

INVENTOR(S) : Hiroki NAKAYAMA

It is certified that error appears in the above-identified patent and that said Letters Patent is hereby corrected as shown below:

ON THE COVER PAGE:

AT [57] ABSTRACT:

Line 8, "an" should read --from an--.

COLUMN 10:

Line 47, "foe" should read --the--.

COLUMN 36:

Line 36, "seeond" should read --second--.

COLUMN 39:

Line 49, "widen" should read --widening--.

COLUMN 45:

Line 8 (Table 2, Example 17), "5.30." should read --5.30--.

COLUMN 51:

Line 11, "does" should read --do--.

UNITED STATES PATENT AND TRADEMARK OFFICE
CERTIFICATE OF CORRECTION

PATENT NO. : 5,847,882

DATED : December 8, 1998

INVENTOR(S) : Hiroki NAKAYAMA

It is certified that error appears in the above-identified patent and that said Letters Patent is hereby corrected as shown below:

<u>COLUMN 52</u>:

Line 45, "appropriate" should read --appropriately--.
Line 46, "appropriate" should read --appropriately--.

<u>COLUMN 54</u>:

Line 36, "following-be" should read --following be--.

<u>COLUMN 55</u>:

Line 3, "widen" should read --widening--.
Line 9, "widen" should read --widening--.

<u>COLUMN 57</u>:

Line 38 (Example 21), "N6=1.8(6659" should read --N6=1.846659--.

<u>COLUMN 59</u>:

Line 28 (Example 22), "C='11.093 e-02" should read --C=-1.093 e-02--.

UNITED STATES PATENT AND TRADEMARK OFFICE
CERTIFICATE OF CORRECTION

PATENT NO. : 5,847,882

DATED : December 8, 1998

INVENTOR(S) : Hiroki NAKAYAMA

It is certified that error appears in the above-identified patent and that said Letters Patent is hereby corrected as shown below:

COLUMN 61:

Line 32 (Example 24), "0.8[00fa]" should read --0.86--.

COLUMN 70:

Line 15, "R4 a" should read --R4a--.

Signed and Sealed this

Fourteenth Day of November, 2000

Attest:

Q. TODD DICKINSON

Attesting Officer      Director of Patents and Trademarks